US007865137B2

(12) United States Patent
Goldberg et al.

(10) Patent No.: US 7,865,137 B2
(45) Date of Patent: Jan. 4, 2011

(54) MUSIC DISTRIBUTION SYSTEM FOR MOBILE AUDIO PLAYER DEVICES

(75) Inventors: David Goldberg, Boulder, CO (US); Benjamin Goldberg, Boulder, CO (US); Martha Goldberg, Boulder, CO (US); Miriam Goldberg, Boulder, CO (US)

(73) Assignee: SyncroNation, Inc., Durham, NC (US)

( * ) Notice: Subject to any disclaimer, the term of this patent is extended or adjusted under 35 U.S.C. 154(b) by 892 days.

(21) Appl. No.: 11/566,546

(22) Filed: Dec. 4, 2006

(65) Prior Publication Data

US 2007/0129004 A1 Jun. 7, 2007

Related U.S. Application Data

(62) Division of application No. 10/513,702, filed as application No. PCT/US03/14154 on May 6, 2003, now Pat. No. 7,657,224.

(60) Provisional application No. 60/378,415, filed on May 6, 2002, provisional application No. 60/388,887, filed on Jun. 14, 2002, provisional application No. 60/452,230, filed on Mar. 4, 2003.

(51) Int. Cl.
*H04B 7/15* (2006.01)

(52) U.S. Cl. .................................... 455/11.1; 455/3.06

(58) Field of Classification Search ................ 455/3.06, 455/7, 11.1, 13.1, 16, 15

See application file for complete search history.

(56) References Cited

U.S. PATENT DOCUMENTS 4,005,278 A 1/1977 Gorike
4,620,068 A 10/1986 Wieder
5,327,506 A 7/1994 Stites
5,398,278 A 3/1995 Brotz
5,461,188 A 10/1995 Drago et al.
5,508,731 A 4/1996 Kohorn (Continued)

FOREIGN PATENT DOCUMENTS

EP 1427170 A2 6/2004

(Continued)

OTHER PUBLICATIONS

Karl Aberer et al., "Advanced Peer-to-Peer Networking: The P-Grid System and its Applications," available from lsirpeople.epfl.ch/aberer/PAPERS/PIK%202002.pdf, 6 pages.

(Continued)

*Primary Examiner*—Tu X Nguyen
(74) *Attorney, Agent, or Firm*—Withrow & Terranova, PLLC

(57) ABSTRACT

The present invention discloses a method for distributing music to members of a music sharing group. In one aspect, the method can include identifying a mobile audio player device that introduces a music selection to another mobile audio player device. A signal comprising the music selection, a musical identifier that identifies the music selection and an identifier that identifies the transmitting device is transmitted from a first mobile device to a second mobile device. The second device stores the musical identifier and the identifier of the transmitting device in association with one another. In another aspect, the devices are enabled to connect over a wide area network and use the identifiers to obtain the music selection from a music distributor over the network. In yet another aspect, the transmitting device receives points or other compensation for introducing the music selection to the second device.

17 Claims, 34 Drawing Sheets

U.S. PATENT DOCUMENTS

| | | | |
|---|---|---|---|
| 5,652,766 | A | 7/1997 | Matsumura et al. |
| 6,062,868 | A | 5/2000 | Toriumi |
| 6,075,442 | A | 6/2000 | Welch |
| 6,112,186 | A | 8/2000 | Bergh et al. |
| 6,192,340 | B1 | 2/2001 | Abecassis |
| 6,266,649 | B1 | 7/2001 | Linden et al. |
| 6,311,155 | B1 | 10/2001 | Vaudrey et al. |
| 6,372,974 | B1 | 4/2002 | Gross et al. |
| 6,377,530 | B1 | 4/2002 | Burrows |
| 6,438,579 | B1 | 8/2002 | Hosken |
| 6,526,287 | B1 | 2/2003 | Lee |
| 6,559,682 | B1 | 5/2003 | Kyles et al. |
| 6,563,427 | B2 | 5/2003 | Bero et al. |
| 6,574,594 | B2 | 6/2003 | Pitman et al. |
| 6,606,745 | B2 | 8/2003 | Maggio |
| 6,633,747 | B1 | 10/2003 | Reiss |
| 6,647,417 | B1 | 11/2003 | Hunter et al. |
| 6,657,116 | B1 | 12/2003 | Gunnerson |
| 6,662,022 | B1 | 12/2003 | Kanamori et al. |
| 6,662,231 | B1 | 12/2003 | Drosset et al. |
| 6,664,891 | B2 | 12/2003 | Davies et al. |
| 6,670,537 | B2 | 12/2003 | Hughes et al. |
| 6,714,826 | B1 | 3/2004 | Curley et al. |
| 6,757,517 | B2 | 6/2004 | Chang |
| 6,766,355 | B2 | 7/2004 | Liang et al. |
| 6,792,244 | B2 | 9/2004 | Ross et al. |
| 6,798,765 | B2 * | 9/2004 | Larsson ...................... 370/351 |
| 6,829,368 | B2 | 12/2004 | Meyer et al. |
| 6,834,195 | B2 | 12/2004 | Brandenberg et al. |
| 6,839,417 | B2 | 1/2005 | Weisman et al. |
| 6,850,901 | B1 | 2/2005 | Hunter et al. |
| 6,879,574 | B2 | 4/2005 | Naghian et al. |
| 6,898,759 | B1 | 5/2005 | Terada et al. |
| 6,904,055 | B2 | 6/2005 | Pichna et al. |
| 6,912,501 | B2 | 6/2005 | Vaudrey et al. |
| 6,933,433 | B1 | 8/2005 | Porteus et al. |
| 6,952,716 | B1 | 10/2005 | Robb et al. |
| 6,957,041 | B2 | 10/2005 | Christensen et al. |
| 6,989,484 | B2 | 1/2006 | Gross |
| 6,990,312 | B1 | 1/2006 | Gioscia et al. |
| 7,047,030 | B2 | 5/2006 | Forsyth |
| 7,065,342 | B1 | 6/2006 | Rolf |
| 7,068,792 | B1 | 6/2006 | Surazski et al. |
| 7,072,846 | B1 | 7/2006 | Robinson |
| 7,092,821 | B2 | 8/2006 | Mizrahi et al. |
| 7,102,067 | B2 | 9/2006 | Gang et al. |
| 7,129,891 | B2 | 10/2006 | Meunier |
| 7,130,608 | B2 | 10/2006 | Hollstrom et al. |
| 7,136,945 | B2 | 11/2006 | Gibbs et al. |
| 7,143,939 | B2 | 12/2006 | Henzerling |
| 7,151,769 | B2 | 12/2006 | Stanforth et al. |
| 7,155,159 | B1 | 12/2006 | Weinblatt et al. |
| 7,167,841 | B2 | 1/2007 | Hatano et al. |
| 7,177,904 | B1 | 2/2007 | Mathur et al. |
| 7,206,934 | B2 | 4/2007 | Pabla et al. |
| 7,209,468 | B2 | 4/2007 | Twitchell, Jr. |
| 7,209,751 | B2 | 4/2007 | Nishida et al. |
| 7,213,047 | B2 | 5/2007 | Yeager et al. |
| 7,234,117 | B2 | 6/2007 | Zaner et al. |
| 7,236,739 | B2 | 6/2007 | Chang |
| 7,266,836 | B2 * | 9/2007 | Anttila et al. ............... 725/133 |
| 7,711,774 | B1 | 5/2010 | Rothschild |
| 2001/0004397 | A1 | 6/2001 | Kita et al. |
| 2001/0021663 | A1 | 9/2001 | Sawada et al. |
| 2001/0037234 | A1 | 11/2001 | Parmasad et al. |
| 2001/0037367 | A1 | 11/2001 | Iyer |
| 2001/0039181 | A1 * | 11/2001 | Spratt ........................ 455/11.1 |
| 2001/0041588 | A1 | 11/2001 | Hollstrom et al. |
| 2002/0033844 | A1 | 3/2002 | Levy et al. |
| 2002/0037735 | A1 | 3/2002 | Maggenti et al. |
| 2002/0049628 | A1 | 4/2002 | West et al. |
| 2002/0052885 | A1 | 5/2002 | Levy |
| 2002/0059614 | A1 | 5/2002 | Lipsanen et al. |
| 2002/0062310 | A1 | 5/2002 | Marmor et al. |
| 2002/0072816 | A1 | 6/2002 | Shdema et al. |
| 2002/0078054 | A1 | 6/2002 | Kudo et al. |
| 2002/0080288 | A1 | 6/2002 | Davies |
| 2002/0080719 | A1 | 6/2002 | Parkvall et al. |
| 2002/0081972 | A1 | 6/2002 | Rankin |
| 2002/0087887 | A1 | 7/2002 | Busam et al. |
| 2002/0143415 | A1 | 10/2002 | Buehler et al. |
| 2002/0160824 | A1 | 10/2002 | Goto et al. |
| 2002/0165793 | A1 | 11/2002 | Brand et al. |
| 2002/0168938 | A1 | 11/2002 | Chang |
| 2002/0174243 | A1 | 11/2002 | Spurgat et al. |
| 2002/0184310 | A1 | 12/2002 | Traversat et al. |
| 2002/0193066 | A1 | 12/2002 | Connelly |
| 2002/0194601 | A1 | 12/2002 | Perkes et al. |
| 2003/0002395 | A1 | 1/2003 | Chang et al. |
| 2003/0002521 | A1 | 1/2003 | Traversat et al. |
| 2003/0004782 | A1 | 1/2003 | Kronby |
| 2003/0005138 | A1 | 1/2003 | Giffin et al. |
| 2003/0009570 | A1 | 1/2003 | Moskowitz et al. |
| 2003/0037124 | A1 | 2/2003 | Yamaura et al. |
| 2003/0046399 | A1 | 3/2003 | Boulter et al. |
| 2003/0056220 | A1 | 3/2003 | Thornton et al. |
| 2003/0073494 | A1 | 4/2003 | Kalpakian et al. |
| 2003/0088571 | A1 | 5/2003 | Ekkel |
| 2003/0093790 | A1 | 5/2003 | Logan et al. |
| 2003/0112947 | A1 | 6/2003 | Cohen |
| 2003/0126211 | A1 | 7/2003 | Anttila et al. |
| 2003/0135464 | A1 | 7/2003 | Mourad et al. |
| 2003/0135605 | A1 | 7/2003 | Pendakur |
| 2003/0182003 | A1 | 9/2003 | Takashima |
| 2003/0195851 | A1 | 10/2003 | Ong |
| 2003/0200001 | A1 | 10/2003 | Goddard |
| 2003/0217139 | A1 | 11/2003 | Burbeck et al. |
| 2003/0225834 | A1 | 12/2003 | Lee et al. |
| 2004/0002920 | A1 | 1/2004 | Prohel et al. |
| 2004/0003090 | A1 | 1/2004 | Deeds |
| 2004/0041836 | A1 | 3/2004 | Zaner et al. |
| 2004/0044776 | A1 | 3/2004 | Larkin |
| 2004/0069122 | A1 | 4/2004 | Wilson |
| 2004/0087326 | A1 | 5/2004 | Dunko et al. |
| 2004/0098370 | A1 | 5/2004 | Garland et al. |
| 2004/0107242 | A1 | 6/2004 | Vert et al. |
| 2004/0138943 | A1 | 7/2004 | Silvernail |
| 2004/0148333 | A1 | 7/2004 | Manion et al. |
| 2004/0162871 | A1 | 8/2004 | Pabla et al. |
| 2004/0166798 | A1 | 8/2004 | Shusman |
| 2004/0176025 | A1 | 9/2004 | Holm et al. |
| 2004/0203698 | A1 | 10/2004 | Comp |
| 2004/0205091 | A1 | 10/2004 | Mulcahy et al. |
| 2004/0224638 | A1 | 11/2004 | Fadell et al. |
| 2004/0230511 | A1 | 11/2004 | Kannan et al. |
| 2004/0248601 | A1 | 12/2004 | Chang |
| 2005/0004837 | A1 | 1/2005 | Sweeney et al. |
| 2005/0054286 | A1 | 3/2005 | Kanjilal et al. |
| 2005/0064852 | A1 | 3/2005 | Baldursson |
| 2005/0125222 | A1 | 6/2005 | Brown et al. |
| 2005/0138119 | A1 | 6/2005 | Saridakis |
| 2005/0141367 | A1 | 6/2005 | Morohashi |
| 2005/0153725 | A1 | 7/2005 | Naghian et al. |
| 2005/0172001 | A1 | 8/2005 | Zaner et al. |
| 2005/0175315 | A1 | 8/2005 | Ewing |
| 2005/0198317 | A1 | 9/2005 | Byers |
| 2005/0200487 | A1 | 9/2005 | O'Donnell et al. |
| 2005/0216942 | A1 | 9/2005 | Barton |
| 2005/0238180 | A1 | 10/2005 | Chen |
| 2005/0286546 | A1 | 12/2005 | Bassoli et al. |
| 2006/0046709 | A1 | 3/2006 | Krumm et al. |
| 2006/0052057 | A1 | 3/2006 | Persson et al. |
| 2006/0053080 | A1 | 3/2006 | Edmonson et al. |
| 2006/0146765 | A1 | 7/2006 | Van De Sluis et al. |

| | | | |
|---|---|---|---|
| 2006/0179160 | A1 | 8/2006 | Uehara et al. |
| 2006/0184960 | A1 | 8/2006 | Horton et al. |
| 2006/0190827 | A1 | 8/2006 | Zaner et al. |
| 2006/0190828 | A1 | 8/2006 | Zaner et al. |
| 2006/0190829 | A1 | 8/2006 | Zaner et al. |
| 2006/0190968 | A1 | 8/2006 | Jung et al. |
| 2006/0221788 | A1 | 10/2006 | Lindahl et al. |
| 2006/0233203 | A1 | 10/2006 | Iwamura |
| 2006/0242234 | A1 | 10/2006 | Counts et al. |
| 2006/0261939 | A1 | 11/2006 | Blakeway |
| 2006/0270395 | A1 | 11/2006 | Dhawan et al. |
| 2007/0010195 | A1 | 1/2007 | Brown et al. |
| 2007/0016654 | A1 | 1/2007 | Bowles et al. |
| 2007/0021142 | A1 | 1/2007 | Byeon et al. |
| 2007/0030974 | A1 | 2/2007 | Ishibashi et al. |
| 2007/0042762 | A1 | 2/2007 | Guccione |
| 2007/0065794 | A1 | 3/2007 | Mangum |
| 2007/0087686 | A1 | 4/2007 | Holm et al. |
| 2007/0098202 | A1 | 5/2007 | Viranyi et al. |
| 2007/0136446 | A1 | 6/2007 | Rezvani et al. |
| 2007/0142090 | A1 | 6/2007 | Rydenhag et al. |

FOREIGN PATENT DOCUMENTS

| | | | |
|---|---|---|---|
| EP | 1526471 | A1 | 4/2005 |
| EP | 1643716 | A1 | 4/2006 |
| EP | 1104968 | B1 | 2/2007 |
| GB | 2371895 | A | 8/2002 |
| JP | 2001-352291 | | 12/2001 |
| JP | 2002-073049 | | 12/2002 |
| KR | 20020085746 | | 11/2002 |
| KR | 20030004156 | | 1/2003 |
| WO | 99/12385 | | 3/1999 |
| WO | 01/08020 | A1 | 2/2001 |
| WO | 01/41409 | A1 | 6/2001 |
| WO | 01/97488 | A2 | 12/2001 |
| WO | 02/01799 | A2 | 1/2002 |
| WO | 02/067449 | A2 | 8/2002 |
| WO | 2005/093453 | A1 | 10/2005 |
| WO | 2006/049398 | A1 | 5/2006 |
| WO | 2006/067059 | A1 | 6/2006 |

OTHER PUBLICATIONS

Karl Aberer et al., "An Overview on Peer-to-Peer Information Systems," available from www.p-grid.org/publications/papers/WDAS2002.pdf , 14 pages.

Barry A.T. Brown et al., "The Use of Conventional and New Music Media: Implications for Future Technologies," HP Laboratories Bristol, May 2, 2001, copyright 2001 Hewlett-Packard Company, 9 pages.

Mattias Esbjornsson et al., "Adding Value to Traffic Encounters: A Design Rationale for Mobile Ad Hoc Computing Services," available from http://www.tii.se/mobility/Files/iris_final_030605.pdf, 12 pages.

Nitin Garg et al., "A Peer-to-Peer Mobile Storage System," available from http://www.cs.princeton.edu/~eziskind/papers/skunk.pdf, 14 pages.

"Gigabeat Joins Trymedia Systems' Secure Viral Distribution Partnership," Business Wire, Jul. 12, 2000, 3 pages.

Daniel Lihui Gu et al., "UAV Aided Intelligent Routing for Ad-Hoc Wireless Network in Single-area Theater," available from www.cs.arizona.edu/~bzhang/paper/00-wcnc-uav.pdf, 6 pages.

J. Felix Hampe et al., "Enhancing Mobile Commerce: Instant Music Purchasing Over the Air," available from www.uni-koblenz.de/~iwi/publications/ag-hampe/music.pdf, 15 pages.

Darko Kirovski et al., "Off-line Economies for Digital Media," available from http://web.cs.wpi.edu/~claypool/nossdav06/papers.html, 6 pages.

Bo Ling et al., "A Content-Based Resource Location Mechanism in PeerIS," available from www.comp.nus.edu.sg/~bestpeer/paper/ling02contentbased.pdf, 10 pages.

"Model No. 1089 User's Manual," available from www.medialoper.com/docs/zune-manual.pdf, 7 pages.

Yi Ren et al., "Explore the 'Small World Phenomena' in Pure P2P Information Sharing System," 3rd IEEE International Symposium on Cluster Computing and the Grid, May 12-15, 2003, Tokyo, Japan, 8 pages.

"Sony—myloTM Powerful Connections," http://www.learningcenter.sony.us/assets/itpd/mylo/prod/index.html, copyright 2006 Sony Electronics, Inc., printed Dec. 19, 2007, 1 page.

Beverly Yang et al., "Comparing Hybrid Peer-to-Peer Systems," available from http://www.dia.uniroma3.it/~vldbproc/060_561.pdf, 25 pages.

Deborah Young, "Wireless Music, Napster-Style?," Wireless Review, v. 18, n. 11, p. 12, Jun. 1, 2001, 2 pages.

Supplementary European Search Report for EP 03741778.9, mailed Jan. 9, 2009, 5 pages.

"Avvenu: Remotely access and share your photos and files from any mobile phone or PC," http://www.avvenu.com/, printed Jan. 2, 2008, 1 page.

* cited by examiner

BROADCAST UNIT 710
SEARCH UNIT 750

*Fig. 19*

| RULE | METHOD |
|---|---|
| BROADCASTER | ACCEPTED WHEN BROADCASTER INDICATES "YES". REJECTED WHEN BROADCASTER INDICATES "NO" |
| MAJORITY | ACCEPTED WHEN (N/2)+1 INDICATE "YES". REJECTED WHEN (N/2) INDICATE "NO". |
| UNANIMOUS | ACCEPTED WHEN N MEMBERS INDICATE "YES". REJECTED WHEN 1 MEMBER INDICATES "NO". |
| TIMED MAJORITY | MACHINE INDICATES ONSET OF VOTING, AND COUNTS DOWN TO VOTING TERMINATION. ACCEPTED IF (Q/2)+1 INDICATE "YES" BEFORE TERMINATION; OTHERWISE "NO". |
| SYNCHRONIZED MAJORITY | MACHINE COUNTS DOWN TO VOTE. ACCEPTED IF (Q/2)+1 INDICATE "YES" WITHIN PREDETERMINED TIME OF COUNTDOWN. OTHERWISE "NO". |

*Fig. 20*

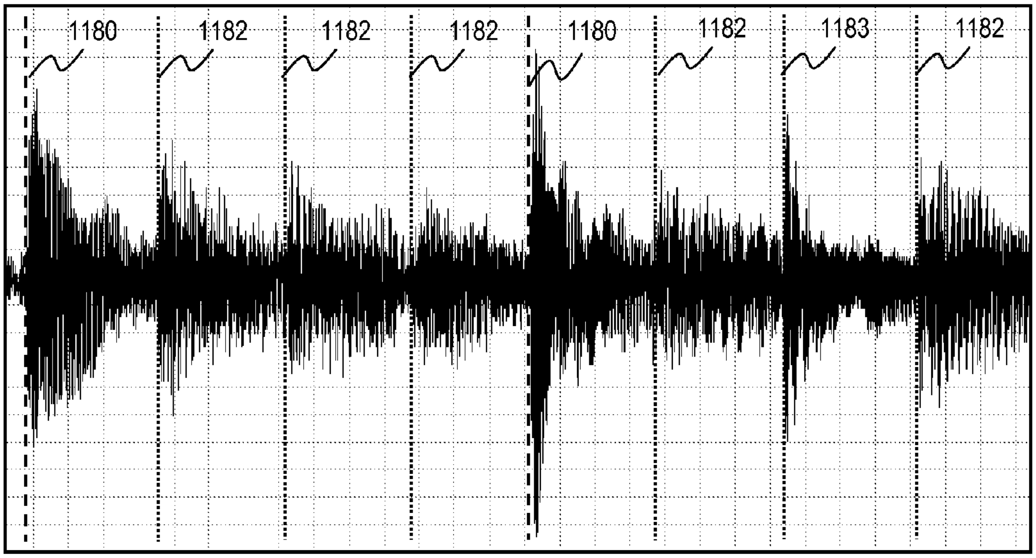

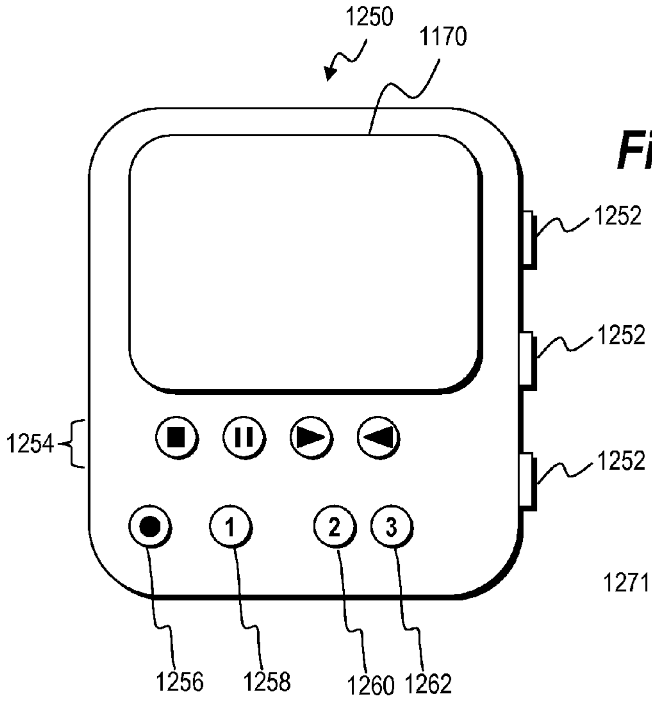
*Fig. 22A*
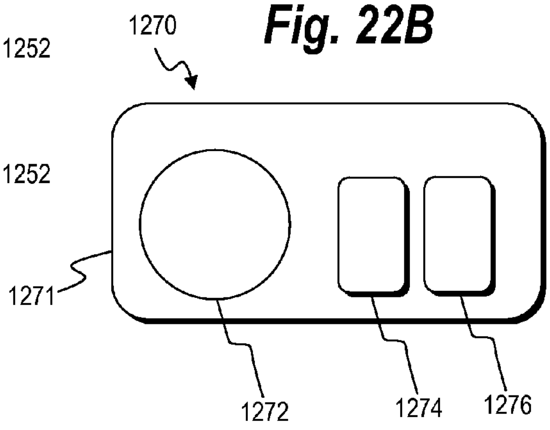
*Fig. 22B*
*Fig. 22C*
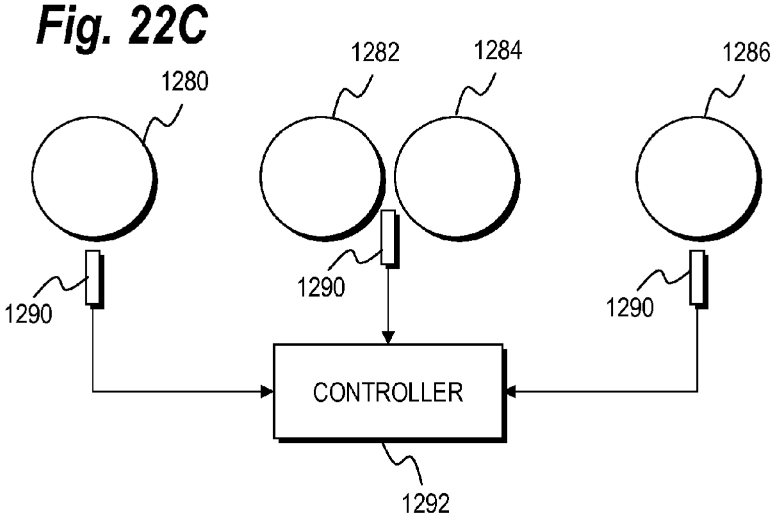

MUSIC DISTRIBUTION SYSTEM FOR MOBILE AUDIO PLAYER DEVICES

CROSS REFERENCE TO RELATED PATENT APPLICATIONS

This application is a divisional application of and claims priority to U.S. patent application Ser. No. 10/513,702 Nov. 8, 2004 now U.S. Pat. No. 7,657,224 entitled, "Localized Audio Networks and Associated Digital Accessories" based on PCT Application No. PCT/US03/14154 May 6, 2003 having the same title claiming priority from Provisional Patent Application No. 60/378,415, filed May 6, 2002, titled "Localized Audio Networks and Associated Digital Accessories," and from Provisional Patent Application No. 60/388,887, filed Jun. 14, 2002, titled "Localized Audio Networks and Associated Digital Accessories," and from Provisional Patent Application No. 60/452,230, filed Mar. 4, 2003, titled "Localized Audio Networks and Associated Digital Accessories," the contents of each of which are incorporated herein by reference.

TECHNICAL FIELD

The present invention relates to localized wireless audio networks for shared listening of recorded music, and wearable digital accessories for public music-related display, which can be used in conjunction with one another.

BACKGROUND

Portable audio players are popular consumer electronic products, and come in a variety of device formats, from cassette tape "boom boxes" to portable CD players to digital flash-memory and hard-disk MP3 players. While boom boxes are meant to make music to be shared among people, most of the portable audio players are designed for single person use. While some of this orientation to personal music listening is due to personal preference, other important considerations are the technical difficulties of reproducing music for open area listening with small, portable devices, as well as the social imposition of listening to music in public places with other people who do not wish to listen to the same music, or who are listening to different music that would interfere with one's own music.

There are numerous audio devices that are designed to allow the transfer of music from one portable audio device to another, especially through those that store music in the MP3 audio format. These devices suffer from two main difficulties: firstly, listeners still do not hear the music simultaneously, which is the optical manner to share music, and secondly, there are serious copyright issues associated with the transfer of music files. Thus, it would be preferable for the transfer of the music for simultaneous enjoyment, and which did not result in a permanent transfer of the music files between the devices, so as not to infringe on the intellectual property rights of the music owners.

Given the sharing of music, listeners will on occasion want to purchase the music for themselves. In such case, it would be beneficial for the user to have a way to obtain the music with minimal effort. It would further be desirable for there to be a way to keep track of the person from whom the listener heard the music, so that the person could be in some way encouraged or compensated.

The earphones associated with a portable music player admit a relatively constant fraction of ambient sound. If listening to music with a shared portable music device, however, one might at times want to talk with a friend, and at times listen to music without outside audible distraction. In such case, it would be desirable to have an earphone for which the amount of external ambient sound could be manually set.

Furthermore, many people like to show their individual preferences, to exhibit themselves, and to demonstrate their group membership. Furthermore, music preferences and listening to music together are among the more important means by which individuals express their individual and group identities. It would be beneficial for there to be a way for individuals to express themselves through their music, and for groups of individuals listening to music together, to be able to demonstrate their group enjoyment of the music.

One means for a person to express their identity through motion would be through having wearable transducers wherein the transduction signal is related to the music. If the transducer were a light transducer, this would result in a display of light related to the music that was being listened to. It would be further beneficial if there were means by which a person could generate control signals for the transducer so that instead of a wholly artificial response to the music, the transducer showed a humanly interpreted display. It would be preferable if these signals could be shared between people along with music files, so that others could entertain or appreciate the light display so produced.

At popular music concerts, there is often a "light show" that pulsates in rough relation to the music. In contrast to the generally vigorous light show, the patrons at the concerts often have light bracelets or other such static displays which are used to join with the displays on the stage. It would be beneficial for there to be a way in which patrons could participate in the light show in order to enhance their enjoyment of the concert.

It is to the solution of these and other problems that the present invention is directed.

SUMMARY OF THE INVENTION

It is an object of the present invention to provide users a means of listening to music together using mobile devices.

It is also an object of the present invention to provide users a means of choosing with whom to listen to music.

It is additionally an object of the present invention to provide users the ability to monitor the people that are listening together.

It is furthermore an object of the present invention to provide users a means of expressing their enjoyment of the music they are listening to through visual displays of wearable accessories.

It is yet another object of the present invention to provide users a means of demonstrating their identity with other people they are listening to music with.

It is still further an object of the present invention to provide users to provide users with means to choreograph the visual displays.

Additional objects, advantages and novel features of this invention shall be set forth in part in the description that follows, and will become apparent to those skilled in the art upon examination of the following specification or may be learned through the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for sharing music from stored musical signals between a first user with a first music player device and at least one second user with at least one second music player device. The method includes the step of playing the musical signals for the first user on the first music player device while essentially simultaneously wirelessly transmitting the musical signals from the first music player device to the at least one second music player device. The method additionally includes receiving the musical signals by the at least one second player device, such that the musical signals can be played on the at least one second player device essentially simultaneously with the playing of the musical signals on the first music player device. In this method, the first and the at least one second users are mobile and maintain less than a predetermined distance.

The present invention is also related to a system of music sharing for a plurality of users. The system includes a first sharing device and at least one second sharing device, each comprising a musical signal store, a musical signal transmitter, a musical signal receiver, and a musical signal player. Furthermore, the system comprises a broadcast user operating the first sharing device and at least one member user operating the at least one second sharing device. The broadcast user plays the musical signal for his own enjoyment on the first sharing device and simultaneously transmits the musical signal to the receiver of the at least one second sharing device of the at least one member user, on which the musical signal is played for the at least one member user. The broadcast user and the at least one member user hear the musical signal substantially simultaneously.

The present invention yet further is related to a wireless communications system for sharing audio entertainment between a first mobile device and a second mobile device in the presence of a non-participating third mobile device. The system includes an announcement signal transmitted by the first mobile device for which the second mobile device and the third mobile device are receptive. In addition, the system includes a response signal transmitted by the second mobile device in response to the announcement signal for which the first mobile device is receptive and for which the third mobile device is not receptive. Also, the system includes an identifier signal transmitted by the first mobile device to the second mobile device in response to the response signal, and which is not receptive to the third mobile device. Finally, the system includes a broadcast signal comprising audio entertainment that is transmitted by the first mobile device, and which is receptive by the second mobile device on the basis of the reception of the identifier signal.

The present invention additionally is related to an audio entertainment device. The device includes a signal store that stores an audio entertainment signal, a transmitter that can transmit the stored audio entertainment signal, a receiver that can receive the transmitted audio entertainment signal from a transmitter of another such device, and a player that can play audio entertainment from a member selected from the group of stored audio entertainment signals or audio entertainment signals transmitted from the transmitter of another such device.

The present invention yet still is related to a system for identifying a first device that introduces a music selection to a second device. The system includes a mobile music transmitter operated by the first device and a mobile music receiver operated by the second device. In addition, the system includes a music signal comprising the music selection transmitted by the transmitter and received by the receiver, an individual musical identifier that is associated with the music selection, and an individual transmitter identifier that identifies the transmitter. The transmitter identifier and the individual music identifier are stored in association with each other in the receiver.

The present invention is still further related to an audio entertainment device. The device includes a wireless transmitter for the transmission of audio entertainment signals and a wireless receiver for the reception of the transmitted audio entertainment signals from a transmitter of audio entertainment signals. A first manually-separable connector for electrically connecting with an audio player allows transfer of audio entertainment signals from the player to the device. The device also includes a second connector for connecting with a speaker and a control to manually switch between at least three states. In the first state the speaker plays audio entertainment signals from the audio player and the transmitter does not transmit the audio entertainment signals. In the second state the speaker plays audio entertainment signals from the audio player and the transmitter essentially simultaneously transmits the audio entertainment signals. In the third state the speaker plays audio entertainment signals received by the receiver.

The present invention also still is related to a system for the sharing of stored music between a first user and a second user. The system includes a first device for playing music to the first user, comprising a store of musical signals. A first controller prepares musical signals from the first store for transmission and playing, and a first player takes musical signals from the first controller and plays the signals for the first user. A transmitter is capable of taking the musical signals from the controller and transmitting the musical signals via wireless broadcast. A second device for playing music to the second user comprises a receiver receptive of the transmissions from the transmitter of the first device, a second controller that prepares musical signals from the receiver for playing, and a second player that takes musical signal from the second controller and plays the signals for the second user. The first user and the second user hear the musical signals at substantially the same time.

The present invention also is related to an earphone for listening to audio entertainment allowing for the controlled reception of ambient sound by a user. The earphone includes a speaker that is oriented towards the user's ear and an enclosure that reduces the amount of ambient noise perceptive to the user. In addition, a manually-adjustable characteristic of the enclosure adjusts the amount of ambient sound perceptive to the user.

The present invention is further related to a mobile device for the transmission of audio entertainment signals. The mobile device includes an audio signal store for the storage of the audio entertainment signals, and an audio signal player for the playing of the audio entertainment signals. The device also includes a wireless transmitter for the transmission of the audio entertainment signals and a transmitter control to manually switch between two states consisting of the operation and the non-operation of the audio transmitter.

The present invention yet still is related to a mobile device for the reception of digital audio entertainment signals. The mobile device includes an audio signal store for the storage of the digital audio entertainment signals and an audio receiver for the reception of external digital audio entertainment signals from a mobile audio signal transmitter located within a predetermined distance of the audio receiver. The device also includes a receiver control with at least a first state and a second state. An audio signal player plays digital audio entertainment signals from the audio signal store when the receiver control is in the first state, and plays digital audio entertainment signals from the audio receiver when the receiver control is in the second state.

The present invention furthermore relates to a method for the shared enjoyment of music from stored musical signals between a first user with a first music player device and at least one second user with at least one second music player device. The method includes the step of playing the musical signals for the first user on the first music player device while essentially simultaneously wirelessly transmitting synchronization signals from the first music player device to the at least one second music player device. The method also includes receiving the synchronization signals by the at least one second player device. The synchronization signals allow the musical signals on the at least one second player device to be played essentially simultaneously with the playing of the musical signals on the first music player device. The first and the at least one second users are mobile.

The present invention yet furthermore relates to a wireless communications system for sharing audio entertainment between a first mobile device and a second mobile device. The system includes a broadcast identifier signal transmitted by the first mobile device to the second mobile device. A personal identifier signal is transmitted by the second mobile device to the first mobile device. A broadcast signal comprising audio entertainment is transmitted by the first mobile device of which the second device is receptive. The first mobile device and the second mobile device have displays which can display the identifier signal that they receive and the second mobile device can play the audio entertainment from the broadcast signal that it receives.

The present invention also relates to a method for enhancing enjoyment of a musical selection. The method includes the steps of obtaining control signals related to the musical selection, transmitting the control signals wirelessly, receiving the control signals, and converting the control signals to a humanly-perceptible form.

The present invention further yet relates to a method for generating and storing control signals corresponding to musical signals. The method includes the steps of playing musical signals for a user and receiving manual input signals from the user that are produced substantially in synchrony with the music. The method also includes the steps of generating control signals from the input signals, and storing the control signals so that they can be retrieved with the musical signals.

The present invention still additionally relates to a wearable personal accessory. The accessory includes an input transducer taken from the group consisting of a microphone and an accelerometer. The transducer generates a time-varying input transduction signal. The accessory also includes a controller that accepts the input transduction signal, and generates an output transducer signal whose signal varies in amplitude with time. An output transducer receptive of the output transducer signal provides a humanly-perceptible signal. An energy source powers the input transducer, controller and output transducer.

The present invention also still relates to a wearable personal accessory controlled via wireless communications. The accessory includes a wireless communications receiver that is receptive of an external control signal. The accessory also includes a controller that accepts the external control signal and that generates a time-varying visual output transducer signal. A visual output transducer is receptive of the output transducer signal, and provides a humanly-perceptible visual signal. An energy store powers the receiver, controller and output transducer. The visual output transducer generates visually-perceptive output.

The present invention still further relates to a device for converting user tactile responses to stored music into a stored control signal. The device includes a player that plays stored music audible to the user and a manually-operated transducer that outputs an electrical signal. The transducer is actuated by the user in response to the music. A controller receives the electrical signal and outputs a control signal and a store receives the control signal and stores it.

The present invention furthermore relates to a music player that wirelessly transmits control signals related to the music, wherein the control signals control a wearable electronic accessory. The music player includes a store of music signal files and a controller that reads a musical signal file from the store and generates audio signals. The controller further generates the control signals. A transducer converts the audio signals into sound audible to the user and a wireless transmitter transmits the control signal to the wearable electronic accessory.

The present invention yet relates to a music player that wirelessly transmits control signals related to the music, wherein the control signals control a wearable electronic accessory. The music player includes a store of music signal files and a second store of control signal files associated with the music signal files. A controller reads a musical signal file from the store and generates audio signals. The controller further reads an associated control signal file. A transducer converts the audio signals into sound audible to the user, and a wireless transmitter transmits the control signals from the associated control signal file to the wearable electronic accessory.

The present invention also relates to a system for exhibition of music enjoyment. The system includes a source of music signals, a controller that generates control signals from the music signals, and a transmitter of the control signals. The transmission of the control signals is synchronized with the playing of the music signals. In addition, the system includes a receiver of the control signals and a transducer that responds to the control signals.

The present invention further relates to a method for transferring a wearable-accessory control file stored on a first device to a second device in which an associated music file is stored. The method includes the steps of storing on the first device the name of the music file in conjunction with the control file with which it is associated and requesting by the second device of the first device for a control file stored in conjunction with the name of the music file. In addition, the method includes the step of transferring the control file from the first device to the second device. The control file is stored on the second device in conjunction with the name of the associated music file.

The present invention also relates to a device for transmitting control signals to a wearable accessory receptive of such control signals. The device includes a manually-separable input connector for connecting to an output port of an audio player. Audio signals are conveyed from the audio player to the device across the connector. The device also includes a controller for generating control signals from the audio signals and a transmitter for transmitting the control signals.

BRIEF DESCRIPTION OF THE DRAWINGS

FIG. 19 is a table of voting schemes for the acceptance of new members into a cluster.

FIG. 20 is a time-amplitude trace of an audio signal automatically separated into beats.

FIG. 22A is a top-view diagram of an audio unit user interface, demonstrating the use of buttons to create DJ control signals.

FIG. 22B is a top-view diagram of a hand-pad for creating DJ control signals.

FIG. 22C is a schematic block diagram of a set of drums used for creating DJ control signals.

BEST MODE FOR CARRYING-OUT THE INVENTION

Overview

Figure 1:
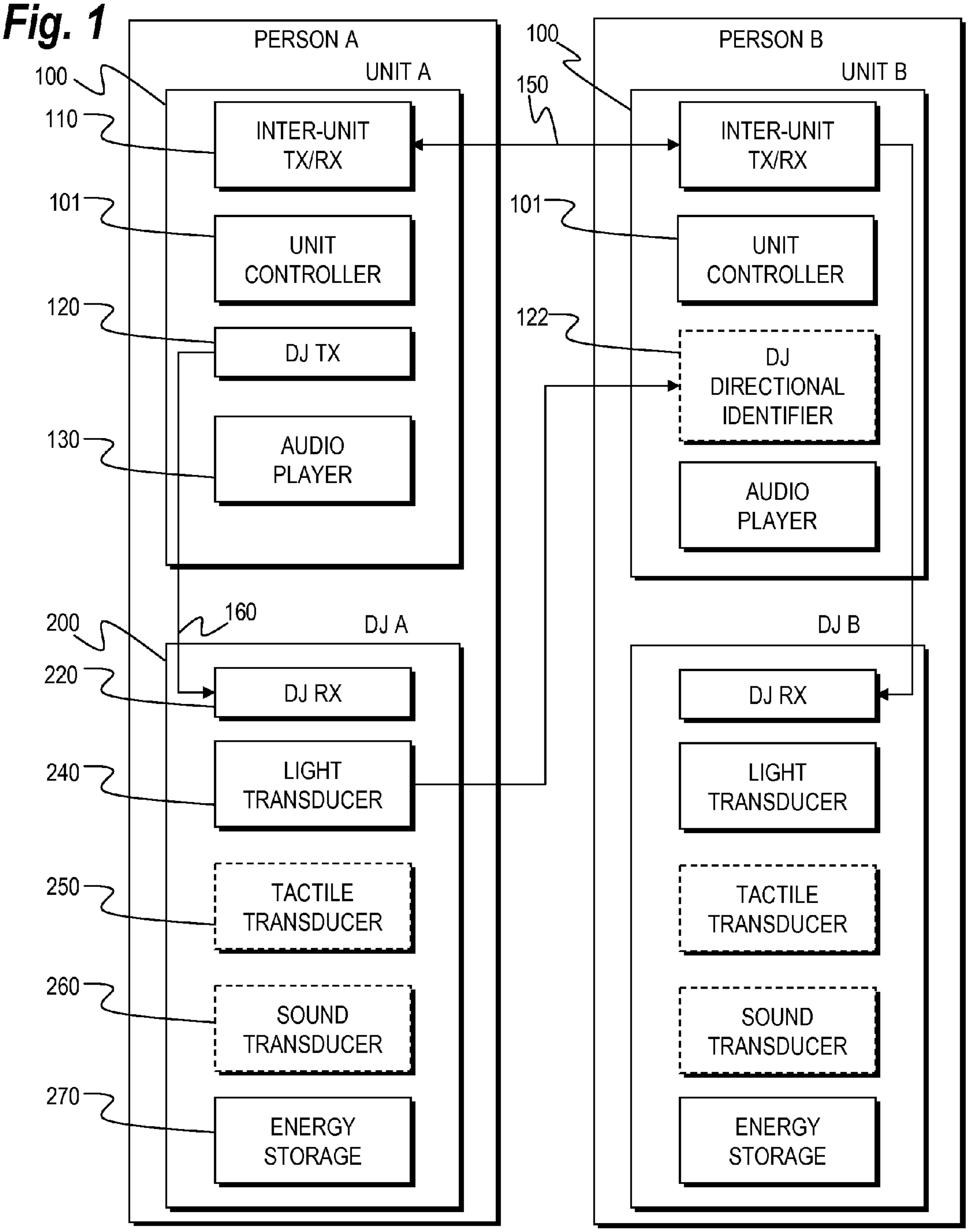
FIG. 1 is a schematic block diagram of a local audio network comprised of two linked audio units operated by two persons, and associated digital jewelry conveyed by the two persons.

FIG. 1 is a schematic block diagram of a local audio network comprised of two linked audio units 100 operated by two persons, and associated digital jewelry 200 conveyed by the two persons. The persons are designated Person A and Person B, their audio units 100 are respectively Unit A and Unit B, and their digital jewelry 200 are denoted respectively DJ A and DJ B. In this patent specification, "DJ" is used to denote either the singular "digital jewel" or the plural "digital jewelry".

Each unit 100 is comprised of an audio player 130, and an inter-unit transmitter/receiver 110. In addition, each unit 100 comprises a means of communication with the digital jewelry, which can be either a separate DJ transmitter 120 (Unit A), or which can be part of the inter-unit transmitter/receiver 110 (Unit B). Furthermore, unit 100 can optionally comprise a DJ directional identifier 122, whose operation will be described below. Also, unit 100 will generally comprise a unit controller 101, which performs various operational and executive functions of intra-unit coordination, computation, and data transfers. The many functions of the controller 101 will not be discussed separately below, but will be described with respect to the general functioning of the unit 100.

In operation, Unit A audio player 130 is playing recorded music under the control of a person to be designated User A. This music can derive from a variety of different sources and storage types, including tape cassettes, CDs, DVDs, magneto-optical disks, flash memory, removable disks, hard-disk drives or other hard storage media. Alternatively, the audio signals can be received from broadcasts using analog (e.g. AM or FM) or digital radio receivers. Unit A is additionally broadcasting a signal through DJ transmitter 120, which is received by DJ 200 through a DJ receiver 220 that is worn or otherwise conveyed by User A.

It should be noted that the audio signals can be of any sound type, and can include spoken text, symphonic music, popular music or other art forms. In this specification, the terms audio signal and music will be used interchangeably.

The DJ 200 transduces the signal received by the DJ receiver 220 to a form perceptible to the User A or other people near to him. This transduced form can include audio, visual or tactile elements, which are converted to their perceptible forms via a light transducer 240, and optionally a tactile transducer 250 or an audio transducer 260. The transducers 240, 250 and 260 can either directly generate the perceptible forms directly from the signals received by the DJ receiver 220, or can alternatively incorporate elements to filter or modify the signals prior to their use by the transducers.

When a second individual, User B, perceives the transduced forms produced by User A DJ 200, he can then share the audio signal generated by the audio player 130 of Unit A, by use of the inter-unit transmitter/receiver 110 of Unit A and a compatible receiver 110 of Unit B. Audio signals received by Unit B from Unit A are played using the Unit B audio player 130, so that User A and User B hear the audio signals roughly simultaneously. There are a variety of means by which the Unit B can select the signal of Unit A, but a preferred method is for there to be a DJ directional identifier 122 in Unit B, which can be pointed at the DJ of User A and which receives information needed to select the Unit A signal from the User A DJ, whose transduced signal is perceptible to User B.

Given the audio signal now being exchanged between Unit A and Unit B, User A and User B can experience the same audio signal roughly simultaneously. Within the spirit of the present invention, it is preferable for the two users to hear the audio signals within 1 second of one another, and more preferable for the users to hear the audio signals within 200 milliseconds of one another, and most preferable for the users to hear the audio signals within 50 milliseconds of one another. Furthermore, DJs 200 being worn by User A and User B can receive signals from their respective units, each emitting perceptible forms of their signals. Preferably, the transduced forms expressed by the DJs 200 are such as to enhance the personal or social experience of the audio being played.

Unit 100 Structure

Units 100 comprise a device, preferably of a size and weight that is suited for personal wearing or transport, which is preferably of a size and format similar to that of a conventional portable MP3 player. The unit can be designed on a "base" of consumer electronics products such as cell phones, portable MP3 players, or personal digital assistants (PDAs), and indeed can be configured as an add-on module to any of these devices.

In general, the unit 100 will comprise, in addition to those elements described in FIG. 1, other elements such as a user interface (e.g. an LCD or OLED screen, which can be combined with a touch-sensitive screen, keypad and/or keyboard), communications interfaces (e.g. Firewire, USB, or other serial communications ports), permanent or removable digital storage, and other components.

The audio player 130 can comprise one or more modes of audio storage, which can include CDs, tape, DVDs, removable or fixed magnetic drives, flash memory, or other means. Alternatively, the audio can be configured for wireless transmission, including AM/FM radio, digital radio, or other such means. Output of the audio signal so generated can comprise wireless or wired headphones or wired or wireless external speakers.

It is also within the spirit of the present invention that the unit 100 can have only receive capabilities, without having separate audio information storage or broadcast capabilities. In concept, such a device can have as little user interface as an on/off button, a button to cause the unit 100 to receive signals from a new "host", and a volume control. Such devices can be very small and be built very inexpensively.

Unit 100 Audio Output

One of the goals of the present invention is to assist communications between groups of people. In general, with mobile audio devices, the music is listened to through headphones. Many headphones are designed so as to reduce to the extent possible the amount of sound which is heard from outside of the headphones. This, however, will have the general effect of reducing the verbal communications between individuals.

In order to avoid this potential problem, it is within the teachings of the present invention that headphones or earphones be provided that allow ambient sound, including a friend's voice, to be easily perceptible to the wearer of the headphones, and that such headphones can be provided that variably allow such sound to be accessible for the headphone's wearer. Such arrangement of the headphones can be obtained either through physical or electronic means. If through electronic means, the headphones can have a microphone associated with them, through which signals received are played back in proportion through the headphone speakers, said proportion being adjustable from substantially all sound being from the microphone to substantially no sound being from the microphone. This microphone can also be a part of a noise cancellation system, such that the phase of the playback is adjustable—if the phase is inverted relative to the ambient sound signal, then the external noise is reduced, whereas if the phase is coincident with the ambient sound signal, then the ambient sounds are enhanced.

Figure 10:
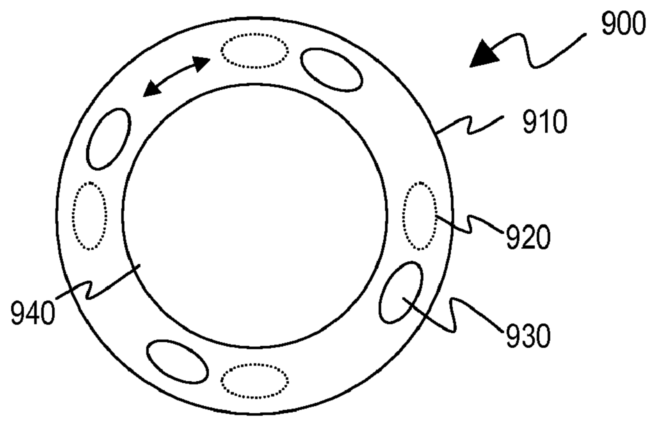
FIG. 10 is a top perspective view of an earphone with manually adjustable external sound ports.

FIG. 10 is a top perspective view of an earphone 900 with adjustable external sound ports. A speaker element 940 is centrally located, and the outside circumferential surface is a rotatable sound shield 910 in which sound ports 930 are placed. The sound ports 930 are open holes to admit sound. Beneath the sound shield 930 is a non-rotatable sound shield in which fixed sound ports 920 are placed in a similar arrangement. As the sound shield 910 is rotated manually by the user, the sound ports 930 and the fixed sound ports 920 come into registration, so that open ports between sources of ambient noise and the outer ear chamber is created, increasing the amount of ambient sound that the user perceives.

Figure 11A:
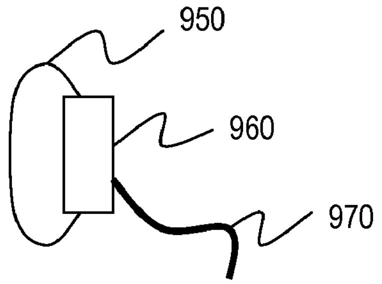
FIGS. 11A and B are cross-sectional diagrams of a earpiece with an extender to admit additional ambient sound.
Figure 11B:
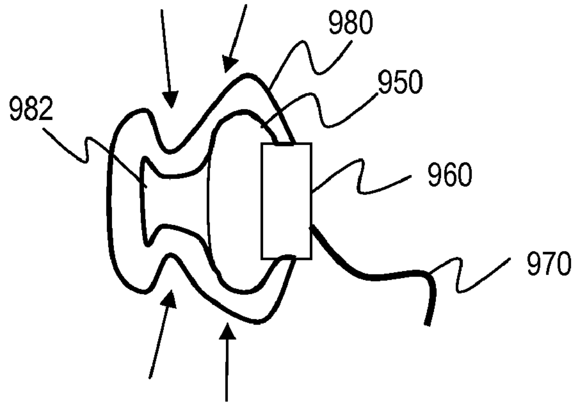

FIGS. 11A and B are cross-sectional diagrams of an earpiece with an extender 980 that admits additional ambient sound. In FIG. 11A, the face of a speaker 960 with a cord 970 is covered with a porous foam block 950 that fits snugly into the ear. While some ambient sound is accessible to the ear through the foam block 950, the majority of the sound is input is impeded. In FIG. 11B, the foam extender 980 is placed over the foam block 950 so that a formed shape at the distal end of the extender 980 fits snugly into the ear. A hollow cavity 982 can be allowed in the extender 980 so as to reduce the sound impedance from the speaker 960 to the ear. Ambient sound is allowed into the space between the speaker 960 and the distal end of the extender 980 (shown by the arrows).

Many other arrangements are allowed within the spirit of the present invention to allow ambient sound to more easily access the user's ear, including adjustable headphones or earplugs as in FIG. 10, or accessories that can modify the structure of existing earphones and headphones, as in FIG. 11B. Such effects can include increasing the number of apertures admitting ambient sound, increasing the size of an aperture (e.g. by adjusting the overlap between two larger apertures), changing the thickness or number of layers in the enclosure, or by placing a manually detachable cup that covers the earphone and ear channel so as to reduce ambient sound.

DJ 200 Transducers

DJs 200 will have a number of common elements, including communications elements, energy storage elements, and control elements (e.g. a manual ON/OFF switch or a switch to signal DJ entraining, as will be described below). In this section, the structure and function of transducers will be described.

Light Transducers 240

The DJ 200 transducers are used to create perceptible forms of the signals received by the receiver 220. Light transduction can include the use of one or more light-emitting devices, which can conveniently be colored LEDs, OLEDs, LCDs, or electroluminescent displays, which can be supplemented with optical elements, including mirrors, lenses, gratings, and optical fibers. Additionally, motors, electrostatic elements or other mechanical actuators can be used to mechanically alter the directionality or other properties of the light transducers 240. There can be either a single device or an array of devices, and if more than a single device, can display in synchrony, or can be "choreographed" to display in a temporal and/or spatial pattern.

Figure 2A:
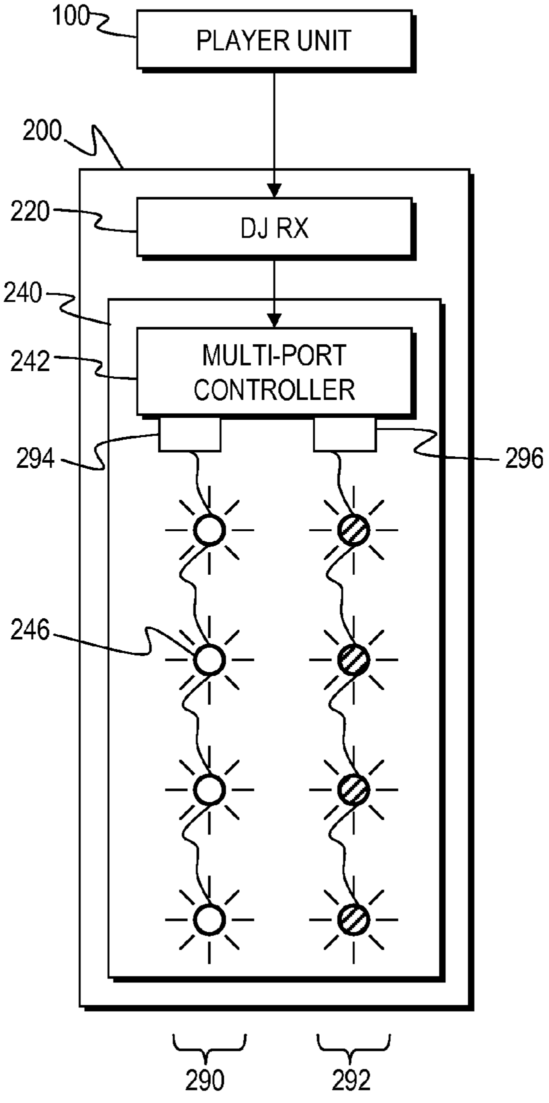
FIG. 2A is a schematic block diagram of a DJ with multiple independently controlled LED arrays.

FIG. 2A is a schematic block diagram of a DJ 200 with multiple independently controlled LED arrays, wherein the number of LED arrays is preferably between 2 and 8, and is even more preferably between 2 and 4. The signal received from unit 100 via the DJ receiver 220 is passed to a multi-port controller 242 with two ports 294 and 296 connected respectively with two separate arrays 290 and 292 of LEDs 246. These arrays 290 and 292 can be distinguished by spatial placement, color of emitted light, or the temporal pattern of LED illumination. The signal is converted via analog or digital conversion into control signals for the two arrays 290 and 292, which are illuminated in distinct temporal patterns.

It should be noted that the signal received by receiver 220 from the unit 100 can comprise either a signal already in the form required to specify the array and temporal pattern of LED 246 activity, or it can alternatively be converted from a differently formatted signal into temporal pattern signals. For example, the unit 100 can transmit a modulated signal whose amplitude specifies the intensity of LED light amplitude. For multiple LED arrays, signals for the different arrays can be sent together and decoded by the DJ receiver 220, such as through using time multiplexing, or transmission on different frequencies.

Alternatively, the signal could be not directly related to the transduction intensity, such as in the direct transmission of the audio signal being played by the unit 100. In such case, the controller 242 can modify the signal so as to generate appropriate light transduction signals. For example, low frequency bandpass filters could provide the signals for the first array 290, whereas high-frequency bandpass filters could provide the signals for the second array 292. Such filtering could be accomplished by either analog circuitry or digital software within a microprocessor in the controller 242. It is also within the spirit of the present invention for the different arrays to respond differently to the amplitude of the signal within a frequency band or the total signal.

Figure 2B:
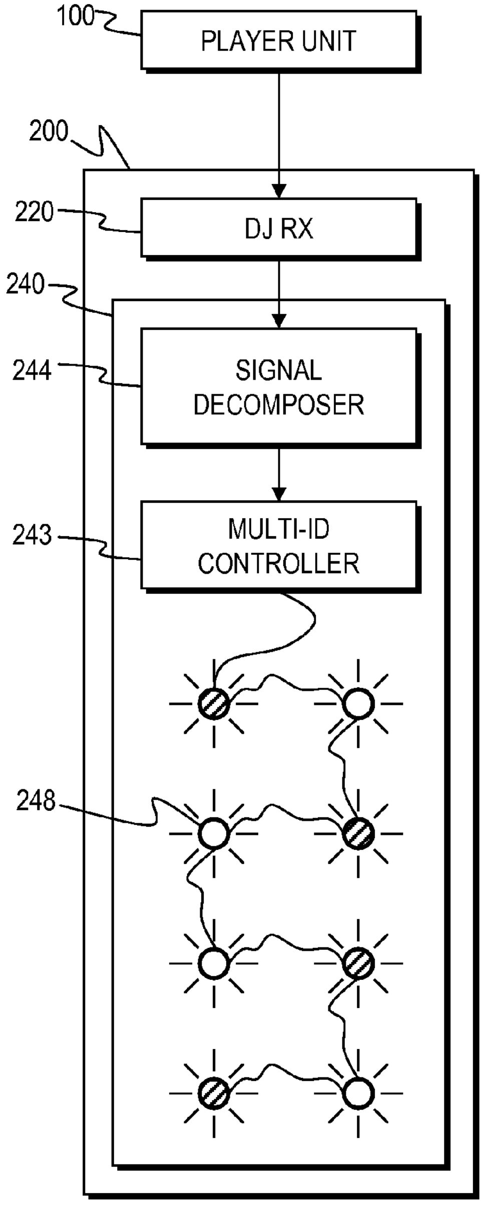
FIG. 2B is a schematic block diagram of a DJ with an LED array with independently controlled LEDs.

An alternative control of LED arrays is presented in FIG. 2B, a schematic block diagram of a DJ 200 with an LED array with independently controlled LEDs. In this case, the control signal received by the receiver 200 is passed through a single-port, multiple ID controller 243 to a single array of LEDs, each responsive only to signals with a particular characteristic or identifier. One or more of the LEDs 246 can have the same identifier or be responsive to the same characteristic so as to constitute a virtual array of LEDs.

As mentioned above, the transduced light signal can alternatively or additionally comprise multi-element arrays, such as an LED screen. In such case, the signal received by the receiver 220 can be either a specification of image elements to be displayed on the LED screen, or can be as before, a signal unrelated to the light transduction output. For example, many audio players on computers (e.g. Windows Media player) come with pattern generators that are responsive to the frequency and amplitude of the audio signal. Such pattern generators could be incorporated into the controllers 242 or 243.

Alternatively, the light transducer 240 can be a single color illuminated panel, whose temporal pattern of illumination was similar to that of the LEDs of FIGS. 2A and 2B. In such case, users can partially cover the panel with opaque or translucent patterns, such as a dog or a skull or a representation of a favorite entertainer.

Whereas the receiver 220 and the light controllers 242 or 243 can be hidden from view, either behind the light transducers or separated from the transducers by a wire, for example, the light transducers are meant to be perceptible to other people. For this purpose, the light transducers can be fashioned into fashion accoutrements such as bracelets, brooches, necklaces, pendants, earrings, rings, hair clips (e.g. barrettes), ornamental pins, netting to be worn over clothing, belts, belt buckles, straps, watches, masks, or other objects. Additionally, the light transducers can be fashioned into clothing, such as arrays of lighting elements sewn onto the outside of articles of clothing such as backpacks, wallets, purses, hats, or shoes. For those articles of clothing that are normally washed, however, the lighting transducers and associated electronics will preferably be able to withstand cleaning agents (e.g. water or dry cleaning chemicals), or will be used in clothing such as scarves and hats that do not need to be washable.

It is also convenient for there to be modular lighting arrangements in which the configuration can easily changed by a user. One example of such a modular arrangement is a light pipe made of a flexible plastic cable or rod, at one or both ends of which is positioned a light source that directs light into the rod. At predetermined locations along the rod, the rod surface can be roughened so as to allow a certain amount of light to escape, on which transparent glass or plastic pieces can be clipped, and that are lighted when the pipe is lighted. Alternatively, the light can be uniformly smooth, and transparent pieces of roughly index of refraction matching material can be clipped onto the rod, allowing some fraction of the light to be diverted from the rod into the pieces. The light sources and associated energy sources used in such an arrangement can be relatively bulky and be carried in a backpack, pouch or other carrying case, and can brightly illuminate a number of separate items.

It should be noted that the transducers require an energy store 270, which is conveniently in the form of a battery. The size of the battery will be highly dependent on the transduction requirements, but can conveniently be a small "watch battery". It is also convenient for the energy store 270 to be rechargeable. Indeed, all of the electric devices of the present invention will need energy stores or generators of some sort, which can comprise non-rechargeable batteries, rechargeable batteries, motion generators that can convert energy from the motion of the user into electrical energy that can be used or stored, fuel cells or other such energy stores or converters as are convenient.

Sound Transducers 260

Sound transducers 260 can supplement or be the primary output of the audio player of the unit 100. For example, the unit 100 can wirelessly transmit the audio signal to DJ 200 comprising a wireless headphone sound transducer. This would allow a user to listen to the audio from the audio player without the need for wires connecting the headphones to the unit 100. Such sound transducers can comprise, for example, electromagnetic or piezoelectric elements.

Alternative to headphone or earphone audio production, external speakers, which can be associated with light transducers 240 or tactile transducers 250, can be used to enhance audio reproduction from external speakers associated with the unit 100. In addition or alternative to simple reproduction of the audio signal output by the audio player 130, the sound transducers 260 can play modified or accompanying signals. For example, frequency filters can be used to select various frequency elements from the music (for low bass), so as to emphasize certain aspects of the music. Alternatively, musical elements not directly output from the audio player 130 can be output to complete all instrumental channels of a piece of music, for example.

Tactile Transducers 250

DJs 200 can be configured with tactile transducers, which can provide vibrational, rubbing, or pressure sensation. As before, signals of a format that control these transducers can be sent directly from the DJ transmitter 120, or can be filtered, modified or generated from signals of an unrelated format that are sent from the transmitter 120. As before, the signal can be the audio signal from the audio player 130, which can, for example, be frequency filtered and possibly frequency converted so that the frequency of tactile stimulation is compatible with the tactile transducer. Alternatively, signals that are of the sort meant for light transduction can be modified so as to be appropriate for tactile transduction. For example, signals for light of a particular color can be used to provide vibrational transduction of a particular frequency, or light amplitudes can be converted into pressure values.

The tactile transducer can comprise a pressure cuff encircling a finger, wrist, ankle, arm, leg, throat, forehead, torso, or other body part. The tactile transducer can alternatively comprise a rubbing device, with an actuator that propels a tactile element tangentially across the skin. The tactile transducer can also alternatively comprise a vibrational device, with an actuator that drives an element normally to the skin. The tactile transducer can further alternatively comprise elements that are held fixed in relation to the skin, and which comprise moving internal elements that cause the skin to vibrate or flex in response to the movement of the internal element.

The tactile transducer can lack any moveable element, and can confer tactile sensation through direct electrical stimulation. Such tactile elements are best used where skin conductivity is high, which can include areas with mucus membranes.

Tactile transduction can take place on any part of the body surface with tactile sensation. In addition, tactile transduction elements can be held against the skin overlying bony structures (skull, backbone, hips, knees, wrists), or swallowed and conveyed through the digestive tract, where they can be perceived by the user.

Input Transducers

Figure 24:
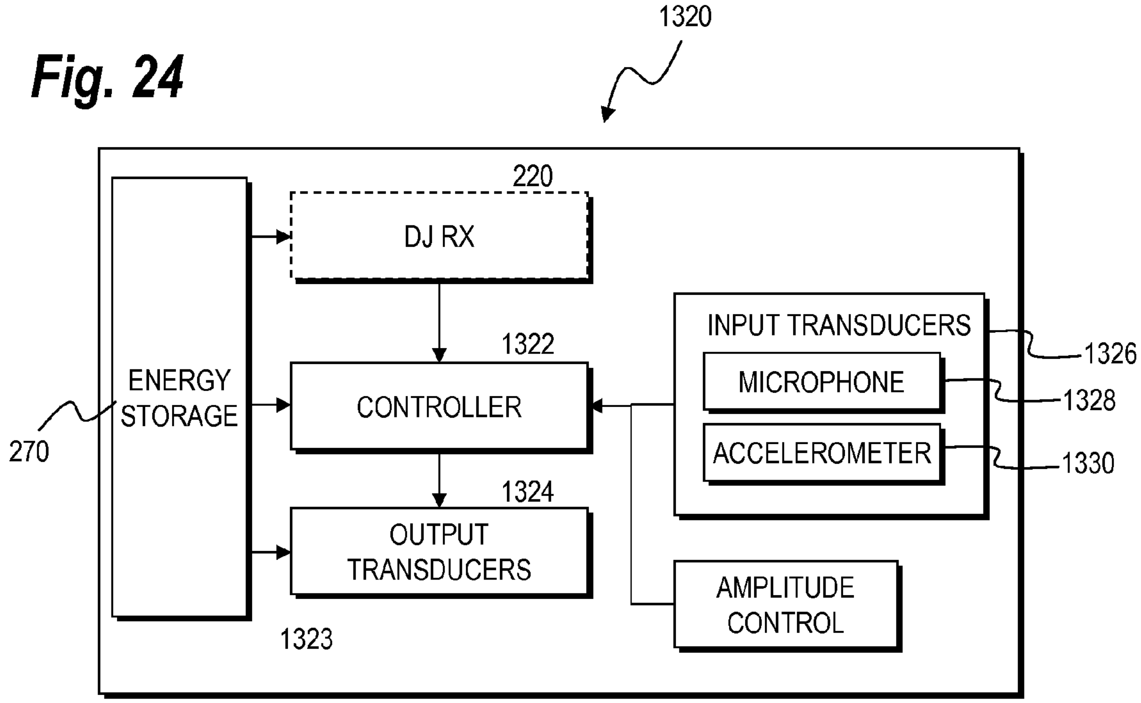
FIG. 24 is a schematic block diagram of a DJ unit with associated input transducers.

It should also be understood that the DJ 200 can comprise input transducers in order to create control signals from information or stimuli in the local environment. FIG. 24 is a schematic block diagram of a DJ unit 200 with associated input transducers. The input-enabled DJ 1320 comprises energy storage 270, a controller 1322, output transducers 1324, a DJ receiver 220 and input transducers 1326. The input transducers 1326 can comprise one or more of a microphone 1328 and an accelerometer 1330.

In operation, the energy storage 270 provides energy for all other functions in the DJ 1320. The controller 1322 provides control signals for the output transducers 1324, which can comprise tactile transducers 250, sound transducers 260, and/or light transducers 240. Input to the controller can be provided via the input transducers 1326, optionally along with input from the DJ receiver 220.

For example, on a dance floor, the microphone 1328 can provide electrical signals corresponding to the ambient music. These signals can be converted into transducer 1324 control signals in a manner similar to that described below for the automatic generation of control signals according to FIGS. 21A-C, as will be described below. This allows the use of the DJ functionality in the absence of an accompanying audio unit 100, expanding the applications of the DJ 200. An automatic gain filter can be applied so as to compensate for the average volume level—because the user can be close or far from the sources of ambient music and the music can vary in volume, the strength of the DJ 200 transduction can be normalized. In addition, it can also be preferable for there to be a manual amplitude control 1323, such as a dial or two position rocker switch, by which the average intensity of the DJ 200 control signals can be varied to suit the taste of the user. The amplitude control 1323 can operate through modulating the input transducer 1326 output or as an input to the controller 1322 as it generates the signals for the output transducers 1324.

Alternatively, the accelerometer 1330 can track the movement of the person wearing the DJ 100, such that a signal indicating acceleration in one direction can be converted by the controller 1322 into signals for a channel of output transducers 1324. The accelerometer 1330 can be outfitted with sensors for monitoring only a single axis of motion, or alternatively for up to three independent directions of acceleration. Thus, the controller 1322 can convert sensed acceleration in each direction into a separate channel, horizontal axes of acceleration could be combined into a single channel and the vertical axis into a second channel, or other such linear or non-linear combination of sensed acceleration can be combined in aesthetic fashion.

It is also within the spirit of the present invention that multiple input signals be combined by the controller 1322 to create control signals for aesthetic output from the output transducers 1324. For example, one channel can be reserved for control signals generated from accelerometer signals, another channel for control signals generated from microphone signals, and yet a third channel from control signals generated from DJ receiver 220 input. In general, the information from the DJ receiver 220 and from the microphone 1328 will be of the same type (i.e. generated from audio signals), so that the most common configurations will be control signals from a combination of the microphone 1328 and accelerometer 1330, and signals from a combination of the DJ receiver 220 and the accelerometer 1330.

The input transducers 1326 can further comprise a light sensor, such that the DJ would mimic light displays in its environment, making it appear that the DJ is part of the activity that surrounds it. In this case, the controller 1322 would preferably generate control signals based on rapid changes in the ambient lighting, since it would be less aesthetic to have the DJ transducers provide constant illumination. Furthermore, slowly changing light (on the order of tens or hundreds of milliseconds) will be created naturally by the movement of the user, whereas changes in the lighting (e.g. strobes, laser lights, disco balls) will be of much faster change (on the order of milliseconds). Thus, to match the ambient dance lighting, it is aesthetic for the DJ 200 to respond most actively to ambient light that is changing in intensity a predetermined percentage in a predetermined time, wherein the predetermined percentage is at least 20% and the predetermined time is 20 milliseconds or less, and even more preferably for the predetermined percentage to be at least 40% and the predetermined time is 5 milliseconds or less.

Unit to Unit Communication

Figure 3A:
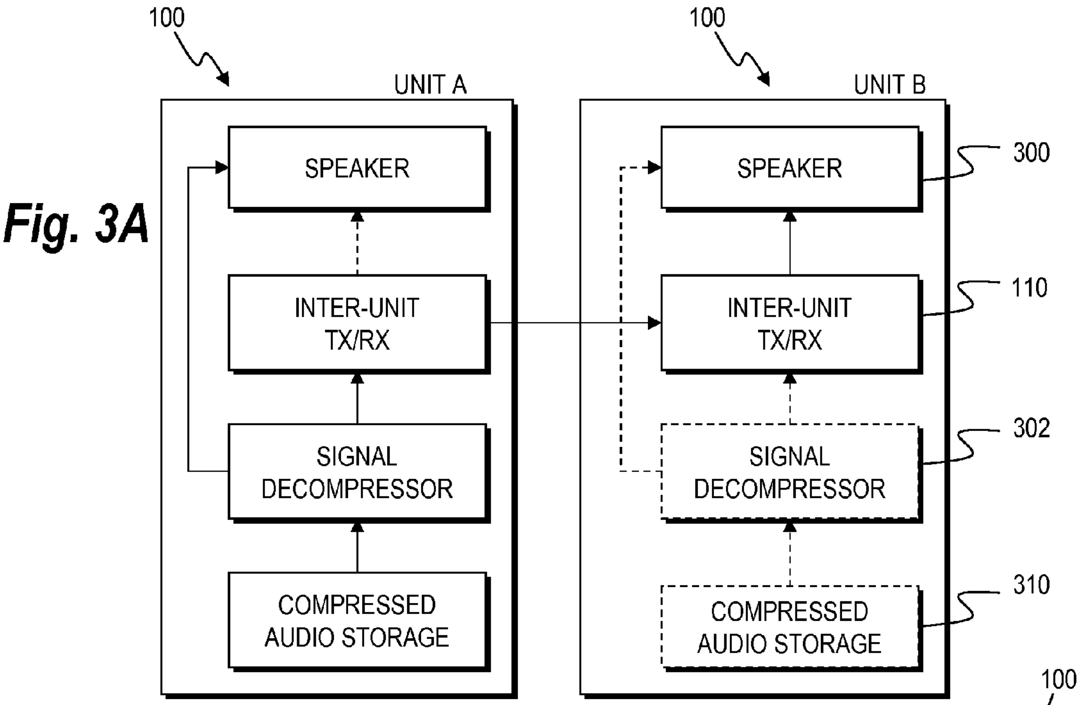
FIGS. 3A-C are schematic block diagrams of unit elements used in inter-unit communications.
Figure 3B:
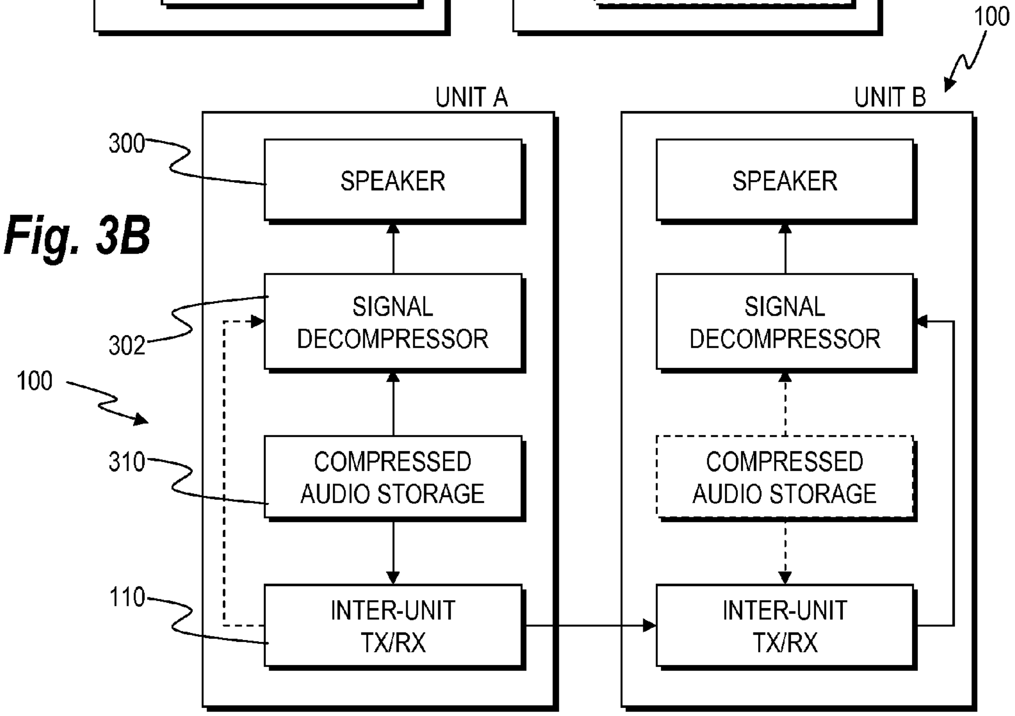
Figure 3C:
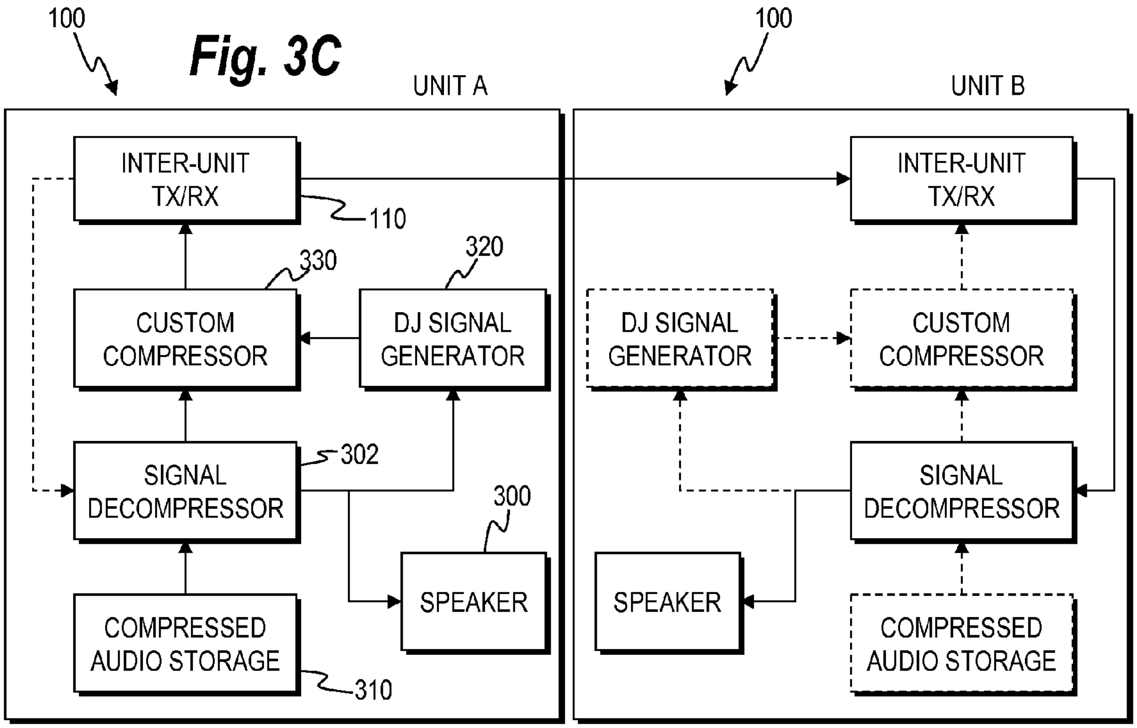

Units 100 transfer audio signals from the audio player in one unit 100 to the audio player 130 of another unit 100. FIGS. 3A-C are schematic block diagrams of unit 100 elements used in inter-unit communications. Each diagram presents communications between a Unit A and a Unit B, with Unit A transmitting audio signals to Unit B. Dashed connectors and elements indicate elements or transfers that are not being utilized in that unit 100, but are placed to indicate the equivalence of the transmitting and receiving units 100.

In FIG. 3A, compressed audio signals (e.g. in MP3 format or MPEG4 format for video transfers, as described below) stored in a compressed audio storage 310 are transferred to a signal decompressor 302, where the compressed audio signal is converted into an uncompressed form suitable for audio output. In Unit A, this decompressed signal is passed both to the local speaker 300, as well as to the inter-unit transmitter/receiver 110. The Unit B inter-unit transmitter-receiver 110 receives the uncompressed audio signal, which is sent to its local speaker for output. Thus, both Unit A and Unit B play the same audio from the Unit A storage, in which uncompressed audio is transferred between the two units 100.

In FIG. 3B, compressed audio signals from the Unit A compressed audio storage 310 are sent both to the local signal decompressor 302 and to the inter-unit transmitter/receiver 110. The Unit A decompressor 302 conditions the audio signal so that it is suitable for output through the Unit A speaker 300. The compressed audio signal is sent via Unit A transmitter-receiver 110 to the Unit B transmitter/receiver 110, where it is passed to the Unit B decompressor 302 and thence to the Unit B speaker 300. In this embodiment, because compressed audio signals are transmitted between the units 100 transmitter/receivers 302, lower bandwidth communications means can be used in comparison with the embodiment of FIG. 3A.

In FIG. 3C, compressed audio signals from the Unit A compressed audio storage 310 are sent to the Unit A signal decompressor 302. These decompressed signals are sent to both the local speaker 300 as well as to a local compressor 330, which recompresses the audio signal to a custom format. In addition to decompressed audio signal input, the compressor also optionally utilizes information from a DJ signal generator 320, which generates signals to control DJ transducers 240, 250 and 260, which can be sent in conjunction with the audio signal. The signal generator 320 can include analog and/or digital filtering or other algorithms that analyze or modify the audio signals, or can alternatively take manually input transducer control signals input as described below. The custom compression can include multiplexing of the audio signals with the transducer control signals.

The custom compressed audio signals, are then passed to the Unit A inter-unit transmitter/receiver 110, which are then transferred to the Unit B inter-unit transmitter/receiver 110, and thence to the Unit B signal decompressor 302 and speaker 300.

Given the time delays in signal transfer between the units 100, custom compression that takes place in the sending unit, and any subsequent decompression that takes place in the receiving unit 100, it can be convenient to place a delay on the local (i.e. Unit A) speaker output of tens of milliseconds, so that both units 100 play the audio through their speakers at roughly the same time. This delay can include limited local digital storage between the local signal decompression and speaker 300 output.

Various hardware communications protocols will be discussed below with respect to unit-to-unit communications, but in general it is required that the distance between the units that must be maintained be preferably at least 40 feet, and more preferably at least 100 feet, and most preferably 500 feet, in order to allow units 100 sharing music to be able to move reasonably with respect to one another (e.g. for a user to go to the bathroom without losing contact), or to find each other in a large venue such as a shopping mall.

Communications Protocols

Communication between the inter-unit transmitter/receivers 110 can involve a variety of protocols within the teachings of the present invention, and can include IP protocol-based transmissions mediated by such physical link layers as 802.11a, b or g, WDCT, HiperLAN, ultra-wideband, 2.5 or 3G wireless telephony communications, custom digital protocols such as Bluetooth or Millennial Net i-Beans. Indeed, it is not even necessary for the transmissions to be based on Internet protocol, and conventional analog radio-frequency or non-IP infrared transmissions are also within the spirit of the present invention. Each unit 100 will generally have both transmission and reception capabilities, though it is possible for a unit to have only reception capabilities. While the bandwidth of the broadcast is dependent on the compression of the audio signal, it is preferable for the transmission bandwidth to be larger than 100 kb/sec, and even more preferable for the transmission bandwidth to be greater than 250 kb/sec.

While the distance of transmission/reception is not bounded within the teachings of the present invention, it will generally be less than a few hundred meters, and often less than 50 meters. The distance of communication is limited in general by the amount of power required to support the transmission, the size of antennae supported by portable devices, and the amount of power allowed by national regulators of broadcast frequencies. Preferably, however, the range of transmission will be at least 10 meters, and even more preferably at least 30 meters, in order to allow people sharing communications to move some distance from one another without communications being lost.

The unit 100 is characterized generally by four sets of roughly independent characteristics: playing audio or not playing audio, transmitting or not transmitting, receiving or not receiving, searching or not searching.

Units 100 will often function in conditions with large numbers of other units 100 within the communications range. For example, in a subway car, a classroom, bicycling, or at a party, a unit 100 can potentially be within range of dozens of other units. A unit 100 that is playing audio from local compressed audio storage 310 can, at the user's prerogative, choose to broadcast this audio to other units 100. A unit 100 that is currently "listening" to a broadcast or is searching for a broadcast to "listen" to will require a specific identifier roughly unique to a broadcaster in order to select that broadcaster signal from among the other possible broadcasters. Some of the communications protocols listed above, such as those based on IP protocols, 2.5G or 3G wireless, or Bluetooth communications, have such identifiers as part of the protocols. Custom radio frequency based protocols will require protocols to allow signals to be tagged with specific identifiers.

A unit 100 that is transmitting signals can, within the spirit of the present invention, be prevented from simultaneously receiving signals. Preferably, however, units 100 can both transmit and receive simultaneously. One example of the use of simultaneous transmission and reception is for a unit 100 that is receiving a signal to send a signal indicating its reception to the transmitting unit 100. This allows the transmitting unit to determine the number of units 100 that are currently receiving its broadcast. In return, this information could be sent, along with the audio signal, so that all of the users with units 100 receiving the broadcast can know the size of the current reception group. Alternatively, a user with a unit 100 that is currently broadcasting can be searching for other broadcasting units, so that the user can decide whether to continue broadcasting or whether to listen to the broadcast of another unit.

Unit to DJ Communication

Communication between the unit 100 and the DJ 200 can be either through the inter-unit transmitter/receiver 110, or through a separate system. In general, the requirement of the DJ 200 is for reception only, although it is permissible for the DJ 200 to include transmission capabilities (e.g. to indicate to the unit 100 when the DJ 200 energy storage 270 is near depletion).

The signals for which the DJ 200 is receptive is dependent on how the transduction control signals are generated. For example, for a controller 242 that incorporates a filter or modifier that takes the audio signal as its input, the DJ receiver 220 would receive all or a large fraction of the audio signal. In this case, the communication between the unit 100 and the DJ 200 would require a bandwidth comparable to that of inter-unit communication, as described above.

However, if the signals are either generated in the unit 100, or pre-stored along with the stored compressed audio signal, then the communications bandwidth can be quite modest. Consider a DJ 200 with 2 arrays 290 and 292 of LEDs 246, which flash with a frequency of no more than 10 Hertz, and that the LEDs are in either an ON or an OFF state, without intermediate amplitudes. In such case, the maximum bandwidth required would be only 20 bits/second, in addition to the DJ control signals.

The range of unit to DJ communications need not be far. In general, the unit 100 and the DJ 200 will be carried by the same user, so communications ranges of 10 feet can be adequate for many applications. Some applications (see below) can require, however, somewhat larger ranges. On the other hand, longer communications ranges will tend to confer the possibility of overlap and interference between two different units 100 to their respective DJs 200. In general, for the application of unit to DJ communications, it is preferable for the minimum range of communications to be at least 1 foot, and more preferably for the minimum range of communications to be at least 10 feet, and most preferably for the minimum range of communications to be at least 20 feet. Also, for the application of unit to DJ communications, it is preferable for the maximum range of communications to be no more than 500 feet, and more preferably for the maximum range of communications to be no more than 100 feet, and most preferably for the maximum range of communications to be no more than 40 feet. It should be noted that these communications ranges refer primarily to the transmission distance of the units 100, especially with regard to the maximum transmission distance.

Because there can be multiple unit 100/DJ 200 ensembles within a relatively short distance, communications between a unit 100 and a DJ 200 preferably comprise both a control signal as well as a unit identification signal, so that each DJ 200 receives its control signals from the correct unit 100. Because the unit 100 and the DJ 200 will not, in general, be purchased together, or that a user can buy a new unit 100 to be compatible with already owned DJs 200, it is highly useful to have a means of "entraining" a DJ 200 to a particular unit 100, called its "master unit", and a DJ 200 entrained to a master unit is "bound" to that unit.

Figure 4:
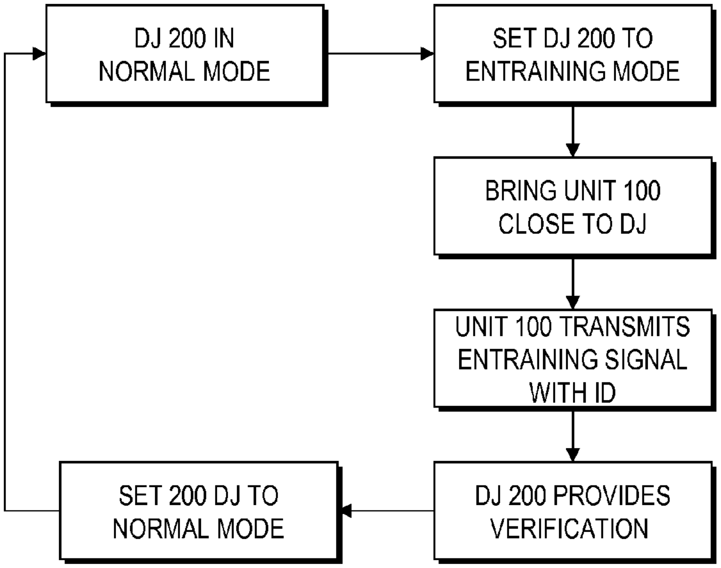
FIG. 4 is a schematic flow diagram of DJ entraining.

FIG. 4 is a schematic flow diagram of DJ entraining. To entrain a DJ 200, the DJ is set into entraining mode, preferably by a physical switch on the DJ 200. The master unit 100 to which the DJ 200 is to be entrained is then placed within communications range, and the unit 100 transmits through the DJ transmitter 120 an entraining signal that includes the master unit 100 identifier. Even should there be other units 100 transmitting in the vicinity, it is unlikely that they would be transmitting the entraining signal, so that entraining can often take place in a location with other active units 100. Verification that the entraining took place can involve a characteristic sequence of light output (for light transduction), audio output (for sound transduction) or motion (for tactile transduction). After verification, the DJ 100 is reset to its normal mode of operation, and will respond only to control signals accompanied by the identifier of its master unit 200.

It should be noted that there can be multiple DJ's 200 bound to the same master unit 100. Thus, a single person can have multiple light transducing DJs 200, or DJs 200 of various modes (light, sound, tactile) transduction.

Figure 5A:
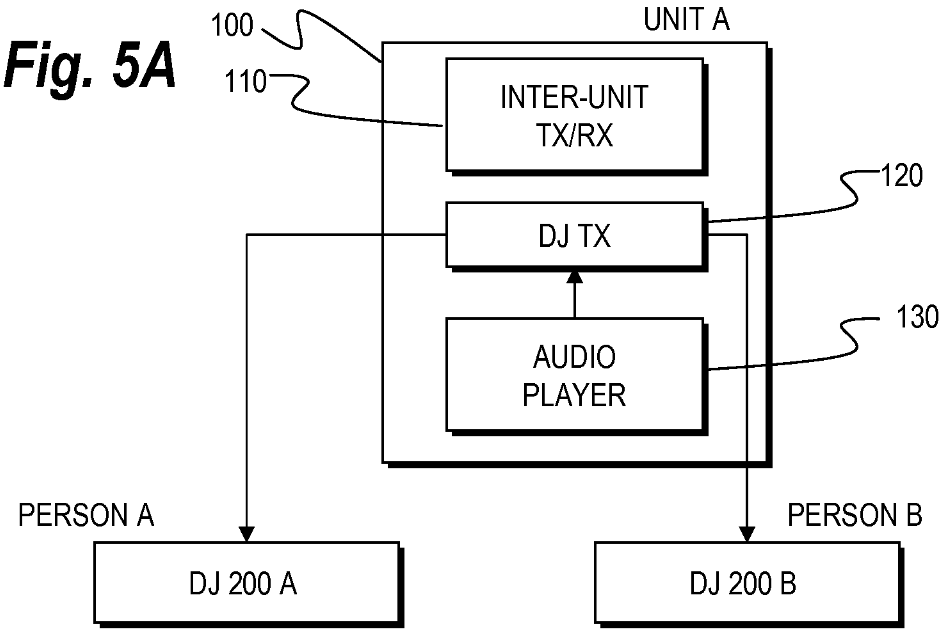
FIGS. 5A-B are schematic block diagrams of DJs associated with multiple people bound to the same master unit.
Figure 5B:
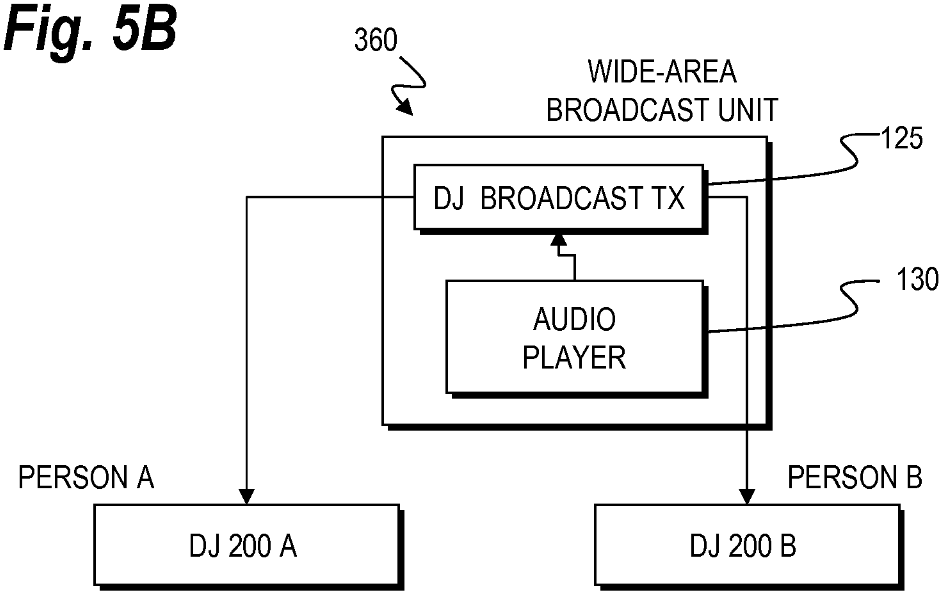

While DJs 200 will generally be bound to a master unit associated with the same person, this is not a requirement of the present invention. FIGS. 5A-B are schematic block diagrams of DJs 200 associated with multiple people bound to the same master unit. In FIG. 5A, DJ A 200 and DJ B 200 are both bound to the same DJ transmitter 120, even though DJ A 200 and DJ B 200 are carried by different persons. This is particularly useful if the control signals are choreographed manually or through custom means by one person, so that multiple people can then share the same control signals. Such a means of synchronization is less necessary if the DJ 200 control signals are transmitted between units 100 through the inter-unit transmitter/receiver 110 along with the audio signals. Furthermore, in this case, it is better for the range of unit-to-DJ communication to be in the range of the inter-unit communication described above.

In the case of sound transducers 260, the DJ B 200 can comprise a wireless audio earpiece, allowing users to share music, played on a single unit 100, privately. Consider FIG. 5A, configured with sound transducers 260 (see, for example, FIG. 1) in DJ A 200 and DJ B 200. Signals from the audio player 130 are transmitted by the DJ transmitter 120, where they are received by DJs 200—DJ A and DJ B—that are carried by Person A and Person B, respectively. In this case, both persons can listen to the same music.

FIG. 5B shows the operation of a wide-area broadcast unit 360, which is used primarily to synchronize control of a large number of DJs 200, such as might happen at a concert, party or rave. In this case, the audio player 130 is used to play audio to a large audience, many of whom are wearing DJs 200. In order to synchronize the DJ output, a relatively high-power broadcast transmitter 125 broadcasts control signals to a number of different DJs 200 carried by Person A, Person B and other undesignated persons. The entraining signal can be automatically sent on a regular basis (e.g. whenever music is not being played, such as between songs, or interspersed within compressed or decompressed songs) so that patrons or partygoers could entrain their DJs 200 to the broadcast unit 360. The broadcast unit 360 can also transmit inter-unit audio signals, or can only play the audio through some public output speaker that both Person A and Person B can enjoy.

Figure 26:
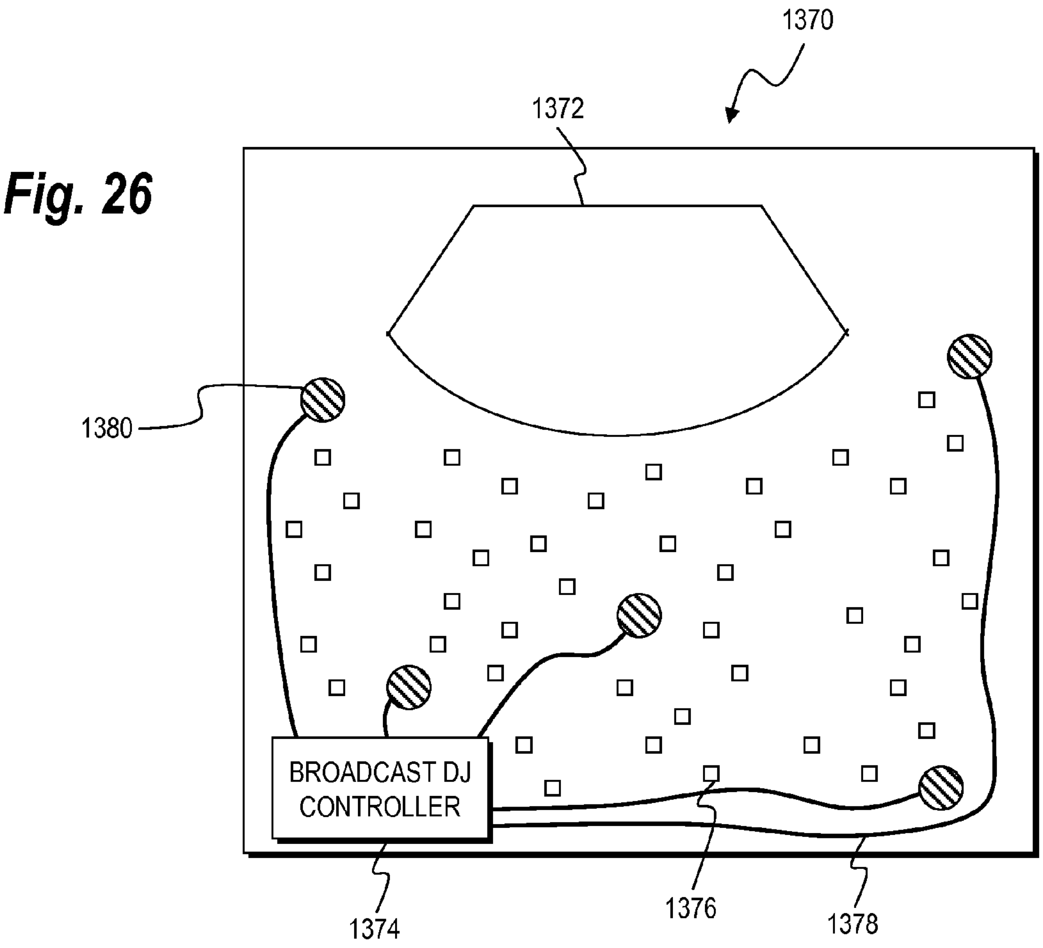
FIG. 26 is a schematic diagram of people at a concert, in which DJs conveyed by multiple individuals are commonly controlled.

FIG. 26 is a schematic diagram of people at a concert, in which DJs 200 conveyed by multiple individuals are commonly controlled. At a concert venue 1370, music is produced on a stage 1372, and concert patrons 1376 are located on the floor of the venue. Many of the patrons have DJs 200 which are receptive to signals generated by a broadcast DJ controller 1374. The broadcast DJ controller creates signals as described below, in which the music is automatically converted into beats, where microphones are used to pick up percussive instruments, and/or where individuals use a handpad to tap out control signals. These control signals are either broadcast directly from the area of the broadcast DJ controller 1374, or alternatively are broadcast from a plurality of transmitters 1380 placed around the venue 1370, and which are connected by wires 1378 to the controller 1374 (although the connection can also be wireless within the spirit of the present invention). It should be understood that the protocol for transmitting DJ control signals can be limited either by hardware requirements or by regulatory standards to a certain distance of reception. Thus, to cover a sufficiently large venue, multiple transmitters can be necessary to provide complete coverage over the venue 1370. In general, it is preferable for the maximum transmission distance of transmission from the transmitters to be at least 100 feet, and more preferably at least 200 feet, and most preferably at least 500 feet, so as to be able to cover a reasonable venue 1370 size without needing too many transmitters 1380.

An alternative embodiment of unit 100 to DJ 200 communications is the use of radio frequency transmitters and receivers, such as those used in model airplane control, which comprise multi-channel FM or AM transmitters and receivers. These components can be very small (e.g. the RX72 receivers from Sky Hooks and Riggings, Oakville, Ontario, Canada), and are defined by the crystal oscillators that determine the frequency of RF communications. Each channel can serve for a separate channel of DJ control signals. In such cases, an individual can place a specific crystal in their audio unit 100, and entraining the DJ 200 is then carried out through the use of the same crystal in the DJ 200. Because of the large number of crystals that are available (e.g. comprising approximately 50 channels in the model aircraft FM control band), interference with other audio units 100 can be minimized. Furthermore, control of many DJs 200 within a venue, as described above, can take place by simultaneously transmitting over a large number of frequencies.

As described above, the wide-area broadcast transmitter 125 can transmit entraining signals to which the DJs 200 can be set to respond. However, there are a number of other preferred means by which DJs 200 can be used to respond to control signals to which they have not been entrained. For example, the DJs 200 can be set to respond to controls signals to which they have not been entrained should there be no entrained control signals present (e.g. the corresponding unit 100 is not turned on).

Figure 35:
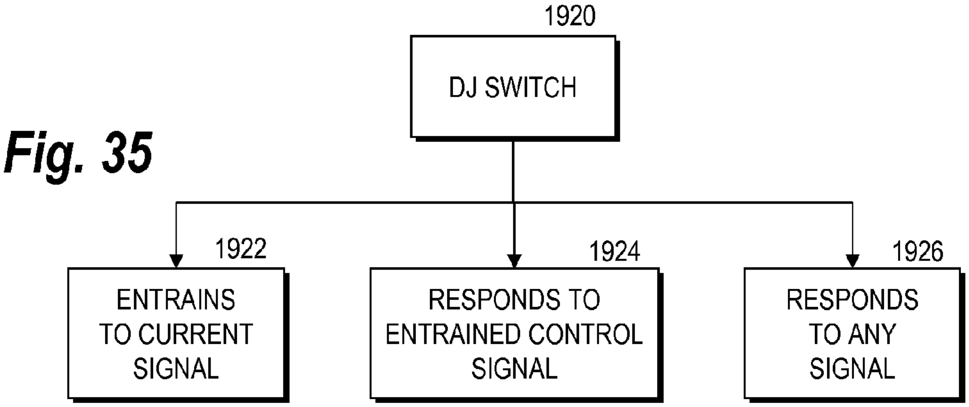
FIG. 35 is a schematic block diagram of DJ switch control for both entraining and wide-area broadcast.

FIG. 35 is a schematic block diagram of DJ 200 switch control for both entraining and wide-area broadcast. The DJ 200 comprises a three-way switch 1920. In a first state 1922, the DJ 200 is entrained to the current control signal as described above. Thereafter, in a second state 1924, the DJ 200 responds to control signals corresponding to the entraining signal encountered in the step 1922. In a third state 1926, the DJ 200 responds to any control signal for which its receiver is receptive, and can therefore respond to a wide-area broadcast, thereby providing the user with manual control over the operational state of the DJ 200. It should be noted that the switch 1920 can be any physical switch with at least three discreet positions, or can alternatively be any manual mechanism by which the user can specify at least three states, including a button presses that have a visible user interface or a voice menu.

Figure 12A:
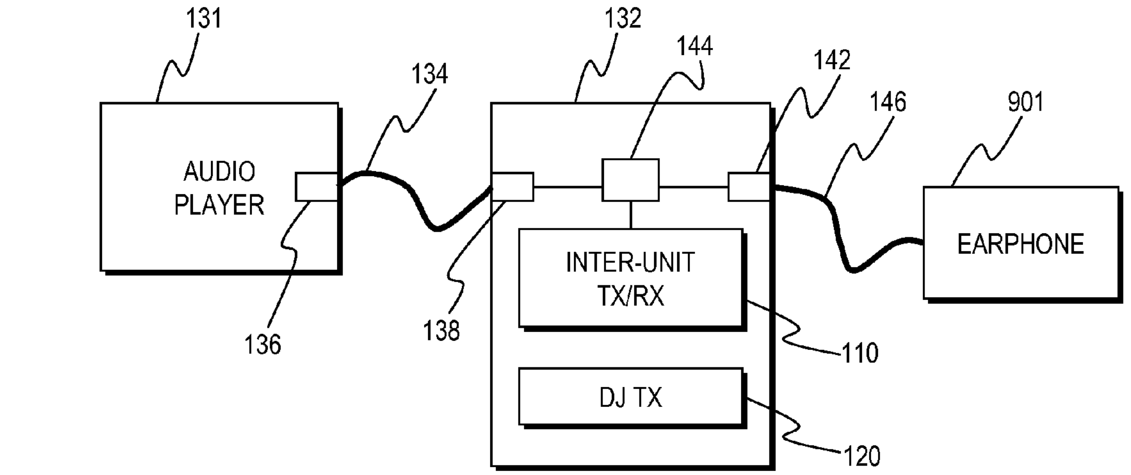
FIG. 12A is a schematic diagram of a modular audio unit.
Figure 12B:
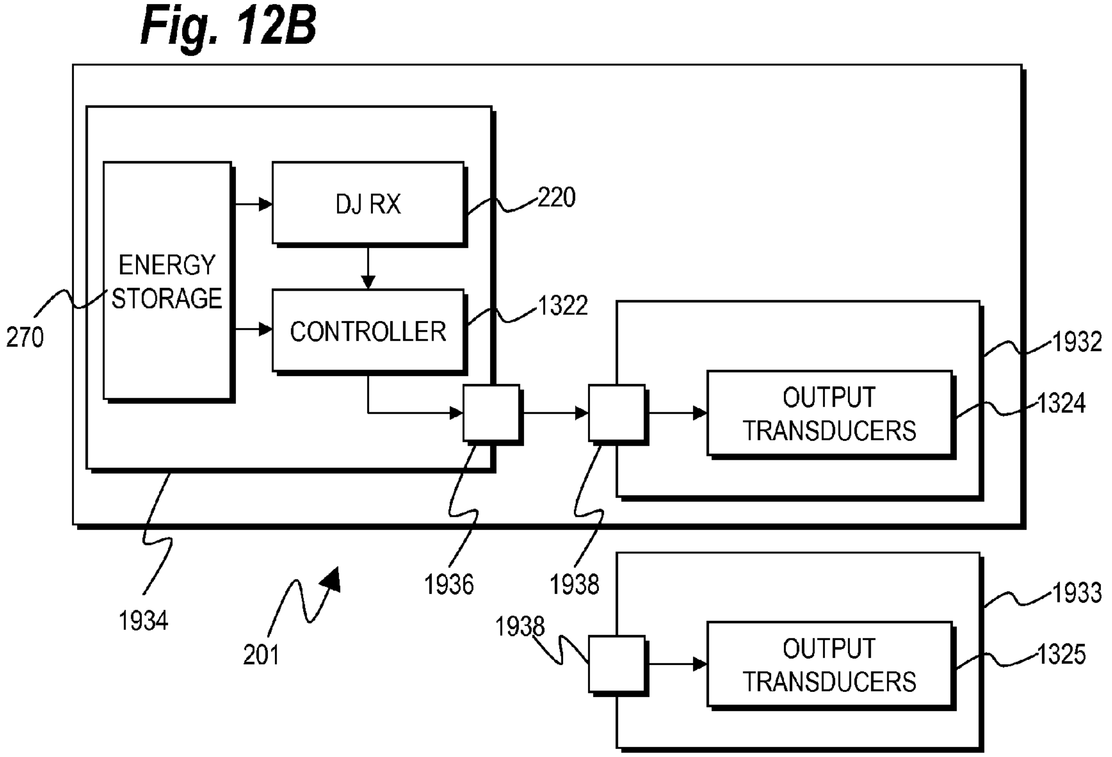
FIG. 12B is a schematic diagram of modular digital jewelry.

FIG. 12B is a schematic drawing of modular digital jewelry 201. The modular jewelry 201 is comprised of two components: an electronics module 1934 and a display module 1932. These modules 1934 and 1932 can be electrically joined or separated through an electronics module connector 1936 and a display module connector 1938. The value of the modular arrangement is that the electronics module 1934 comprises, in general, relatively expensive components, whose combined price can be many-fold that of the display module 1932. Thus, if a user wants to change the appearance of the jewelry 201 without having to incur the cost of additional electronics components such as the energy storage 270, receiver 220 or controller 1322, they can simply replace the display module 1932 with its arrangement of output transducers 1324 with an alternative display module 1933 with a different arrangement of output transducers 1325.

Figure 12C:
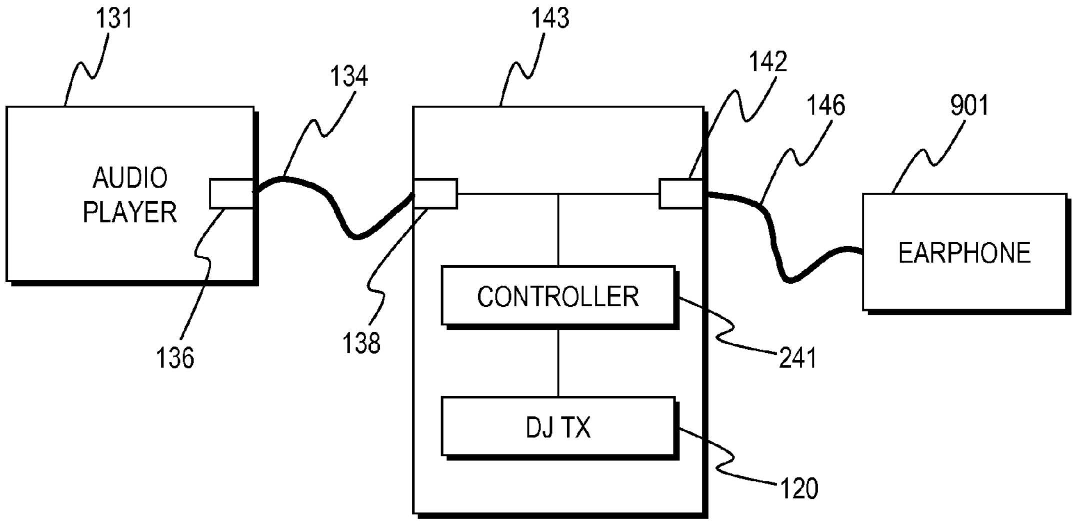
FIG. 12C is a schematic block diagram of a modular transmitter that generates and transmits control signals for digital jewelry from an audio player.

The transmitter for DJ 200 control signals has been previously discussed primarily in terms of its incorporation within a unit 100. It should be understood, however, that the transmitter can be used in conjunction with a standard audio player unrelated to unit-to-unit communications. FIG. 12C is a schematic block diagram of a modular digital jewelry transmitter 143 that generates and transmits control signals from an audio player 131. The modular transmitter 143 is connected to the audio player 131 via audio output port 136 through the cable 134 to the audio input port 138 of the modular transmitter 143. The modular transmitter 143 comprises the the DJ transmitter 120, which can send unit-to-DJ communications. The output audio port 142 is connected to the earphone 901 via cable 146. The earphone 901 can also be a wireless earphone, perhaps connected via the DJ transmitter 120.

The audio output from the player 131 is split both to the earphone 901 and to the controller 241 (except, perhaps where the DJ transmitter transmits to a wireless earphone). The controller 241 automatically generates control signals for the DJ 200 in a manner to be described in detail below. These signals are then conveyed to the DJ transmitter 120. It should be understood that this arrangement has the advantage that the digital jewelry functionality can be obtained without the const of the components for the audio player 131, and in addition, that the modular transmitter 143 can then be used in conjunction with multiple audio players 131 (either of different types or as the audio players are lost or broken).

Inter-unit Audio Sharing

Overview

Inter-unit communication involves the interactions of multiple users, who may or may not be acquaintances of each other. That is, the users can be friends who specifically decide to listen to music together, or it can be strangers who share a transient experience on a subway train. The present invention supports both types of social interaction.

Figure 6:
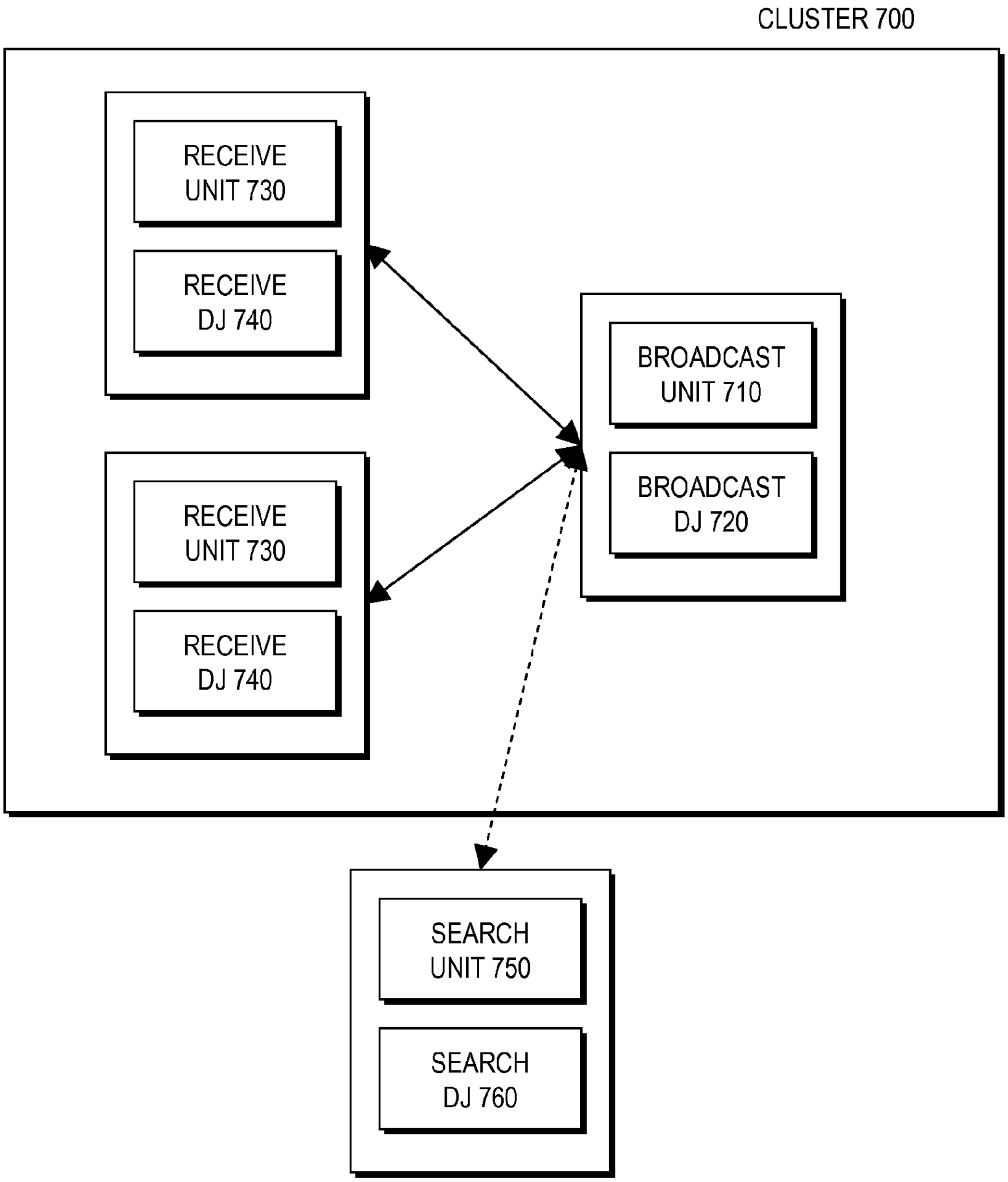
FIG. 6 is a schematic block diagram of a cluster comprising a broadcast unit and multiple receive units, with an external search unit.

An important aspect of the present invention is the means by which groups of individuals join together. FIG. 6 is a schematic block diagram of a cluster 700 of units 100, indicating the nomenclature to be used. The cluster 700 is comprised of a single broadcast unit 710, and its associated broadcast DJ 720, as well as one or more receive units 730 and their associated DJs 740. The broadcast unit 710 transmits music, while the receive unit 730 receives the broadcasted music. A search unit 750 and its associated search DJ 760 are not part of the cluster 700, and comprise a unit 100 that is searching for a broadcast unit 710 to listen to or a cluster 700 to become associated with.

It should be noted that many communications systems can be operated alternatively in two modes: one that supports peer-to-peer communications and one that requires a fixed infrastructure such as an access point. FIG. 35 is a schematic block diagram of mode switching between peer-to-peer and infrastructure modes. A mode switch 1950 is made by the user, either manually, or automatically—for example, that the user chooses between different functions (listening or broadcasting, file transfers, browsing the Internet) and the system determine the optimal mode to use. A peer-to-peer mode 1952 is well configured for mutual communications between mobile units 100 that are within a predetermined distance, and is well-suited for short-range wireless communications and audio data streaming 1954. Alternatively, the mode switch 1950 enables an infrastructure mode 1956, which is of particular usefulness in gaining access to a wide area network such as the Internet, through which remote file transfer 1958 (e.g. downloading and uploading) and remote communications such as Internet browsing can be made through access points to the fixed network.local wireless audio streaming.

It should be noted, however, that certain communications systems, such as many modes of telephony, do not distinguish between mobile communications and communications through fixed access points, and that both file transfer 1958 and audio streaming 1954 can be available through the same mode. Even in those cases, however, it can be convenient to have two modes in order to make optimal use of the advantages of the different modes. In such cases, however, the two modes can alternatively be supported by multiple hardware and software systems within the same device—for example, for remote communications to be made through a telephony system (e.g. GSM or CDMA), while the local audio streaming 1954 can be made through a parallel communications system (e.g. Bluetooth or 802.11)—indeed, the two systems can operate simultaneously with one another.

Inter-unit Transmission Segmentation

Preferably, the broadcast unit 710 and the receive units 730 exchange information in addition to the audio signal. For example, each user preferably has indications as to the number of total units (broadcast units 710 and receive units 730) within a cluster, since the knowledge of cluster 700 sizes is an important aspect of the social bond between the users. This also will help search units 750 that are not part of the cluster determine which of the clusters 700 that might be within their range are the most popular.

The additional information shared between members of a cluster 700 would include personal characteristics that a person might allow to be shared (images, names, addresses, other contact information, or nicknames). For example, the broadcast unit 710 will preferably, along with the music, transmit their nickname, so that other users will be able to identify the broadcast unit 710 for subsequent interactions, and a nickname is significantly easier to remember than a numerical identifier (however, such numerical identifier can be stored in the unit 100 for subsequent searching).

Figure 7:
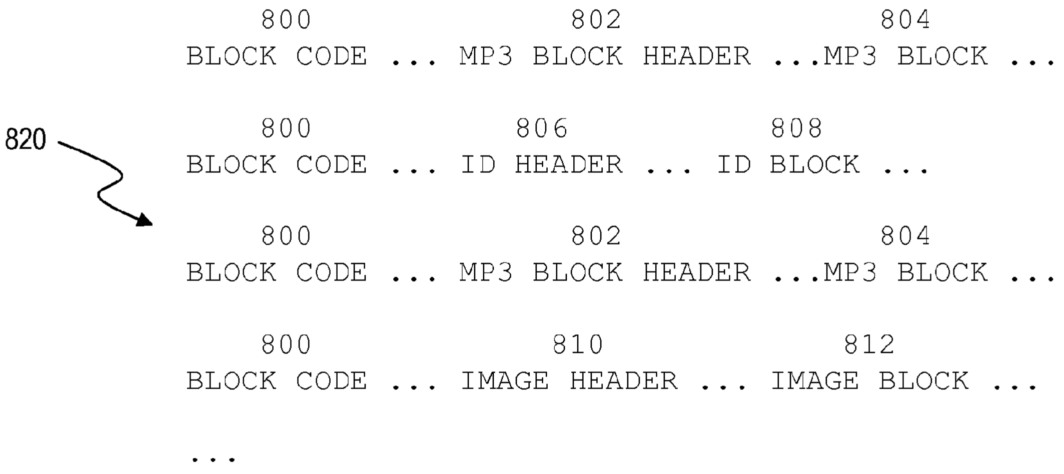
FIG. 7 is a schematic diagram of a broadcast unit transmission.
Figure 36:
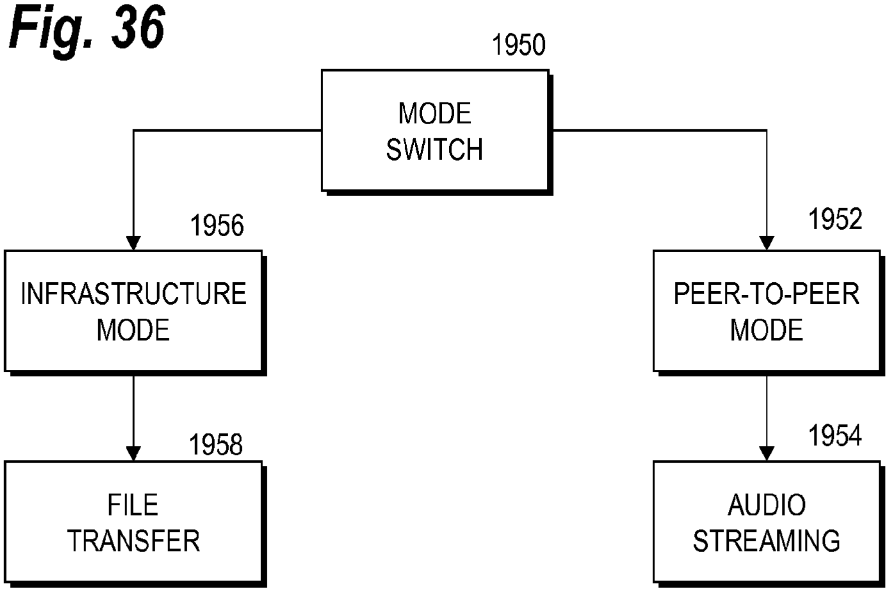
FIG. 36 is a schematic block diagram of mode switching between peer-to-peer and infrastructure modes.

Such additional information can be multiplexed along with the audio signal. For example, if the audio signal is transferred as an MP3 file, assuming that there is additional bandwidth beyond that of the MP3 file itself, the file can be broken into pieces, and can be interspersed with other information. FIG. 7 is a schematic diagram of a broadcast unit 710 transmission 820. The transmission is comprised of separate blocks of information, each represented in the figure as a separate line. In the first line, a block code 800 is transmitted, which is a distinctive digital code indicating the beginning of a block, so that a search unit 750 receiving from the broadcast unit 710 for the first time can effectively synchronize itself to the beginning of a digital block. Following the block code 800 is a MP3 block header 802, which indicates that the next signal to be sent will be from a music file (in this case an MP3 file). The MP3 block header 802 includes such information as is needed to interpret the following block of MP3 file block 804, including such information as the length of the MP3 block 804, and characteristics of the music (e.g. compression, song ID, song length, etc.) that are normally located at the beginning of a MP3 file. By interspersing this file header information at regular intervals, a user can properly handle music files that are first received in the middle of the transmission of an MP3 file. Next, the MP3 block 804 containing a segment of a compressed music file is received.

Dependent on the amount of music compression and the bandwidth of the inter-unit communications, other information can be sent, such as user contact information, images (e.g. of the user), and personal information that can be used to determine the "social compatibility" of the user with the broadcast unit 710 and the receive unit 730. This information can be sent between segments of MP3 files or during "idle" time, and is generally preceded by a block code 800, that is used to synchronize transmission and reception. Next, a header file is transmitted, which indicates the type of information to follow, as well as characteristics that will aid in its interpretation. Such characteristics could include the length of information, descriptions of the data, parsing information, etc. In FIG. 7, an ID header 806 is followed by an ID block 808, which includes nicknames, contact information, favorite recording artists, etc. Later, an image header 810 can be followed by an image block with an image of the user. The image header 810 includes the number of rows and columns for the image, as well as the form of image compression.

It should be understood that the communications format described in FIG. 7 is only illustrative of a single format, and that a large number of different formats are possible within the present invention. Also, the use of MP3 encoding is just an example, and other forms of digital music encoding are within the spirit of the present invention, and can alternatively comprise streaming audio formats such as Real Audio, Windows Media Audio, Shockwave streaming audio, QuickTime audio or even streaming MP3 and others. Furthermore, these streaming audio formats can be modified so as to incorporate means for transmitting DJ 200 control signals and other information.

Transmitting Dynamic Data and Control Information

As described above, there are benefits to two-way communications between the broadcast unit 710 and the receive unit 730. There are many methods of carrying out this communication, even if the inter-unit transmitter/receiver 110 does not permit simultaneous transmission and reception. For example, additional transmission and reception hardware could be included in each unit 100. Alternatively, in the transmission 820 above, specific synchronization signals such as the block code 800 can be followed by specific intervals during which the inter-unit transmitter/receiver 110 that is transmitting switches into receive mode, while the inter-unit transmitter/receiver 110 that was receiving switches to transmit mode. This switch in communications direction can be for a specific interval, or can be mediated through conventional handshake methods of prior art communications protocols.

It should be noted that in addition to transfer of static information (e.g. identifiers, contact information, or images), dynamic information and control information can also be transferred. For example, the user at the receive unit 730 can be presented with a set of positive and negative comments (e.g. "Cool!" "This is awful!") that can be passed back to the broadcast unit 710 with the press of a button. Such information can be presented to the user of the broadcast unit 710 either by visual icon on, for example, an LCD screen, by a text message on this screen, or by artificial voice synthesis generated by the broadcast unit 710 and presented to the user in conjunction with the music.

Alternatively, the user of the receive unit 730 can speak into a microphone that is integrated into the receive unit 730, and the user voice can be sent back to the broadcast unit 710. Indeed, the inter-unit communications can serve as a two-way or multi-way communications method between all units 100 within range of one another. This two-way or multi-way voice communication can be coincident with that of the playing of the audio entertainment, and as such, it is convenient for there to be separate amplitude control over the audio entertainment and the voice communication. This can be implemented either as two separate amplitude controls, or alternatively as an overall amplitude control, with a second control that sets the voice communications amplitude as a ratio to that of the audio entertainment. In this latter mode, the overall level of audio output by the unit is relatively constant, and the user then selects only the ability to hear the voice communication over the audio entertainment.

In order to express their feelings and appreciation about the music they are hearing, users within a cluster 700 can also press buttons on their units 100 that will interrupt or supplement the control signals being sent to their respective DJs 200, providing light shows that can be made to reflect their feelings. For example, it can be that all lights flashing together (and not in synchrony with the music) can express dislike for music, whereas intricate light displays could indicate pleasure.

It is also possible to send control requests between units 710. For example, a receive unit 730 can make song requests (e.g. "play again", "another by this artist") that can show on the broadcast unit 710 user interface. Alternatively, the user of a receive unit 730 can request that control be switched, so that the receive unit 730 becomes the broadcast unit 710, and the broadcast unit 710 becomes a receive unit 730. Such requests, if accepted by the initial broadcast unit 710 user, will result in the memory storage of the identifier of the broadcast unit 710 being set in all units in the cluster 700 to that of the new broadcast unit 730. Descriptions of the communications resulting in such a transfer of control will be provided below.

Additionally, it is also possible for users of units 100 to privately "chat" with other users while they are concurrently receiving their audio broadcasts. Such chat can be comprised of input methods including keyboard typing, stylus free-form writing/sketching, and quickly selectable icons.

It should be understood that within the spirit of the present invention that the functional configuration can be supported by the extension of certain existing devices. For example, the addition of certain wireless transmitter and receiver, as well as various control and possibly display functionality to a portable audio player would satisfy some embodiments of the present invention. Alternatively, by the addition of music storage and some wireless transmitter and receiver functionality, a mobile telephone would also allow certain embodiments of the present invention. In such case, the normal telephony communications, perhaps supported by expanded 3G telephony capabilities, could serve to replace aspects of the IP communications described elsewhere in this specification.

IP Socket Communication Embodiments

Figure 14A:
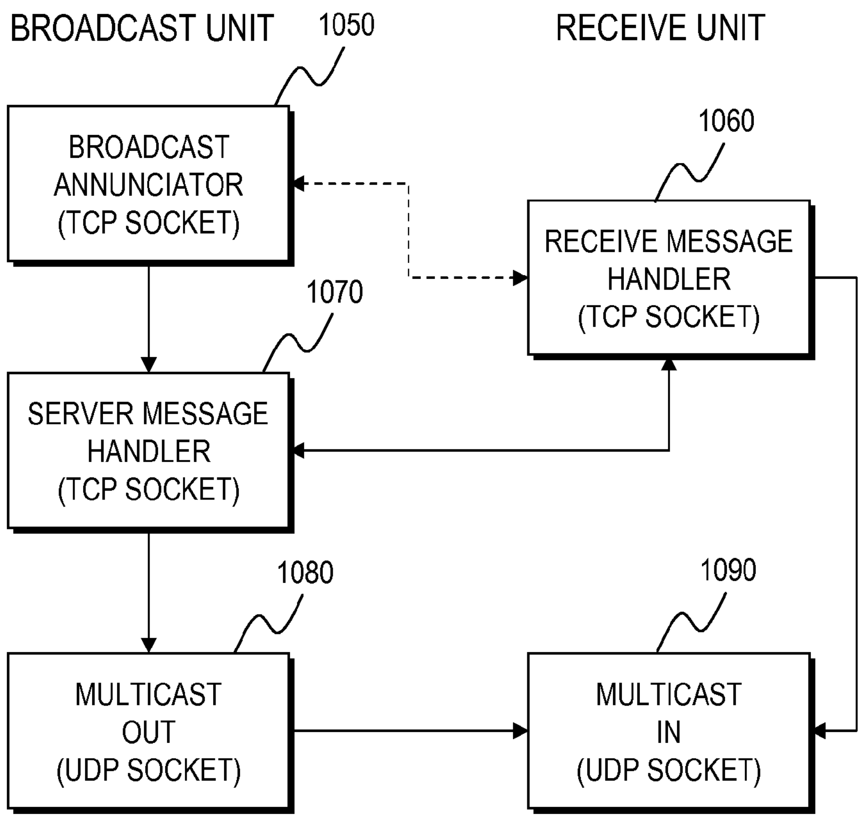
FIG. 14A is a schematic block diagram of the socket configurations on the broadcast unit and the receive unit.

A standard set of protocols for inter-unit communications is provided through IP socket communications, which is widely supported by available wireless communications hardware, including 820.11a, b and g (Wi-Fi). An embodiment of inter-unit communications is provided in FIGS. 14A-B. FIG. 14A is a schematic block diagram of the socket configurations on the broadcast unit 710 and the receive unit 730.

In the discussion below, transfer of the different messages and audio information are provided, generally but not always, through an Internet protocol. At the transport layer of such protocols, there will generally be used either a connectionless protocol or a connection-oriented protocol. Among the most common of these protocols are respectively the User Datagram Protocol (UDP) and the Transmission Control Protocol (TCP), and wherever these protocols are used below, it should be noted that any like protocol (connectionless or connection-oriented), or the entire class of protocol can generally be substituted in the discussion.

The broadcast unit 710, prior to the membership of the receive unit 730, broadcasts the availability of the broadcast on a broadcast 1050, which is generally a TCP socket. The annunciator 1050 broadcasts on a broadcast address with a predetermined IP address and port. The receive unit 730 has a client message handler 1060 that is also a TCP socket that is looking for broadcasts on the predetermined IP address and port. When it receives the broadcast, a handshake creates a private server message handler 1070 on a socket with a new address and port on the broadcast unit 710. The broadcast unit 710 and the receive unit 730 can now exchange a variety of different messages using the TCP protocol between the server message handler 1070 and the client message handler 1060. This information can comprise personal information about the users of the broadcaster unit 710 and the receive unit 730. Alternatively or additionally, the broadcast unit 710 can transfer a section of the audio signal that is currently being played, so that the user of the receive unit 730 can "sample" the music that is being played on the broadcast unit 710. It should be noted that, in general, the broadcast unit 710 continues its broadcast on the broadcast annunciator 1050 for other new members.

Once it is established that the broadcast unit 710 and the receiver unit 730 are mutually desirous of providing and receiving an audio broadcast, respectively, sockets optimized for broadcast audio are created both on the broadcast unit 710 and the receiver unit 730. These sockets will often be UDP sockets—on the broadcast unit 710, a multicast out socket 1080 and on the receiver unit 730, a multicast in socket 1090.

Figure 14B:
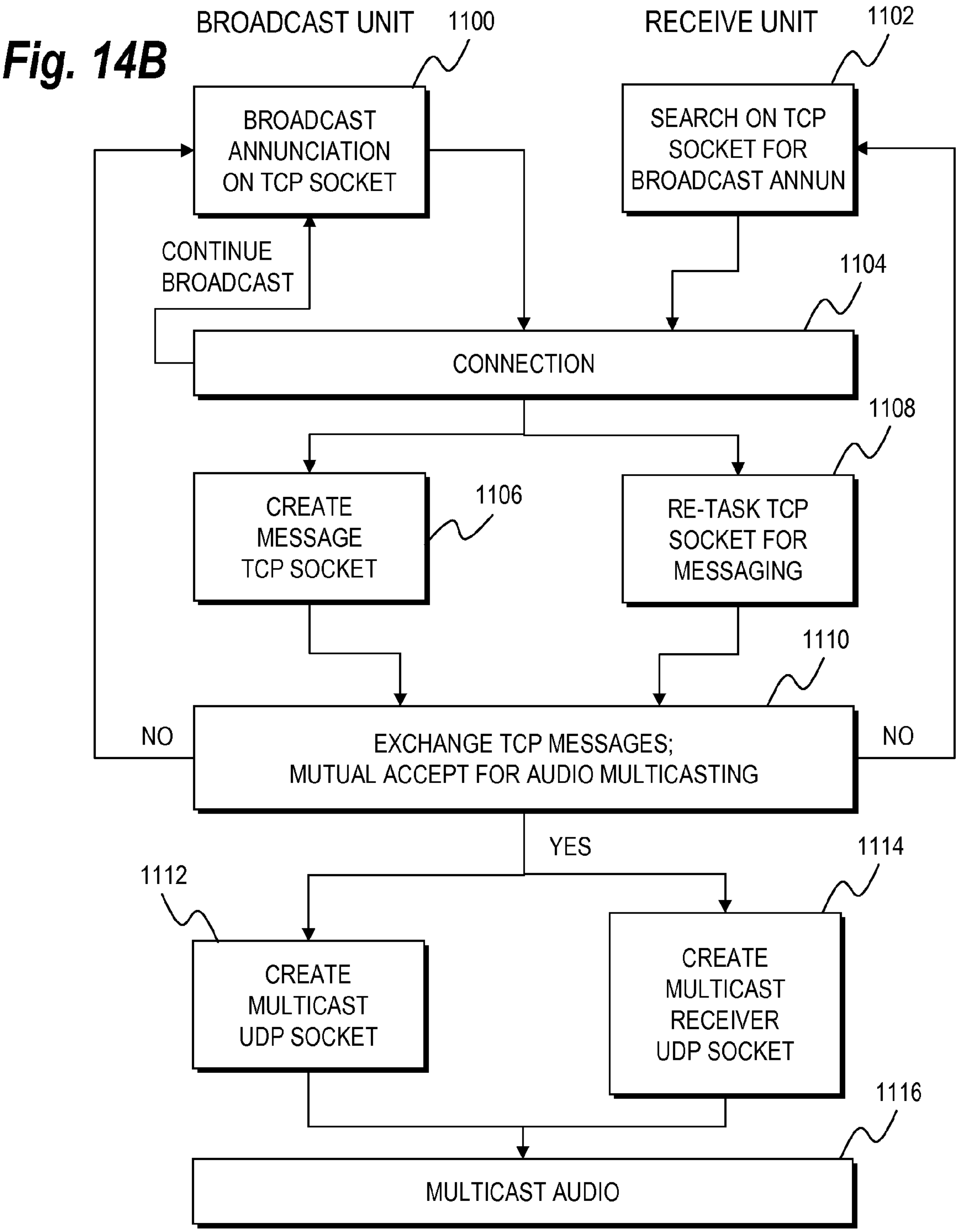
FIG. 14B is a schematic block flow diagram of using IP sockets for establishing and maintaining communications between a broadcast unit and the receive unit, according to the socket diagram of FIG. 14A.

FIG. 14B is a schematic block flow diagram of using IP sockets for establishing and maintaining communications between a broadcast unit 710 and the receive unit 730, according to the socket diagram of FIG. 14A. In a step 1100, the broadcast annunciator 1050 broadcasts the availability of audio signals. In a step 1102, the receiver unit 730 searches for a broadcast annunciator 1050 on the client message handler 1060 socket. Once a connection is initiated in a step 1104, the broadcast unit 710 creates the message handler socket 1070 in a step 1106, and the receiver unit 730 retasks the message handler socket 1060 for messaging with the broadcast unit 730. The broadcast annunciator 1050 continues to broadcast availability through the step 1100.

In a step 1110, the broadcast unit 710 and the receiver unit 730 exchange TCP messages in order to establish the mutual interest in audio broadcasting and reception. Should there not be mutual acceptance, then the system returns to the original state in which the broadcast unit 710 is transmitting the broadcast annunciation in the step 1100, and the receive unit 730 searches for broadcasts in the step 1102. Given that the receive unit 730 and the broadcast unit 710 will be within communications distance, and that the broadcast unit 710 is transmitting an annunciation for which the receive unit 730 is receptive, the broadcast unit 710 will be set into a state where it will not establish communications with the receive unit 730 in the step 1106. This can occur either by not creating the message socket in the step 1106 when connection is made with the receiver unit 730, or that the annunciator 1050 remains silent for a predetermined period, perhaps for a period of seconds.

If the broadcast unit 710 and the receiver unit 730 do mutually accept a multicasting relationship, the broadcast unit 710 creates the multicast out UDP socket 1080 in a step 1112 and the receiver unit 730 creates the multicast in UDP socket 1090 in the step 1114, and multicast audio transmission and reception is initiated in a step 1116. It should be noted that should the broadcast unit 710 already be multicasting audio to a receiver unit 730 prior to the step 1112, the multicast out socket 1080 is not created, but that the address of this existing socket 1080 is communicated to the new cluster member.

Figure 15:
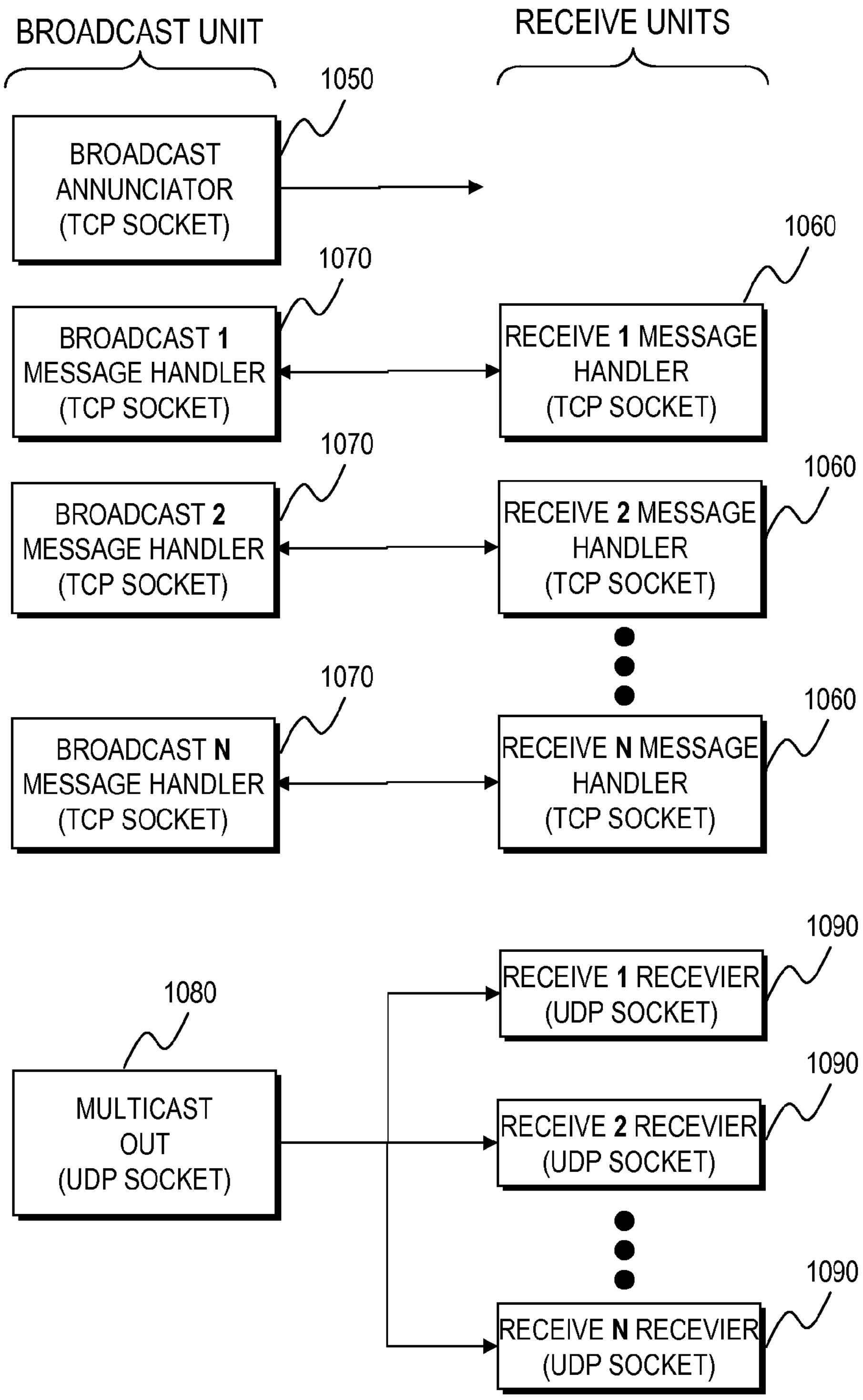
FIG. 15 is a schematic block diagram of the IP socket organization used with clusters comprising multiple members.

Given that a cluster can comprise many members, the system of FIGS. 14A-B must be able to expand to include multiple members. FIG. 15 is a schematic block diagram of the IP socket organization used with clusters comprising multiple members. The broadcast unit 710 includes a broadcast annunciator 1050 indicating broadcast availability for new members. For each member in the cluster, the broadcast unit further comprises a message handler 1070 dedicated to the specific member, whose receive unit 730 in turn comprises a message handler 1060, generally in a one-to-one relationship. The broadcast unit comprises N messaging sockets 1070 for the N receive units of the cluster, while each member has only a single socket 1060 connected to the broadcast unit. Thus, when a member wishes to send a message to the other members of the cluster, the message is sent via the receive unit message handler 1060 to the broadcast unit message handler 1070, and which is then multiply sent to the other receive unit message handlers 1060. It is also within the teachings of the present invention for each member of the cluster to have direct messaging capabilities with each other member, assisted in the creation of the communications by the broadcast unit 710, which can share the socket addresses of each member of the cluster, such that each member can assure that it is making connections with other members of the cluster rather than units of non-members. The broadcast unit 710 also comprises a multicast out socket 1080 which transfers audio to individual receiver sockets 1090 on each of the members of the cluster.

Members of the cluster may come and go, especially since members will frequently move physically outside of the transmission range of the broadcast unit 710. In order for the broadcast unit 710 to determine the current number of members of its cluster, it is within the teachings of the present invention for the broadcast unit 710 to use the messaging sockets 1060 and 1070 to "ping" the receive units 730 from time to time, or otherwise attempt to establish contact with each member of the cluster 700. Such communications attempts will generally be done at a predetermined rate, which will generally be more frequent than once every ten seconds. Information about the number of members of a cluster can be sent by the broadcast unit 710 to the other members of the cluster, so that the users can know how many members there are. Such information is conveniently placed on a display on the unit (see, for example, FIGS. 18A-B).

Music Synchronization

It will be generally desirable that the synchronicity of the audio playback on the broadcast unit 710 and the receive units 730 be highly synchronized, preferably within 1 second (i.e. this provides a low level functionality of listening to music together), more preferably within 100 milliseconds (i.e. near-simultaneous sharing of music, but an observer would be able to hear—or see through DJ 200 visible cues—the non-synchronicity), and most preferably within 20 milliseconds of one another. In a simple embodiment of the present invention, all members of a cluster 700 must communicate directly with the broadcast unit 710, without any rebroadcast. In such cases, making playback on the two units 710 and 730 as similar as possible will tend to synchronize their audio production.

Figure 8A:
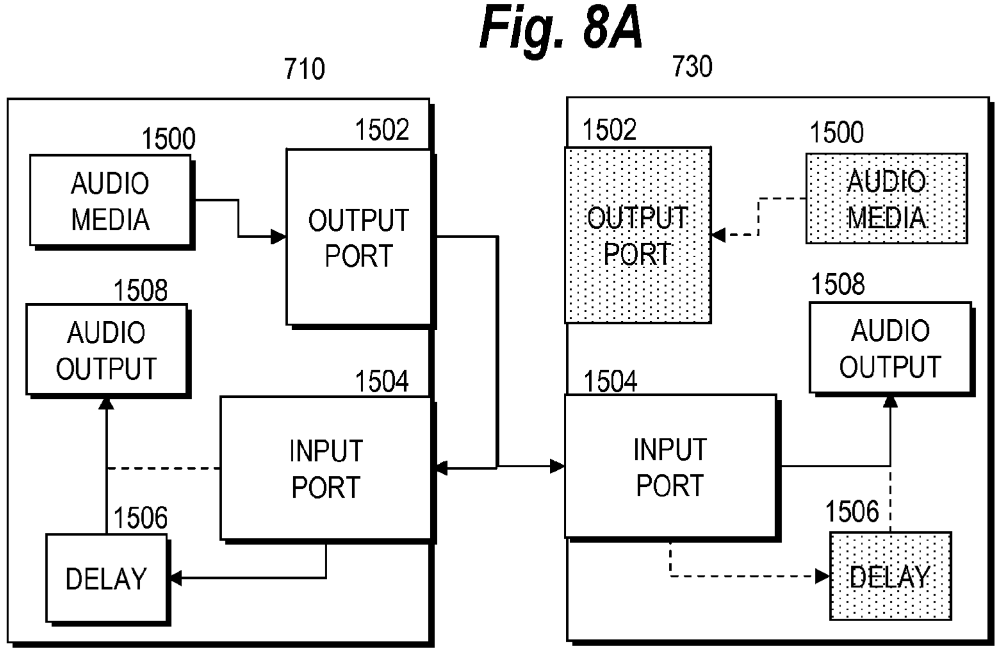
FIG. 8A is a schematic block diagram of audio units with self-broadcast so that audio output is highly synchronized.

FIG. 8A is a schematic block diagram of audio units 100 with self-broadcast so that audio output is highly synchronized. Two audio units 100 are depicted, including a broadcast unit 710 and a receive unit 730. The organization of audio unit 100 elements is chosen to highlight the self-broadcast architecture. The audio media 1500, which can be compressed audio storage 310, stores the audio signals for broadcast. The output port 1502, which can comprise the inter-unit transmitter/receiver 110, transmits a broadcast audio signal, provided by the audio media 1500. The audio media comprise a variety of different storage protocols and media, including mp3 files, .wav files, or .au files which are either compressed or uncompressed, monoaural or stereo, 8-bit, 16-bit or 24-bit, and stored on tapes, magnetic disks, or flash media. It should be understood that the spirit of the present invention is applicable to a wide variety of different audio formats, characteristics, and media, of which the ones listed above are given only by way of example. This broadcast audio signal transmitted from the output port 1502 is received at the input port 1504, which can also comprise aspects of the inter-unit transmitter/receiver 110. The signal so received is then played to the associated user via the audio output 1508.

It should be noted that the audio output is normally connected to the audio media 1500 for audio playing when the unit 710 is not broadcasting to a receive unit 730. In such case, there is no need for the audio signals to go to the output port 1502 and thence to the input port 1504. Indeed, even when broadcasting, the audio signal within the broadcast unit 710 can go both directly to the audio output 1508 as well as to be broadcast from the output port 1502.

However, in order to assure the synchronicity of the audio output on the broadcast unit 710 and the receive unit 730, the broadcast unit 710 can present all audio signal from the audio media 1500 for output on the output port 1502. The signal will be received not only on the receiver 730 input port 1504, but also on the input port 1504 of the broadcast unit 710. This can take place either through the physical reception of the broadcast audio signal on a radio frequency receiver, or through local feedback loops within the audio unit 100 (e.g. through employment of IP loopback addresses).

In the receive unit 730, the audio signal received at the input port 1504 goes directly to the audio output 1508, and the other elements of the unit 100 depicted are not active. In the broadcast unit 710, however, if means are used to transfer audio signal between the output port 1502 and the input port 1504 are utilized, and if such transfer means requires less time than that taken for transmitting signal from the output port 1502 of the broadcast unit 710 to the input port 1504 of the receive unit 730, then a delay means 1506 is introduced to provide a constant delay between the input port 1504 and the audio output 1508. This delay can comprise a digital buffer if the signal is digitally encoded, or an analog delay circuit if the signal is analog. Generally, the delay introduced into the audio playback will be a predetermined amount based on the characteristics of the unit hardware and software.

Alternatively, in the case of a digital signal, the delay can be variably set according to the characteristics of the communications system. For example, if there are IP-based communications between the units, the units can "ping" one another in order to establish the time needed for a "round-trip" communications between the systems. Alternatively, each receive unit 730 of a cluster 700 can transmit to the broadcast unit 710 a known latency of the unit based on its hardware and transmission characteristics. It should be noted that in order to handle different delays between multiple members of a cluster, a delay can be introduced into both the broadcast unit 710 and the receive unit 730, should a new member to the cluster have a very long latency in communications.

Note that the delay 1506 can serve a second purpose, which is to buffer the music should there be natural interruptions in the connections between the members of the cluster 700 (for example, should the receive units 730 move temporarily outside of the range of the broadcaster unit 710). In such case, should enough audio signal be buffered in the delay 1506, there would not be interruption of audio signal in the receive unit 730. Even in such cases, however, in order to accommodate the differences in time to play audio between units and within a unit, the delays in the broadcast unit 710 can be larger than those in the receive unit 730.

If the music compression and the bandwidth of the inter-unit communications are large enough, it can be that the broadcast unit 710 will broadcast less than half of the time. This will generally allow the receive unit 730 to rebroadcast the information from an internal memory store, allowing the effective range of the broadcast signal to potentially double. This can allow, through multiple rebroadcasts, for a very large range even if each individual unit 100 has a small range, and therefore for a potentially large number of users to listen to the same music.

Figure 8B:
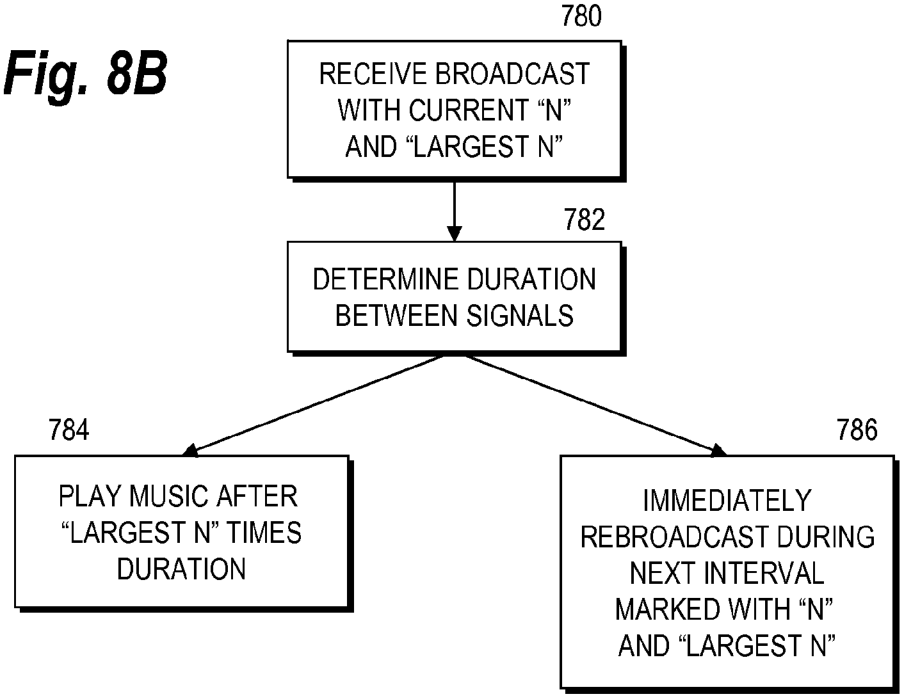
FIG. 8B is a schematic flow diagram for synchronous audio playing with multiple rebroadcast.

In order to synchronize those that listen to the music through first, second and Nth rebroadcast, a scheme for multi-broadcast synchronization is presented in FIG. 8B, a schematic flow diagram for synchronous audio playing with multiple rebroadcast. In such a case, the cluster 700 is considered to be all units 100 that synchronize their music, whether from an original broadcast or through multiple rebroadcasts. In a first step 780, a unit 100 receives a music broadcast along with two additional data. The first data is the current "N", or "hop" of the broadcast it receives, where "N" represents the number of rebroadcasts from the original broadcast unit 710. Thus, a unit 100 receiving music from the original broadcast unit 710 would have an "N" of "1" (i.e. 1 hop), while a unit 100 that received from that receiving unit 100 would have an "N" of "2" (2 hops), and so on. A second piece of information would be the "largest N" that was known to a unit 100. That is, a unit 100 is in contact generally with all units 100 with which it either receives or transmits music, and each send the "largest N" with which it has been in contact.

In a second step 782, the unit 100 determines the duration between signals in the broadcasts it is receiving. Then, two actions are taken. In a step 786, the unit 100 rebroadcasts the music it has received, marking the music with both its "N" and the largest "N" it knows of (either from the unit from which it received its broadcast or from a unit to which it has broadcast).

Also, in a step 784, the music that has been received is played after a time equal to the duration between signals and the "largest N" minus the unit's "N". This will allow for all units 100 to play the music simultaneously. Consider, for example the original broadcast unit 710. It's "N" is "0", and its "largest N" is the maximum number of rebroadcasts in the network. It will store music for a period of "largest N" (equals "largest N" minus "0") times the duration of a rebroadcast cycle, and then play it. For a unit 100 at the furthest rebroadcast, it's "N" and "largest N" will be equal to one another, so that it will store music for no time (i.e. "largest N" minus "N"=0), but will play it immediately. This will allow all units 100 in the cluster to play music simultaneously. The limitation, however, is that there is memory in each unit 100 to store the music for a sufficient period of time. The units 100 on the system, however, can transfer the amount of storage that is available with the other information, and the number of rebroadcasts can be limited to the amount of memory available within the units 100 that comprise the cluster 700.

As the size of this multi-broadcast cluster 700 changes, the "largest N" can vary, and it will take generally on the order of "largest N" steps for the system to register "largest N". In such cases, there can be temporary gaps in the music on the order of the duration between signals, which will generally be on the order of tens of milliseconds, but which can be longer.

Figure 34A:
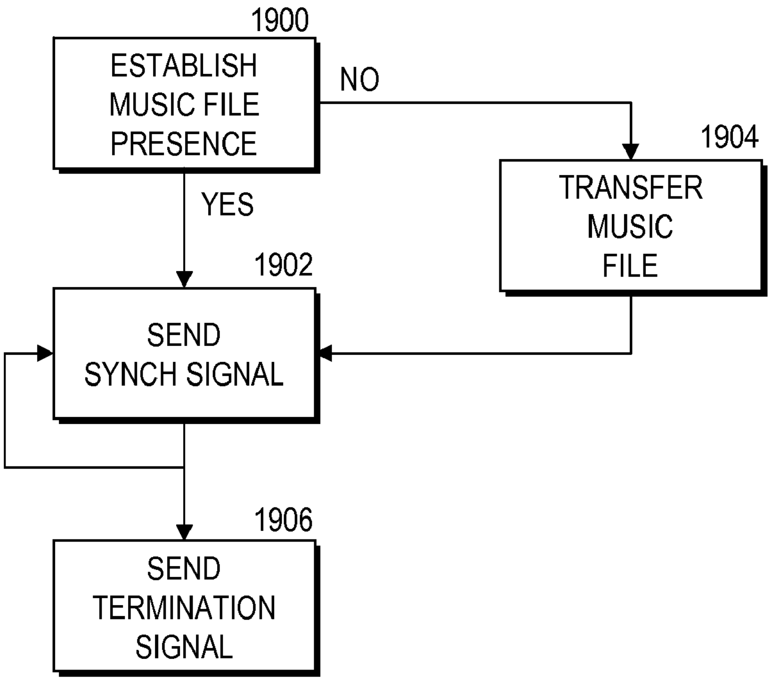
FIG. 34A is a schematic block flow diagram of the synchronization of music playing from music files present on the units 100.

It should be noted that the synchronization of music does not need to accompany the transfer of an actual music signal. FIG. 34A is a schematic block flow diagram of the synchronization of music playing from music files present on the units 100. In this embodiment, in a step 1900, the broadcast unit establishes the presence or absence of the music file comprising the music signals to be played on the receive unit. The music file can be referenced either with respect to the name of the file (e.g. "Ooops.mp3"), or a digital identifier that is associated with the music file.

If the music file is not present, then transfer of the music file from the broadcast unit to the receive units can automatically proceed through a file transfer mechanism such as peer-to-peer transfer in a step 1904. If the file was already present, or if the file has been transferred, or alternatively, if the file transfer has begun and enough of the file is present to allow the simultaneous playing of music between the two units 100, transmission of synchronization signals between the two units 100 can commence in a step 1902.

These synchronization signals can comprise many different forms. For example, the synchronization signal can be the time stamp from the beginning of the music file to the current position of the music file being played on the broadcast unit. Alternatively, the broadcast unit can send the sample number that is currently being played on the broadcast unit 100. In order to allow receiving units to begin synchronous playing in the middle of a transmission from a broadcast unit, the synchronization signals will preferably include information about the song being played, such as the name of the file or the digital identifier associated with the file.

Transmission of this synchronization signal continues until the termination of the song, or until a manual termination (e.g. by actuating a Pause or Stop key) is caused (the frequency of transmission of the synchronization signal will be discussed below). At this point, the broadcast unit can send a termination, pause or other signal in a step 1906. Note that this method of synchronization can operate when the receiving unit establishes connection with the broadcast unit even in the middle of a song.

Figure 34B:
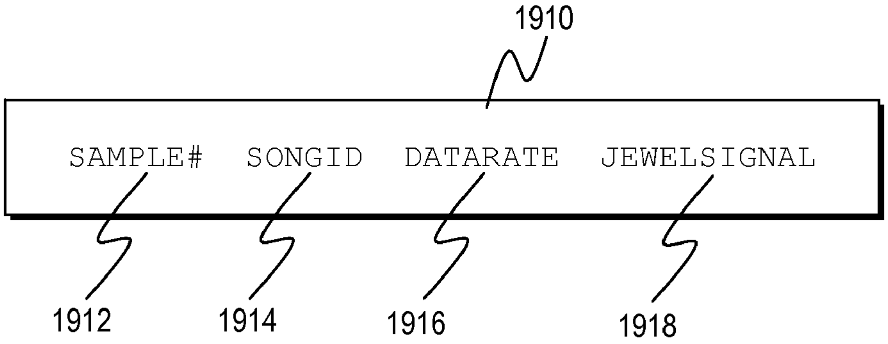
FIG. 34B is a schematic layout of a synchronization record according to FIG. 34A.

FIG. 34B is a schematic layout of a synchronization signal record 1910 according to FIG. 34A. The order and composition of the fields can vary according to the types of music files used, the means of establishing position, the use of digital jewelry, the desire for privacy, and more.

The position field 1912 (SAMPLE#) which contains an indicator of position in a music file—in this case the sample number within the file. The music file identifier field 1914 (SONGID) comprises a textual or numerical identifier of the song being played. The third field is the sample rate field 1916 (SAMPLERATE), and is primarily relevant if the position field 1912 is given in samples, which allows a conversion into time. Given that the same audio entertainment can be recorded or saved at different sample rates, this allows the conversion from a potentially relative position key (samples) to one independent of sample rate (time). The jewelry signal field 1918 (JEWELSIGNAL) is used to encode a digital jewelry 200 control signal for controlling the output of the digital jewelry 200, should the receiver unit be associated with jewelry 200. The order and composition of the fields can vary according to the types of music files used, the means of establishing position, the use of digital jewelry, the desire for privacy, and more.

The frequency with which the record 1910 is broadcast can vary. The time of reception of the record 1910 sets a current time within the song that can adjust the position of the music playing on the receiver unit. It is possible for the record to be broadcast only once, at the beginning of the song, to establish synchronization. This, however, will not allow others to join in the middle of the music file. Furthermore, if the record 1910 is received or processed at different times for the single record, the music can be poorly synchronized. With multiple synchronization signals, the timing can be adjusted to account for the most advanced reception of the signal—that is, the music playing will be adjusted forward for the most advanced signal, but not be adjusted back for a more laggard signal.

If the record further contains a jewelry signal field 1918, the frequency with which the record 1910 should be sent should be comparable or faster than the rate with which these signals change, and should be preferably at least 6 times a second, and even more preferably at least 12 times a second. If less frequent record 1910 transmission is desired, then multiple jewel signal fields 1918 can be included in a single record 1910.

It should be noted that given units 100 of different design or manufacture, there can be different intrinsic delays between reception of music and/or synchronization signals and the playing of the music. Such delays can result from different speeds of MP3 decompression, different sizes of delay buffers (such as delay 1506), different speeds of handling wireless transmission, differing modes of handling music (e.g. directly from audio media 1500 to audio output 1508 on the broadcast unit, but requiring transmission through an output port 1502 and input port 1504 for the receiver unit), and more. In such cases, it is preferable for receiver units to further comprise a manual delay switch that can adjust the amount of delay on the receiver unit. This switch will generally have two settings: to increase the delay and to decrease the delay, and can conveniently be structured as two independent switches, a rocker switch, a dial switch or equivalent. It is useful for the increments of delay determined by the switch be adjustable so as to allow users to sense the music from the broadcast unit and the receiver unit as being synchronous, and it is preferable for the increments of delay to be less than 50 milliseconds, and even more preferable for the increments of delay to be less than 20 milliseconds, and most preferable for the units of delay to be less than 5 milliseconds.

Creation and Maintenance of Clusters

Search units 750 can be playing music themselves, or can be scanning for broadcast units 710. Indeed, search units 750 can be members of another cluster 700, either as broadcast unit 710 or receive unit 730. To detect a different cluster 700 in which it might desire membership, the search unit 750 can either play the music of the broadcast unit 710 to the search unit 750 user, or it can scan for personal characteristics of the broadcast unit 710 user that are transmitted in the ID block 808. For example, a user can establish personal characteristic search criteria, comprising such criteria as age, favorite recording artists, and interest in skateboarding, and respond when someone who satisfies these criteria approaches.

Alternatively, the search unit 750 user can also identify a person whose cluster he wishes to join through visual contact (e.g. through perceiving the output of the person's light transducer 240).

Before a search unit 750 user can establish contact, it is preferable for a broadcast unit 710 user, or a receive unit 730 user, to provide permissions for others to join the cluster. For example, each unit 100 will generally be able to changeably set whether no one can join with their unit 100, whether anyone can join with their unit 100, or whether permission is manually granted for each user who wishes to join with their unit into a cluster. For a cluster 700, membership in the cluster can be provided either if any one member of the cluster 700 permits a search unit 750 user to join, or it can be set that all members of a cluster 700 need to permit other users to join, or through a variety of voting schemes. The permissions desired by each member will generally be sent between units 100 in a cluster as part of the ID block 808 or other inter-unit communications. Furthermore, these permissions can be used to establish the degree to which others can eavesdrop on a unit 100 transmission. This can be enforced either through the use of cryptography, which can only provide decryption keys as part of becoming a cluster 700 member, through provision of a private IP socket address or password, through standards agreed by manufacturers of unit 100 hardware and software, or by unit 100 users limiting the information that is sent through the ID block 808 through software control.

The search unit 750 user can then establish membership in the group in a variety of ways. For example, if the search unit 750 is scanning music or personal characteristics of the unit 100 user, it can alert the search unit 750 user about the presence of the unit 100. The search unit 750 user can then interact with the search unit 750 interface to send the unit 100 user a message requesting membership in the cluster 700, which can be granted or not. This type of request to join a cluster 700 does not require visual contact, and can be done even if the search unit 750 and cluster are separated by walls, floors, or ceilings.

Another method of establishing contact between a search unit 750 user and a cluster 700 member is for the search unit 750 user to make visual contact with the cluster 700 member. In such case that physical contact or physical proximity is easily made between the unit 100 of the cluster member and the search unit 750, digital exchange can be easily made either through direct unit 100 contact through electrical conductors, or through directional signals through infra-red LEDs, for example. For example, the search unit 750 user can point his unit 100 at the cluster 700 member unit, and then if the cluster member wishes the search unit 750 user to join the cluster, could point his unit 100 at the search unit 100, and with both pressing buttons, effect the transfer of IDs, cryptography keys, IP socket addresses or other information that allows the search unit 750 user to join the cluster 700.

Alternatively, the broadcast DJ 720 (or the receive DJ 740) can present digital signals through the light transducer. For example, most DJ 720 light transduction will be modulated at frequencies of 1-10 Hz, with human vision not being able to distinguish modulation at 50 Hz or faster. This means that digital signals can be displayed through the light transducer 240 at much higher frequencies (kHz) that will not perceived by the human eye, even while lower frequency signals are being displayed for human appreciation. Thus, the broadcast DJ 720 can receive a signal from the broadcast unit 710 DJ transmitter 120 containing information needed for a search unit 750 to connect to the broadcast unit's cluster 700. This information will be expressed by the light transducer 240 of the broadcast DJ 720 in digital format. The search unit 750 can have an optical sensor, preferably with significant directionality, that will detect the signal from the light transducer 240, so that the search unit 750 is pointed in the direction of the broadcast DJ 720, and the identifier information required for search unit 750 to become a member of cluster 700. This optical sensor serves as the DJ directional identifier 122 of FIG. 1. At this point, if desired, the broadcast unit 710 user can determine if they want the search unit 750 user to join the cluster 700.

A summary of means to effect joining of a cluster is provided in FIGS. 13A through E, which display means for a search unit 750 to exchange information prior to joining a cluster 700 via a broadcast unit 710. It is also within the teachings of the present invention for the search unit 750 to institute communications with a receive unit 730 for the purposes of joining a cluster in a similar fashion, particularly since it may be difficult for a person outside of the cluster 700 to determine which of the cluster 700 members is the broadcast unit 710, and which is a receiver unit 730.

If should be noted in the FIGS. 13A-G that limited range and directionality are preferred. That is, there can be a number of broadcast units 710 within an area, and being able to select that one broadcast unit 710 whose cluster one wishes to join requires some means to allow the search unit 750 user to select a single broadcast unit 710 among many. This functionality is generally provided either by making a very directional communication between the two devices, or by depending on the physical proximity of the search unit 750 and the desired broadcast unit 710 (i.e. in a greatly restricted range, there will be fewer competing broadcast units 710). In the following description, the "broadcaster" denotes the user using the broadcast unit 710, and the "searcher" denotes the user using the search unit 750.

In the FIGS. 13A-G, the selection of the cluster by the searcher occurs in three ways, that will referred to as "search transmission mode", "broadcast transmission mode", and "mutual transmission mode", according to the entity that is conveying information. In search transmission mode, the searcher sends an ID via the search unit 750 to the broadcast unit 710. This ID can comprise a unique identifier, or specific means of communication (e.g. an IP address and port for IP-based communication). With this ID, the broadcast unit can either request the searcher to join, or can be receptive to the searcher when the searcher makes an undifferentiated request to join local units within its wireless range. In broadcast transmission mode, the broadcaster sends an ID via the broadcast unit 710 to the search unit 750. With this ID, the searcher unit can then make an attempt to connect with the broadcast unit 710 (e.g. if the ID is an IP address and port), or the search unit can respond positively to a broadcast from the broadcast unit 710 (e.g. from a broadcast annunciator 1050), wherein the ID is passed and checked between the units early in the communications process. Mutual transmission mode comprises a combination of broadcast transmission mode and search transmission mode, in that information and communication is two way between the broadcaster and the searcher.

Figures 13A, 13B, 13C, 13D, 13E, 13F:
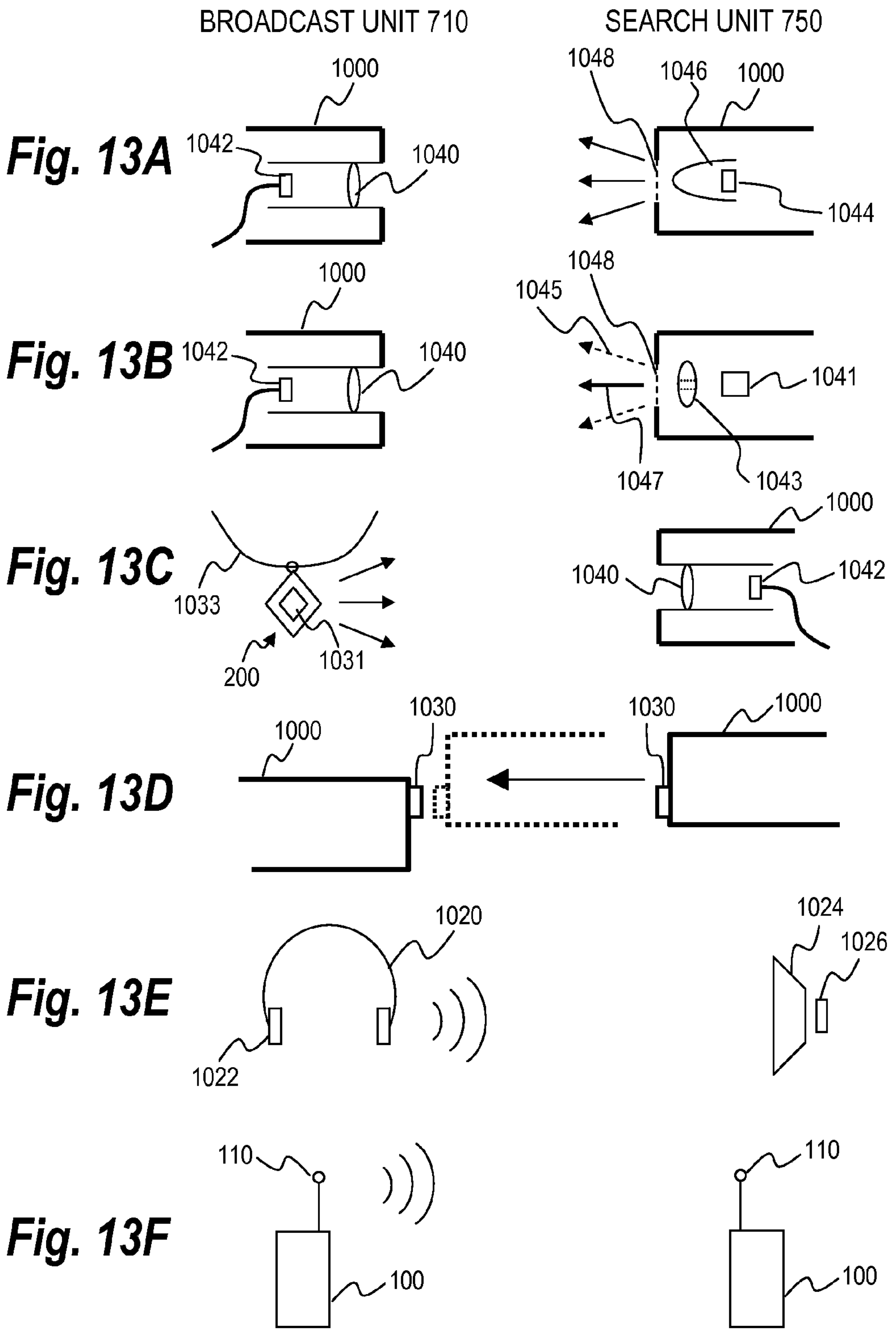
FIG. 13A is a schematic cross-section through a search unit and a broadcast unit in which communications are provided via visible or infrared LED emission in search transmission mode.
FIG. 13B is a schematic cross-section through a search unit and a broadcast unit n which communications are provided via a visible or infrared laser in search transmission mode.
FIG. 13C is a schematic cross-section through a search unit and a broadcast unit in which communications are provided via visible or infrared emission from a digital jewelry element in broadcast transmission mode.
FIG. 13D is a schematic cross-section through a search unit and a broadcast unit in which communications are provided via contact in mutual transmission mode.
FIG. 13E is a schematic cross-section through a search unit and a broadcast unit in which communications are provided via sonic transmissions in broadcast transmission mode.
FIG. 13F is a schematic cross-section through a search unit and a broadcast unit in which communications are provided via radio frequency transmissions in broadcast transmission mode.

FIG. 13A is a schematic cross-section through a search unit 750 and a broadcast unit 710 in which communications are provided via visible or infrared LED emission in search transmission mode. On the right of the figure, a LED 1044 with an associated lens 1046 (the two of which can be integrated) transmits a directional signal from the unit case 1000. This light can optionally pass thorough a window 1048 that is transparent to the light. On the left of the figure, a lens element 1040 collects light through a broad solid angle and directs it onto a light sensing element 1042, which is conveniently a light-sensing diode or resistor. The directionality of the communication is conferred by the transmitting lens 1046 and the collecting lens 1040.

Alternatively, the LED 1044 can be replaced by a visible laser. FIG. 13B is a schematic cross-section through a search unit 750 and a broadcast unit 710 in which communications are provided via a visible or infrared laser in search transmission mode. The search unit 750 comprises a diode laser 1041 that is conditioned by a lens 1043 to form a beam that is sensed by the light sensing element 1042 on the broadcast unit 710. Because a collimated laser beam can be difficult to aim with precision at a photosensing element carried by a person, the optics can comprise a two focus lens 1043 that has a portion that produces a collimated beam 1045, and a second portion that produces a diverging beam 1047. The collimated beam is used by the user of the search unit 750 as a guide beam to direct the pointing of the unit 750, while the divergent beam provides a spread of beam so that the human pointing accuracy can be relatively low. The means for creating the two focus lens 1043 can include the use of a lens with two different patterns of curvature across its surface, or the use of an initial diverging lens whose output intersects a converging lens across only a part of its diameter, where the light that encounters the second lens is collimated, and the light that does not encounter the second lens remains diverging. It is also within the teachings of the present invention for the lens to be slowly diverging without a collimating portion, such that the user does not get visible feedback of their pointing accuracy. In such case, the laser can emit infrared rather than visible wavelengths.

FIG. 13C is a schematic cross-section through a search unit 750 and a broadcast unit 710 in which communications are provided via visible or infrared emission from a digital jewelry element 200 in broadcast transmission mode. The digital jewelry 200 is carried by the broadcaster on a chain 1033, with the digital jewelry 200 visible. The digital jewelry is emitting through a light transducer 1031 a high frequency signal multiplexed within the visible low frequency signal. The search unit 750 is pointed in the direction of the digital jewelry 200, and receives a signal through the light-sensing element 1042. This manner of communication is convenient because the searcher knows, via the presence of the visible signal on the digital jewelry 200, that the broadcaster is receptive to cluster formation.

FIG. 13D is a schematic cross-section through a search unit 750 and a broadcast unit 710 in which communications are provided via contact in mutual transmission mode. In this case, the broadcast unit 710 and the search unit 750 both comprise a contact transmission terminus 1030, and electronic means by which contact transmission is performed. This means can operate either inductively (via an alternative current circuit), through direct electrical contact with alternating or direct current means, or other such means that involves a direct physical contact (indicated by the movement of the search unit 750 to the position of the unit depicted in dotted lines). The search unit 750 or the broadcast unit 710 can, via automatic sensing of the contact or manual control, initiate communications transfer. Given the mutuality of contact as well as the physical equivalence of the two units 710 and 750, information transfer is possible in both directions. It should be noted that in the case of direct current connection, the termini 1030 will comprise two contact points, both of which must make electrical contact in order for communications to occur.

FIG. 13E is a schematic cross-section through a search unit 750 and a broadcast unit 710 in which communications are provided via sonic transmissions in broadcast transmission mode. The broadcaster (or receivers) will be listening to the audio information generally through headphones 1020 or earphones, all of which comprise speakers 1022 that, to one extent or another, leak sonic energy. The use of audio output devices as depicted in FIG. 10 and FIGS. 11A and 11B that admit external sound, will also increase the amount of sound energy lost. This sound energy can be detected by the searcher via a directional speaker comprising a sound collector 1024 and a microphone 1026. This system requires that the sound output of the broadcast unit 710 and the receiver unit 750 also output an ID encoded in the sound. Such sound can be conveniently output at inaudible frequencies, such as 3000-5000 Hz, which carry sufficient bandwidth to encode short messages or identifiers (e.g. an IP address and port number can be carried in 5 bytes). Sound energy, especially at higher frequencies, can be quite directional, depending on the shape of the collector 1024 and the structure of the microphone 1024, allowing good directional selection by the searcher.

FIG. 13F is a schematic cross-section through a search unit 750 and a broadcast unit 710 in which communications are provided via radio frequency transmissions in broadcast transmission mode. The radio frequency transmissions are not strongly directional (and for the purposes of the broadcast of audio information, are designed to be as directionless as possible). In order to distinguish a desired cluster 700 to join and an undesired cluster 700, a number of strategies can be employed. For example, the strengths of the various signals can be measured and the strongest chosen for connection. Alternatively, if there are multiple broadcast connections available, the search unit 750 can sequentially attempt a connection with each broadcast unit 710. When the attempt is made, the broadcast unit 710 can, prior to alerting the broadcaster of the attempted joining by a new member, cause the digital jewelry 200 associated with the broadcast unit 710 to visibly flash a characteristic signal. The searcher can then verify by pressing the appropriate button on the search unit 750 his desire to join the cluster 700 of the broadcast digital jewelry 200 that had just flashed. If the searcher decided not to join that cluster 700, the search unit 750 could search for yet another unit broadcast unit 750 within range, and attempt to join.

At any time, the members of a cluster 700 can share personal characteristics (nickname, real name, address, contact information, face or tattoo images, favorite recording artists, etc.) through selection of choices of the unit 100 interface, with all such characteristics or a subset thereof to be stored on the units 100. In order to assist cluster 700 members in determining whether or not to accept a person into their cluster 700, a search unit 750 member can display either the total number of people with whom he has shared personal characteristics, or he can alternatively allow the cluster members to probe his store of persons with whom personal characteristics have been stored to see whether a particular trusted person or group of common acquaintances are present therein. It is also within the spirit of the present invention for individuals to rate other individual members of their cluster, and such ratings can be collated and passed from person to person or cluster to cluster, and can be used for a cluster 700 to determine whether a search unit 750 person should be added to the cluster 700.

Figure 17:
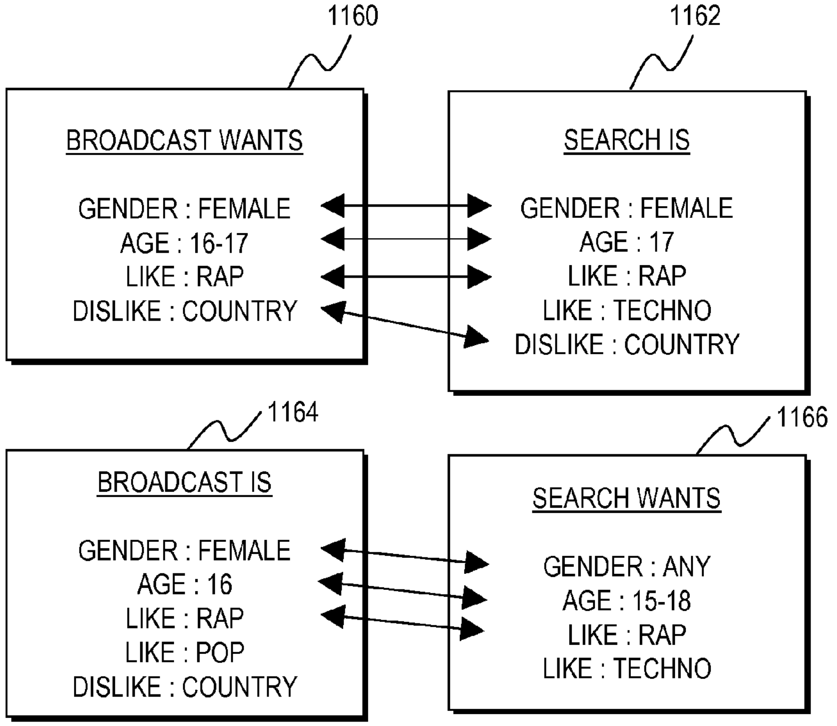
FIG. 17 is a matrix of DJ and searcher preferences and characteristics, illustrating the matching of DJ and searcher in admitting a search to a cluster.

FIG. 17 is a matrix of broadcaster and searcher preferences and characteristics, illustrating the matching of broadcaster and searcher in admitting a searcher to a cluster. A broadcaster preference table 1160 includes those characteristics that the broadcaster wishes to see in a new member of a cluster. These characteristics can include gender, age, musical "likes" and "dislikes", the school attended, and more. The searcher similarly has a preference table 1166. The searcher preference table 1166 and broadcaster preference table 1160 are not different in form, as the searcher will at another time function as the broadcaster for another group, and his preference table 1166 will then serve as the broadcaster preference table.

The broadcaster preference table 1160 can be automatically matched with a searcher characteristics table 1162. This table 1162 comprises characteristics of the searcher, wherein there will be characteristics that overlap in type (e.g. age, gender, etc.) which can then be compared with the parameters in the broadcaster preference table. This matching occurs during the period when the searcher is interrogating the cluster with interest in joining. Similarly, there is a broadcaster characteristics table 1164 indicating the characteristics of the broadcaster, which can be matched against the searcher preferences tale 1166.

The algorithm used in approving or disapproving of an accord between a preference table and a characteristics table can be varied and set by the user—whether by the broadcaster to accept new members into a cluster, or by a searcher to join a new cluster. For example, the user could require that the gender be an exact match, the age within a year, and the musical preferences might not matter. The user can additionally specify that an accord is acceptable if any one parameter matches, specify that an accord be unacceptable if any one parameter does not match, specify an accord be acceptable based on the overlap of a majority of the individual matches, or other such specification.

It should be noted that the broadcaster preferences table 1160 and the broadcaster characteristics table 1164 (and likewise with the searcher tables 1162 and 1166) can be a single table, according to the notion that a person will prefer people who are like themselves. Each user could then express the acceptable range of characteristics of people with which to join as a difference from their own values. For example, the parameter "same" could mean that the person needs to match closely, whereas "similar" could indicate a range (e.g. within a year) and "different" could mean anyone. In this way, there would not be the burden on the user to define the preference table 1160 or 1166 in a very detailed manner.

In the case of a cluster, the transfer of information between the searcher and the cluster can, as mentioned above, involve not only the broadcaster, but also other members of the cluster (especially since the searcher may not know the identity of a cluster's broadcaster from external observation). The cluster can also make communal decisions about accepting a new member. That is, if there are 4 members of a cluster, and a searcher indicates an interest in joining the cluster, there can be voting among the members of a cluster regarding the acceptance of the new member. The procedure of voting will normally be done by messaging among the members, which can be assisted by structured information transfer as will be described below.

A number of such voting schemes are described in FIG. 19, a table of voting schemes for the acceptance of new members into a cluster. The first column is the name of the rule, and the second column describes the algorithm for evaluation according to the rule. In the "BROADCASTER" rule, the broadcaster decides whether or not the new member will be accepted. The new member is accepted when the broadcaster indicates "yes" and is otherwise rejected.

In the "Majority" rule, the members are polled, and whenever a majority of the members vote either acceptance or rejection, the new member is accordingly accepted or rejected. It should be noted that this rule (as well as the rules to follow) depends on the broadcaster or other member of the cluster having knowledge of the number of members in the cluster, which will generally be the case (e.g. in an IP socket based system, the broadcaster can simply count the number of socket connections). Thus, if the number of members in a cluster is given as $N_{mem}$, as soon as $(N_{mem}/2)+1$ members have indicated the same result, that result is then communicated to the broadcaster, the members and the prospective new member. If the number of members is even, and there is a split vote, the result goes according to the broadcaster's vote.

According to the "Unanimous" rule, a new member is accepted only on unanimous decision of the members. Thus, the prospective new member is rejected as soon as the first "no" vote is received, and is accepted only when the votes of all members of the cluster are received, and all of the votes are positive.

The "Timed Majority" rule is similar to that of the "Majority" rule, except that a timer is started when the vote is announced, the timer being of a predetermined duration, and in a preferred embodiment, is indicated as a count down timer on the unit 100 of each member of the cluster 700. The vote is completed when $(N_{mem}/2)+1$ members vote with the same indication ("yes" or "no") if the timer has not completed its predetermined duration. If all of the members have voted, and the vote is a tie, the result goes in accordance with that of the broadcaster. If the timer has expired, and the vote has not been decided, the number of members that have voted is considered a quorum of number Q. If $(Q/2)+1$ members have voted in some fashion, that is the result of the vote. Otherwise, in the case of a tie, the result goes according to the vote of the broadcaster. If the broadcaster has not voted, the vote goes according to the first vote received.

The "Synchronized Majority" rule is similar to the Timed Majority rule, but instead of initiating the vote, and then waiting a predetermined period for members to vote, the vote is announced, and then there is a predetermined countdown period to the beginning of voting. The voting itself is very limited in time, generally for less than 10 seconds, and preferably for less than 3 seconds. Counting votes is performed only for the quorum of members that vote, and is performed according to the rules for the Timed Majority.

There are many different voting schemes consistent with creating, growing and maintaining clusters within the spirit of the present invention. For instance, in cases where there are close votes, the voting can be reopened for individuals to change their vote. In cases, members can request a new round of voting. Furthermore, the voting can be closed ballot, in which the votes of individuals are not known to the other members, or open voting, in which the identity of each member's vote is publicly displayed on each unit 100.

Figure 18A:
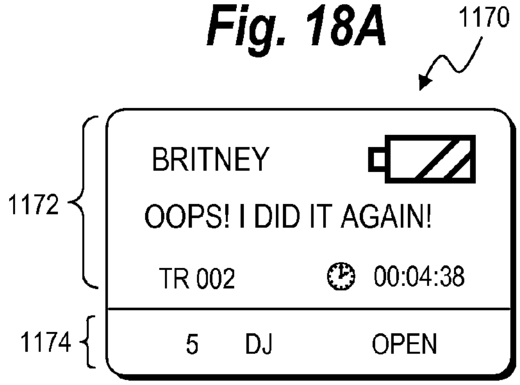
FIG. 18A is a screenshot of an LCD display of a unit, taken during normal operation.

In addition, the voting can be supported and enhanced by information made available to each member through displays on the units 100. FIG. 18A is a screenshot of an LCD display 1170 of a unit 100, taken during normal operation. The display 1170 is comprised of two different areas, an audio area 1172 and a broadcaster area 1174. The audio area 1172 includes information about the status of the audio output and the unit 100 operation, which can include battery status, the name of the performer, the title of the piece of music, the time the audio has been playing, the track number and more. The broadcaster area 1174 comprises information about the status of the cluster 700. In the example given, the broadcaster area includes the number "5", which represents the number of people current in the cluster, the text "DJ", which indicates that the unit 100 on which the display 1170 is shown is currently the broadcaster of the cluster 700, and the text "OPEN", which indicates that the cluster is open for new members to join (the text "CLOSED" would indicate that no new members are being solicited or allowed).

Figure 18B:
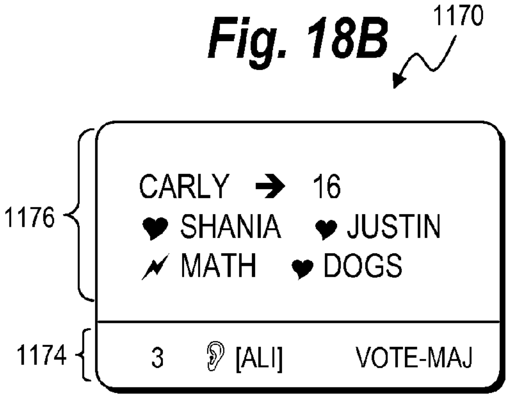
FIG. 18B is a screenshot of an LCD display of a unit, taken during voting for a new member.

FIG. 18B is a screenshot of an LCD display 1170 of a unit 100, taken during voting for a new member. The audio area 1172 is replaced by a new member characteristics area 1176, in which characteristics of the prospective new member are displayed. Such characteristics can include the name (or nickname) of the prospective new member, their age, and their likes (hearts) and dislikes (bolts). In the broadcaster area 1174, the digit "3" indicates that there are three current members of the cluster 700, and an ear icon indicates that the current unit 100 is being used to receive from the broadcaster rather than being a broadcaster, and the name [ALI] indicates the name of the current broadcaster. The text "VOTE-MAJ" indicates that the current vote is being done according to the Majority rule. The broadcaster area 1174 and the new member characteristics areas 1176 provide the information needed by the existing member to make a decision about whether to allow the prospective new member to join.

The displays 1170 of FIGS. 18A-B are indicative only of the types of information that can be placed on a display 1170, but it should be appreciated that there are many pieces of information that can be placed onto the displays 1170 and that the format of the display can be very widely varied. Furthermore, there need not be distinct audio areas 1172 and broadcaster areas 1174, but the information can be mixed together. Alternatively, especially with very small displays 1170, the display 1170 can be made to cycle between different types of information.

Figure 27:
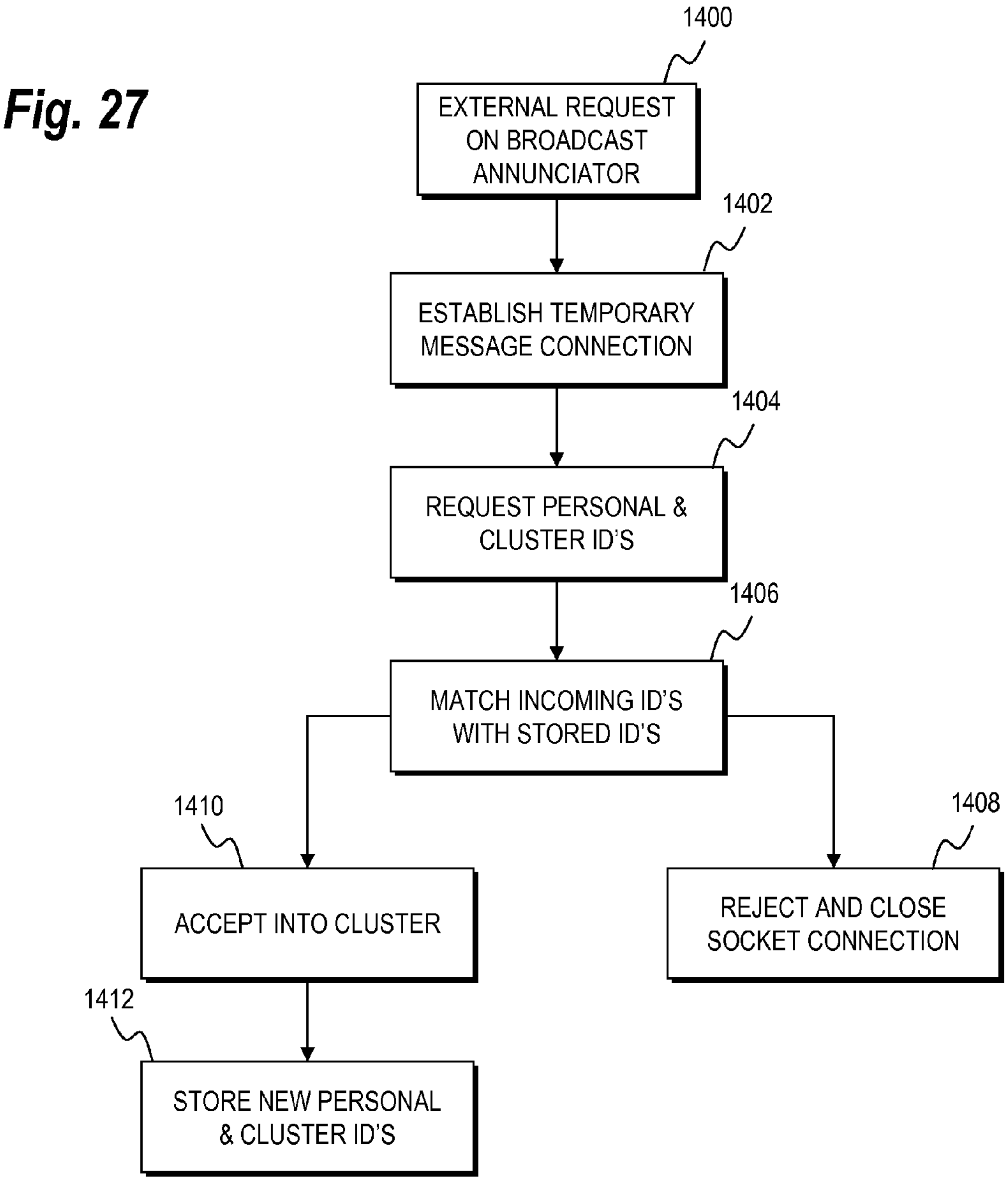
FIG. 27 is a schematic block flow diagram of using a prospective new member's previous associations to determine whether the person should be added to an existing cluster.

It is also within the spirit of the present invention for individuals to rate other individual members of their cluster, and such ratings can be collated and passed from person to person or cluster to cluster, and can be used for a cluster 700 to determine whether a search unit 750 person should be added to the cluster 700. FIG. 27 is a schematic block flow diagram of using a prospective new member's previous associations to determine whether the person should be added to an existing cluster.

In a step 1400, from a search unit 750, the prospective new member places an external communication request with an operational broadcast annunciator 1050 by a broadcast unit 710. In a step 1402, a temporary message connection is established through which information can be passed mutually between the search unit 750 and the broadcast unit 710. The broadcast unit 710 requests personal and cluster ID's from the search unit 750. The personal ID is a unique identifier that can be optionally provided to every audio unit 100, and which can further be optionally hard-encoded into the hardware of the unit 100. The cluster IDs represent the personal ID's of other units 100 with which the search unit 750 has been previously associated in a cluster. In a step 1406, the broadcast unit 710 matches the incoming personal IDs and cluster IDs with personal ID's and cluster IDs that are stored in the memory of the broadcast unit 710. If there exist a sufficient number of matches, which can be computed as a minimum number or as a minimum fraction of the IDs stored in the broadcast unit 710, the new member of the search unit 750 can be accepted into the cluster. In a step 1412, the search unit 750 can then store the ID of the broadcast unit 710 and the other members of the existing cluster 700 into his cluster IDs, and the broadcast unit 750 and the other receive units 730 of the cluster can then store the personal ID of the search unit 750 into their cluster IDs. If there does not exist a sufficient number or quality of matches, the broadcast unit 710 will reject the prospective new member, optionally send a message of rejection, and then close the socket connection (or other connection that had been created) between the broadcast unit 710 and the search unit 750. No new IDs are stored on either unit 710 or 750.

It is also within the spirit of the present invention for other information associated with the personal and cluster IDs to be shared and used in the algorithm for determining whether to accept or reject a prospective new member into a cluster 700. This information can include rating information, the duration of association with another cluster 700 (i.e. the longer the association, the more suitable the social connection of that person with the cluster 700 would have been), the size of the cluster 700 when the searcher was a member of a particular cluster 700, the popularity of a cluster 700 (measured by the number of cluster IDs carried by the broadcast unit 710), and more. The matching program, likewise, would weight the existence of a match by some of these quality factors in order to determine the suitability of the searcher to join the cluster.

While the comparisons can be made between a search unit 750 personal and cluster IDs and those from the broadcast unit 710, representing the personal experience of the owners of the respective units, it is also possible that the reputation or desirability of individuals with a given personal ID can be posted to or retrieved from trusted people. For example, two friends can swap the information of which IDs are to be trusted or not between two units 100, or alternatively, can be posted onto or retrieved from the Internet. For example, after a bad personal experience with a unit 100 with a personal ID of 524329102, a person could post that ID on the Internet to share with friends, so that the friends could avoid allowing that person to join, or avoid joining a cluster with that person.

It should be noted that publishing a list of personal IDs allows people to establish the breadth of their contacts. By posting their contacts on web sites, people can demonstrate their activity and popularity. This also encourages people to join clusters, in order to expand the number of people with whom they have been associated. Furthermore, the personal ID serves as a "handle" by which people can further communicate with one another. For example, on the Internet, a person can divulge a limited amount of information (e.g. an email address) that would allow other people with whom they have been in a cluster together to contact them.

It should be noted that the formation and maintenance of a cluster 700 requires the initial and continued physical proximity of the broadcast unit 710 and the receive unit 730. In order to help maintain such physical proximity conducive to cluster maintenance, feedback mechanisms can be used to alert the users to help them maintain the required physical proximity, as will be discussed below.

Figure 28:
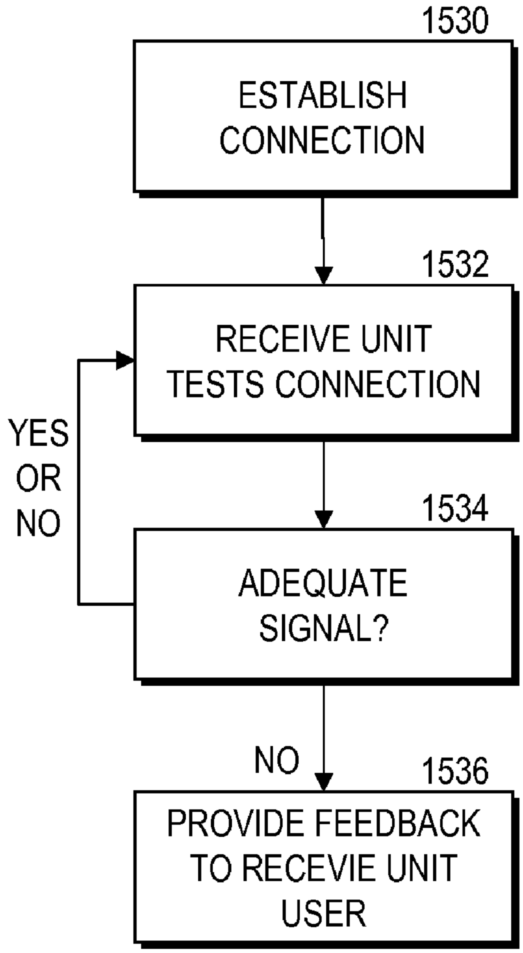
FIG. 28 is a block flow diagram indicating the steps used to maintain physical proximity between the broadcast unit and the receive unit via feedback to the receive unit user.

FIG. 28 is a block flow diagram indicating the steps used to maintain physical proximity between the broadcast unit 710 and the receive unit 730 via feedback to the receive unit user. In a step 1530, the wireless connection between the broadcast unit 710 and the receive unit 730 is established. In a step 1532, the connection between the two units 710 and 730 is tested. There are a number of different means by which this testing can take place. For example, in IP-based communications, the receive unit 730 can from time to time—though generally less than every 10 seconds, and even more preferably less than every 1 second—use the "ping" function to test the presence and speed of connection with the broadcast unit 710. Alternatively, the receive unit 730 will be receiving audio signals wirelessly almost continuously from the broadcast unit 710, and a callback alert function can be instituted such that loss of this signal determined at a predetermined repeat time—which is conveniently less than 5 seconds, and even more preferably less than every 1 second—and which is then reported to the system.

While the methods above determine the absolute loss of a signal, they do not anticipate loss of signal. A method that does anticipate signal issues prior to loss is the measurement of signal strength. This can be done directly in the signal reception hardware by measuring the wireless signal induced current or voltage.

In a step 1534, the results of the connection testing performed in the step 1532 is analyzed in order to determine whether the signal is adequate. It should be noted that a temporary loss of signal, lasting even seconds, may or may not be of importance. For example, the broadcast unit 710 user and receive unit 730 users could walk on opposite sides of a metallic structure, enter a building at different times, change their body posture such that the antennae are not optimally situated with respect to one another, etc. Thus, an algorithm is generally used to time average the results of the step 1532, with the results conveniently time averaged over a matter of seconds.

Whatever the results of the signal test of the step 1534, the step 1532 is continuously repeated as long as the connection between the broadcast unit 710 and the receive unit 730 is present. If the signal is deemed inadequate, however, feedback to that effect is provided to the receive unit 730 user in a step 1536. The user feedback can occur through a variety of mechanisms, including visual (flashing lights) and tactile (vibration) transducers, emanating either from the audio unit 100 or the digital jewelry 200. For example, the receiver unit 730 can send a signal to the associated digital jewelry 200 to effect a special sequence of light transducer output.

It is most convenient, however, for the audio output of the receiver unit 730 as heard by the user to be interrupted or overlain with an audio signal to alert the user to the imminent or possible loss of audio signal. This audio signal can include clicks, beeps, animal sounds, closed doors, or other predetermined or user selected signals heard over silence or the preexisting signal, with the signal possibly being somewhat reduced in volume such that the combination of the preexisting signal and the feedback signal is not unpleasantly loud.

It should be noted that the flow diagram of FIG. 28 refers specifically to alerting the receive unit 730 user of potential communications issues. Such alerting can also be usefully transferred to or used by the broadcast unit 710. For example, with knowledge of the communications issues, the broadcast unit 710 user can move more slowly, make sure that the unit is not heavily shielding, that any changes in posture that could relate to the problems are reversed, etc. The broadcast unit 710 can perform communications tests (as in the step 1532) or analyze the tests to determine if the communications are adequate (as in the step 1534)—particularly through use of the messaging TCP channels. Given that there can be multiple receive units 730 connected to s single broadcast unit 710, it is generally preferable for the tests to be performed on the receive units 730, and problems to be communicated to the broadcast unit 710—provided, however, that communications still exist for such communication.

In order to overcome this deficiency, it is possible for the receiver unit 730 to communicate potential problems in communications to the broadcast unit 710 at an early indication. The broadcast unit 710 then starts a timer of predetermined length. If the broadcast unit 710 does not receive a "release" from the receive unit 730 before the timer has completed its countdown, it can then assume that communications with the receive unit 730 have been terminated, and it can then send feedback to the broadcast unit 710 user.

It is also within the teachings of the present invention for both the broadcast unit 710 and the receive unit 730 to independently monitor the connections with each other, and alert their respective users of communications problems.

It should be noted that the use of audio alerts can be used more generally within the user interface of the audio units 100. Thus, audio alerts can be conveniently used to inform the user of the joining of new members to the cluster 700, the initiation of communications with search units 750 outside of the group, the leaving of the group by existing cluster 700 members, the request by a receive unit 730 to become the broadcast unit 710, the transfer of cluster control from a broadcast unit 710 to a receive unit 730, and more. These alerts can be either predetermined by the hardware (e.g. stored on ROM), or can be specified by the user. Furthermore, it can be convenient for the broadcast unit 710 to temporarily transfer to new members of the cluster custom alerts, so that the alerts are part of the experience that the broadcast unit 710 user shares with the other members of the cluster. Such alerts would be active only as long as the receive units were members of the cluster 700, and then would revert back to the alerts present before becoming cluster members.

Cluster Hierarchy

Figure 9A:
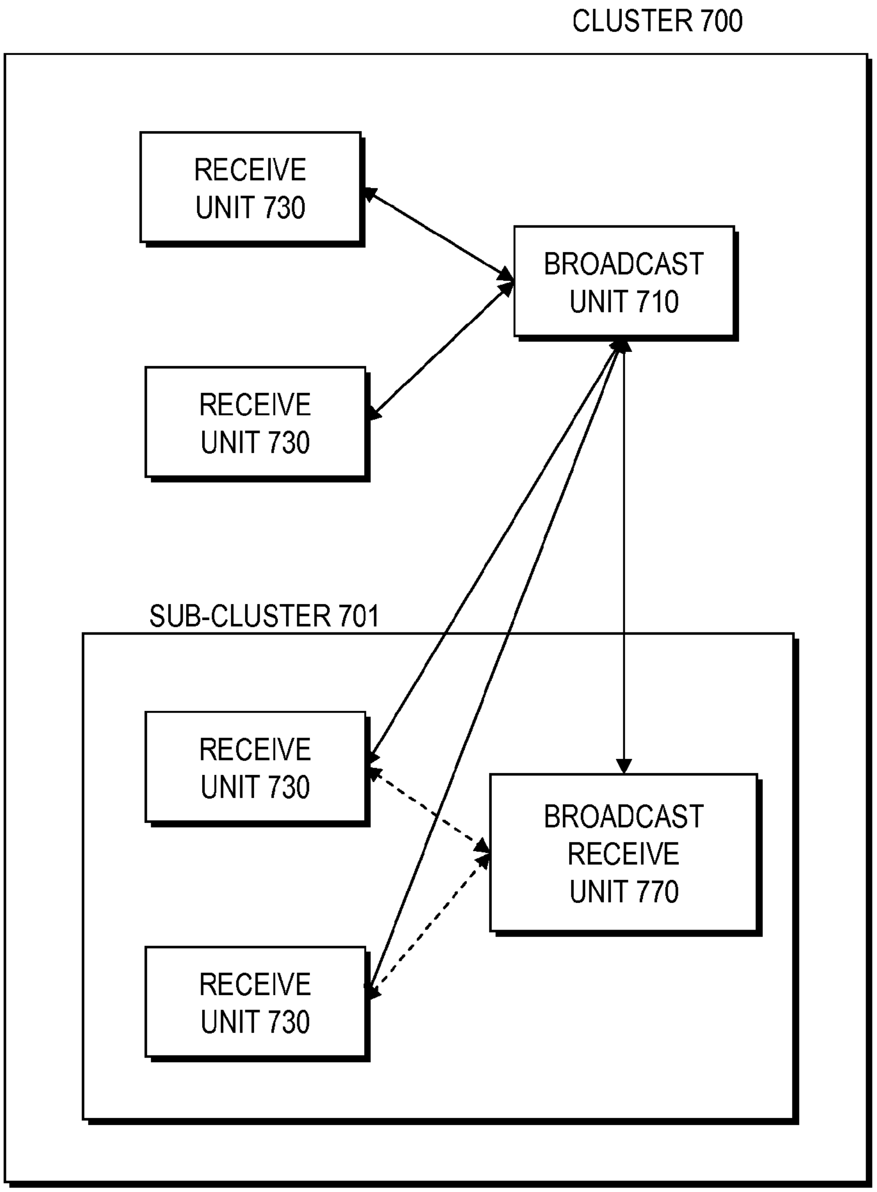
FIGS. 9A and 9B are schematic block diagrams of hierarchically-related clusters.
Figure 9B:
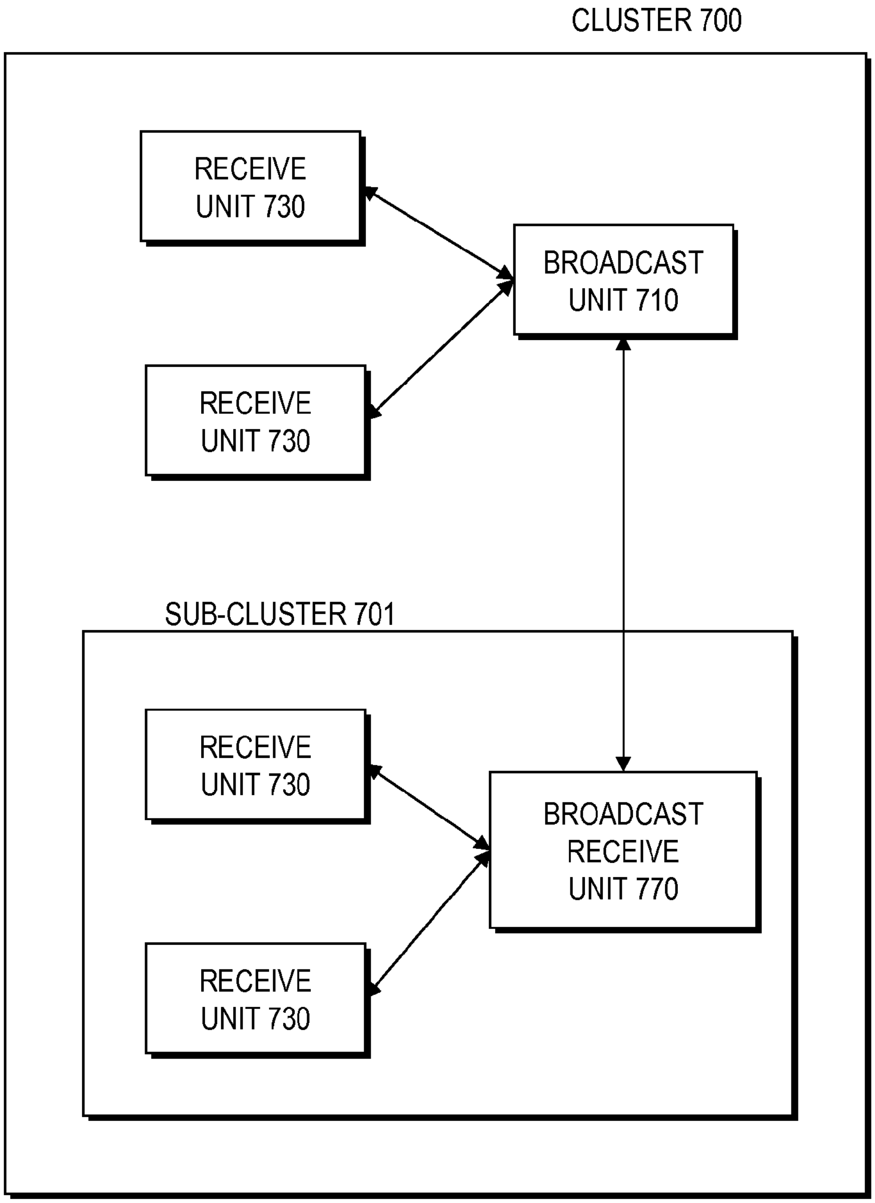

A receive unit 730 can also be the broadcast unit 710 of a separate cluster 700 from the cluster 700 of which it is a member. This receive unit is called a broadcasting receiver 770. In such case, it is convenient for the receive units 730 that are associated with the broadcasting receiver 770 to become associated with the cluster 700 of which the broadcasting receiver 770 is a member. This can conveniently be accomplished in two different ways. In a first manner, the receive units 730 that are associated with the broadcasting receiver 770 can become directly associated with the broadcast unit 710, so that they are members only of the cluster 700, and are no longer associated with the broadcasting receiver 770. In a second manner, the receive units 730 associated with the broadcasting receiver 770 can remain primarily associated with the broadcasting receiver 770, as shown in FIGS. 9A and 9B, which are schematic block diagrams of hierarchically-related clusters. In FIG. 9A, the receive units 730 that are members of a sub-cluster 701 of which the broadcast unit is a broadcast receive unit 770, can receive music directly from the broadcast receive unit 710, while retaining their identification with the broadcasting receiver 770, such that if the broadcasting receiver 770 removes itself or is removed from the cluster 700, these receive units 730 similarly are removed from the cluster 700. In order to provide this form of hierarchical control, the sub-cluster 701 receive units 730 can obtain an identifier, which can be an IP socket address, from the broadcast receive unit 770, indicating the desired link to the broadcast unit 710. The sub-cluster receive units 730, however, maintain direct communications with the broadcast receive unit 770, such that on directive from the unit 770, they break their communications with the unit 710, and reestablish normal inter-unit audio signal communications with the broadcast receive unit 770. In an embodiment using IP addressing and communications, this can involve the maintenance of TCP messaging communications between the sub-cluster 701 receive units 730 with the broadcast receive unit 770, during the time that the sub-cluster 701 is associated with the cluster 700.

In FIG. 9B, the receive units 730 of the sub-cluster 701 receive music directly from the broadcasting receiver 770, which itself receives the music from the broadcast unit 710. In such case, as the broadcasting receiver 770 is removed from the cluster 700, the receive units 730 of the sub-cluster 701 would also not be able to hear music from the cluster 700.

It would be apparent that such an arrangement can be hierarchically arranged, such that the receive unit 730 of the sub-cluster 701 can itself be the broadcast receiver 770 of another sub-cluster 701, and so forth. The advantage of this arrangement is that people that are associated with one another, forming a cluster 700, can move as a group from cluster to cluster, maintaining a separate identity.

It should be also noted that the configuration of communications between members of a hierarchical cluster can be variously arranged, not only as shown in FIGS. 9A and 9B. For example, every member of the cluster 700 can have a direct link between every other member of the cluster 700, such that no re-broadcast of messages needs to take place. Furthermore, given that there are different inter-unit communications (for example, messaging versus audio broadcast), it is within the teachings of the present invention that the configuration for the different modes of communication can be different—for example direct communications between the broadcast unit 710 for audio broadcast, but peer-to-peer communications between individual units for messaging.

Maintaining Private Communications

In order to restrict membership in a cluster 700, either the information transfer must be restricted, such as by keeping private the socket IP addresses or passwords or other information that is required for a member to receive the signal, or the signal can be transmitted openly in encrypted form, such that only those members having been provided with the encryption key can properly decode the signal so sent. Both of these mechanisms are taught within the present invention, and are described at various points within this specification.

Figure 32A:
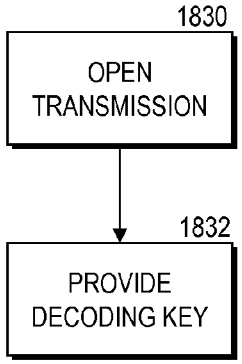
FIG. 32A is a schematic block diagram of maintaining privacy in open transmission communications.

FIG. 32A is a schematic block diagram of maintaining privacy in open transmission communications. In this case, the transmission is freely available to search units 750 in a step 1830, such as would occur with a digital RF broadcast, or through a multicast with open a fixed, public socket IP address available in certain transmission protocols. In this case, the broadcast audio signal or information signal is made in encrypted form, and membership in the cluster is granted through transfer of a decoding key in a step 1832.

Figure 32B:
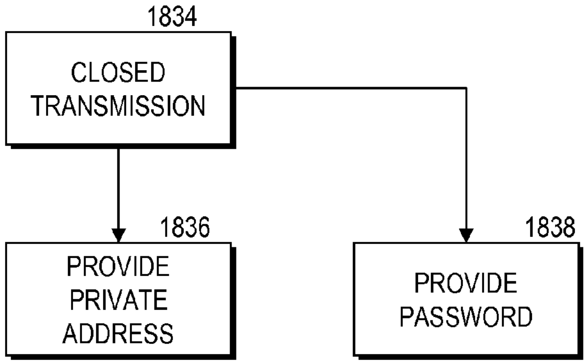
FIG. 32B is a schematic block diagram of maintaining privacy in closed transmission communication.

FIG. 32B is a schematic block diagram of maintaining privacy in closed transmission communication. In a step 1834, the broadcast unit 710 makes a closed transmission broadcast, such as through a socket IP address, that is not publicly available. In a step 1836, the broadcast unit 710 provides the private address to the search unit 750, which can now hear the closed transmission from the step 1834, which is not encrypted. Alternatively, or in addition to the provision of the private address in the step 1836, the establishment of the connection through the private, closed transmission is effected via a password provided in a step 1838. This password can, for example, be used in the step 1110 (e.g. see FIG. 14B) to determine whether the broadcast unit 710 accepts the search unit 750 for audio multicasting.

In this section, the encryption of the musical signal and/or associated information about personal characteristics of members of the cluster 700 is described. The custom compressor 330 of the unit 100 can perform the encryption. In such a case, before joining a cluster, the search unit 750 can only receive some limited information, such as characteristics of the music being heard or some limited characteristics of the users in the cluster 700. If the search unit 750 user requests permission to join the cluster 700 and it is granted, the broadcast unit 710 can then provide a decryption key to the search unit 750 that can be used to decrypt the music or provide a private IP address for multicasting, as well as supply additional information about the current members of cluster 700.

It should be noted that in certain cases, it can be useful to have multiple forms of privacy protection. For example, a broadcast unit 710 can provide a search unit 750 access to audio signals and information for the cluster 700, but can reserve certain information based on encryption to only some members of the cluster 700. For example, if a group of friends comprise a cluster 700, and accept some new members into the cluster 700, access to more private information about the friends, or communications between friends, can be restricted on the basis of shared decryption keys.

Figure 33:
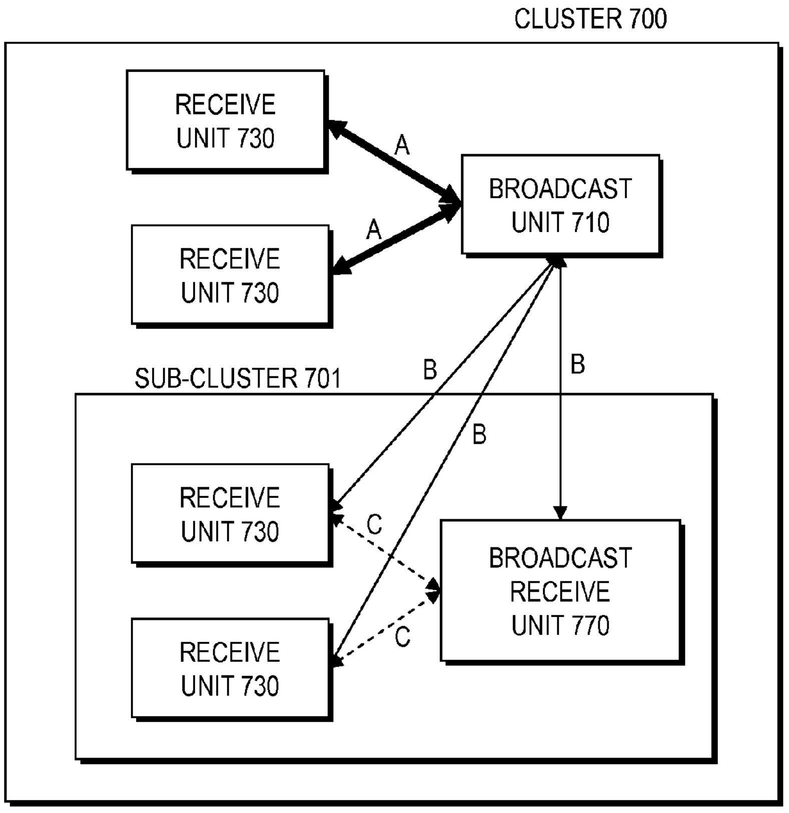
FIG. 33 is a schematic block diagram of a hierarchical cluster, as in FIG. 9A, in which communications between different units is cryptographically or otherwise restricted to a subset of the cluster members.

FIG. 33 is a schematic block diagram of a hierarchical cluster, as in FIG. 9A, in which communications between different units is cryptographically or otherwise restricted to a subset of the cluster members. Thus, there are three types of communication that are used in the communication: channel A, which takes place between the members of the original cluster; channel B, which takes place between the members of the original cluster (mediated through the broadcast unit 710) and members of the sub-cluster 701; and channel C, which takes place between the members of the sub-cluster 701. Thus, a communications originating from the broadcast unit 710 can be directed either through channel A or channel B, and likewise, a communications originating from the broadcast receive unit 770 can be directed either at members only of the sub-cluster 701 through channel C, or to all members of the cluster 700 through both channels C and B, which is then communicated trough channel A.

A number of means can be used to maintain such independent channels. For example, separate socket communications can be established, and the originators of the communications can determine that information which is carried on each separate channel. For example, given an open transmission scheme such as digital RF signal, the information can be encoded with separate keys for the different channels of communication—thus, the cryptographic encoding determines each channel. A given unit 100 can respond to more than one encoding. Indeed, a channel identifier can be sent with each piece of information indicating the ID of the decoding key. If a unit 100 does not have the appropriate decoding key, then it is not privy to that channel communications.

Alternatively, if the communications is IP socket based, then each channel is determined by IP socket addresses. Furthermore, access to those addresses can be, for example, password controlled. Also, the socket communications can be broadcast so that any unit 100 can receive such broadcast, but that decoding of the broadcast can be mediated through cryptographic decoding keys.

It should be noted that there can be multiple forms of communication, which can comprise messaging communications using the TCP/IP protocols, versus multicasting using UDP protocols, and also DJ 200 control signals using yet another protocol. The access to each of these communications can be controlled via different privacy hierarchies and techniques. For example, the audio multicasting will be available to all members within a cluster, while the messaging may retain different groupings of privacy (e.g. hierarchical), while the DJ control signals will generally be limited to communications between a given unit 100 and its corresponding DJs 200.

Broadcast Control Transfer

The dynamics of cluster 700 can be such that it will be desirable for a receive unit 730 to become the broadcast unit for the cluster. Such a transfer of broadcast control will generally require the acquiescence of the broadcast unit 710 user. To effect such a transfer, the user of the receiver unit 730 desiring such control will send a signal to the broadcast unit 710 expressing such intention. If the user of the broadcast unit 710 agrees, a signal is sent to all of the members of the cluster indicating the transfer of broadcast control, and providing the identifier associated with the receive unit 730 that is to become the broadcast unit 710. The broadcast unit 710 that is relinquishing broadcast control now becomes a receive unit 730 of the cluster 700.

It should be noted that the transfer of control as described above requires the manual transfer of control, such as actuation of a DJ switch. This switch can be limited to this function, or can be part of a menu system, in which the switch is shared between different functions. It is also within the spirit of the present invention that there be voice-activated control of the unit 100, in which the unit 100 further comprises a microphone for input of voice signals to a suitable controller within the unit 100, wherein the controller has voice-recognition capabilities.

In the case of a cluster 700 whose broadcast unit 710 is no longer broadcasting (e.g. it is out of range of the receive units 730, or it is turned off), the cluster can maintain its remaining membership by selecting one of the receive units 730 to become the new broadcast unit 710. Such a choice can happen automatically, for example by random choice, by a voting scheme, or by choosing the first receive unit 730 to have become associated with the broadcast unit 710. If the users of the cluster-associated units deem this choice to be wrong, then they can change the broadcast unit 710 manually as described above.

The receive unit 730 that is chosen to become the broadcast unit 710 of the cluster 700 will generally prompt its user of the new status, so that the newly designated broadcast unit 710 can make certain that it is playing music to the rest of the cluster 700. It can be further arranged so that a newly-designated broadcast unit 710 will play music at random, from the beginning, or a designated musical piece in such case.

Figure 16:
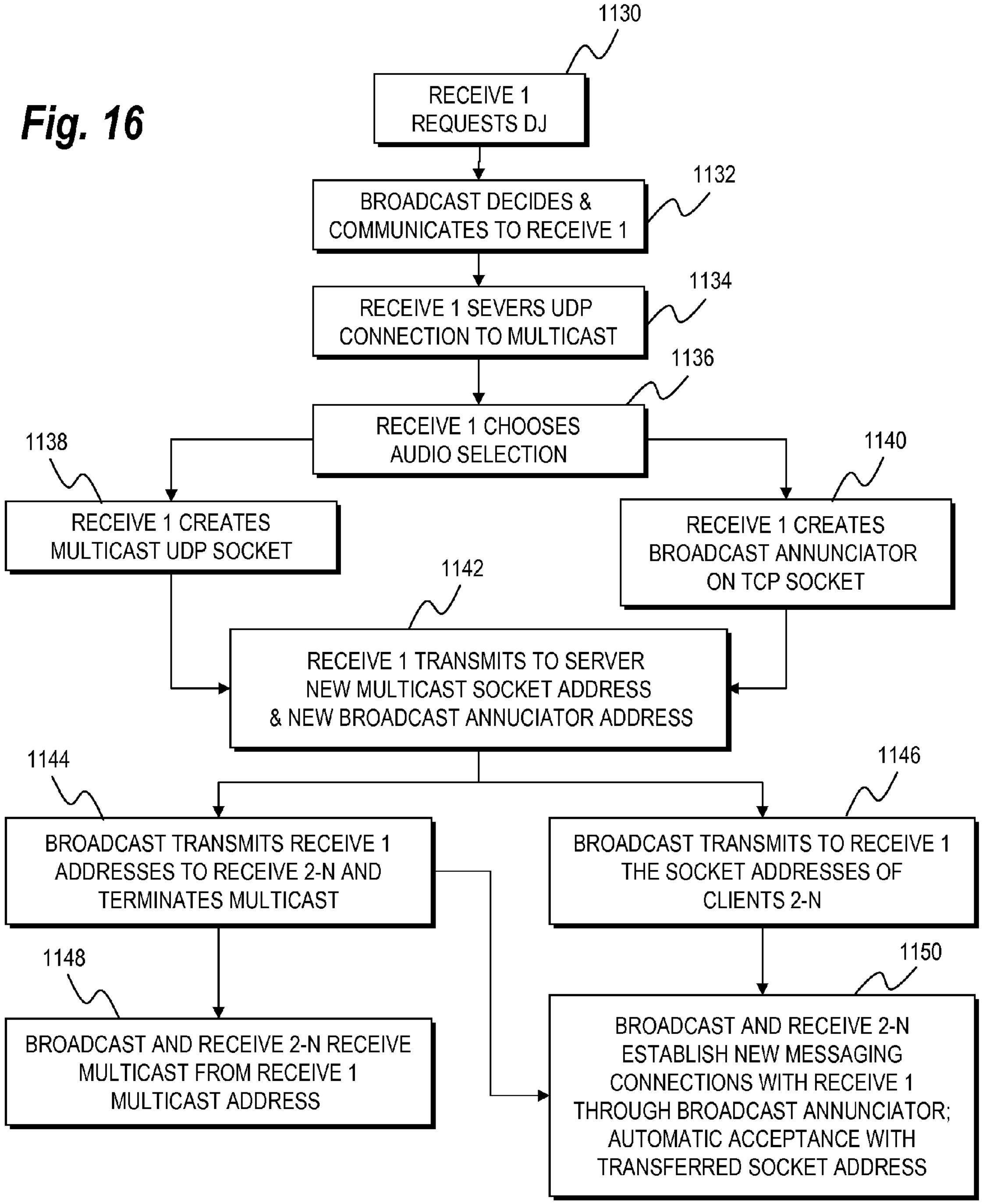
FIG. 16 is a schematic block flow diagram of transfer of control between the broadcast unit and the first receive unit.

An embodiment of a transfer of broadcast control using IP socket communications protocols is described here. FIG. 16 is a schematic block flow diagram of transfer of control between the broadcast unit 710 and the first receive unit 730. In a step 1130, the receive unit 730 requests broadcast control (designated here as "DJ" control). In a step 1132, the user of the broadcast unit 710 decides whether control will be transferred. The decision is then transferred back to the first receive unit 730 via the TCP messaging socket. If the decision is affirmative, the first receive unit 730 severs its UDP connection to the broadcast unit 710 multicast. The reason for this is to allow the receive unit 730 opportunity to prepare the beginning of its broadcast, if such time is required, and the user cannot both listen to the multicast as well as prepare its own audio selections, which occurs in a step 1136. In a step 1138, the receive unit 730 creates a multicast UDP socket with which it will later broadcast audio to other members of the cluster, while in a step 1140, the receive unit 730 creates a broadcast annunciator TCP socket with which to announce availability of the cluster, as well as to accept transfers of members from the broadcast unit 710 to itself as the new broadcast unit.

When the two new sockets (multicast and annunciator) are created, the receive unit 730 transmits the new socket addresses to the broadcast unit 710 in a step 1142. Since the other members of the cluster are guaranteed to be in contact with the broadcast unit, they can get addresses of the new, soon-to-be broadcast unit from the existing broadcast unit. In a step 1144, the original broadcast unit 710 transmits to the other cluster members (receive units 730 numbers 2-N) the addresses of the sockets on the receive 1 unit 730 that is now the new broadcast unit 710, and terminates its own multicast. The termination is performed here because the other receive units will be transferring to the new multicast, and because the original broadcast unit 710 is now becoming a receive unit 730 in the reconstituted cluster. In the step 1148, multicast of audio is now provided by the receive 1 unit 730 that has now become the new broadcast unit 710), and the original broadcast unit is listening to audio provided not by itself, but rather by the new broadcast unit.

In a step 1146, performed roughly synchronously with the step 1144, the original broadcast unit 710 transmits the socket addresses of the message handler TCP sockets of the other members of the cluster 700 (i.e. the receive units 730 numbers 2-N). In the subsequent step 1150, the original broadcast unit 710 and the receive units 730 numbers 2-N establish new messaging connections with the receive 1 unit 730 that is now the new broadcast unit 710. While there can be a set of criteria for the acceptance of a new member to a cluster, because the receive 1 unit 730 has received the message socket addresses of the other members of the cluster in the step 1144, the receive 1 unit 730 accepts new members with the socket addresses received. It should be noted that instead of socket addresses being the identifiers passed, the identifiers can also be unique machine IDs, random numbers, cryptograpically encoded numbers, or other such identifiers that can be transmitted from one member of the cluster to another.

It should be noted in certain embodiments, that there can be insufficient time for the new broadcast unit 710 to determine a set of music to broadcast to the members of its cluster. It is within the spirit of the present invention for a user to set a default collection of music that is broadcast when no other music has been chosen. This set of music can comprise one or more discrete audio files.

Audio and DJ Choreography

One of the attractions of the present invention is that it allows users to express themselves and share their expressions with others in public or semi-public fashion. Thus, it is highly desirable for users to be able to personalize aspects of both the audio programming as well as the displays of their DJs 200.

Audio

Audio personalization comprises the creation of temporally linked collections of separate musical elements in "sets." These sets can be called up by name or other identifier, and can comprise overlapping selections of music, and can be created either on the unit 100 through a visual or audio interface, or can be created on a computer or other music-enabled device for downloading to the unit 100.

In addition, the unit 100 or other device from which sets are downloaded can comprise a microphone and audio recording software whereby commentary, personal music, accompaniment, or other audio recordings can be recorded, stored, and interspersed between commercial or pre-recorded audio signals, much in the manner that a radio show host or "disc jockey" might alter or supplement music. Such downloads can be accessible from a variety of sources including Internet web sites and private personal computers.

Automatic Generation of DJ 200 Control Signals

In this section, we will describe the automatic and manual generation of control signals for the DJ 200 transducers. The control signals are generally made to correspond to audio signals played on the units 100, although it is within the spirit of the present invention for such control signals to be made separate from audio signals, and to be displayed on the digital jewelry independently of audio signals played on the unit 100. FIG. 20 is a time-amplitude trace of an audio signal automatically separated into beats. Beats 1180, 1182 and 1183 are denoted by vertical dashed and dotted lines and, as described below, are placed at locations on the basis of their rapid rise in low-frequency amplitude relative to the rest of the trace. As can be seen, the beats 1180 are generally of higher amplitude than the other beats 1182 and 1183, and represent the primary beats of a 4/4 time signature. The beat 1183 is of intermediate nature between the characteristics of the beats 1180 and 1182. It represents the third beat of the second measure. Overall, the audio signal thus displayed can be orally represented as ONE-two-Three-four-ONE-two-Three-four ("one" is heavily accented, and the "three" is more lightly accented), which is common in the 4/4 time signature.

Figure 21A:
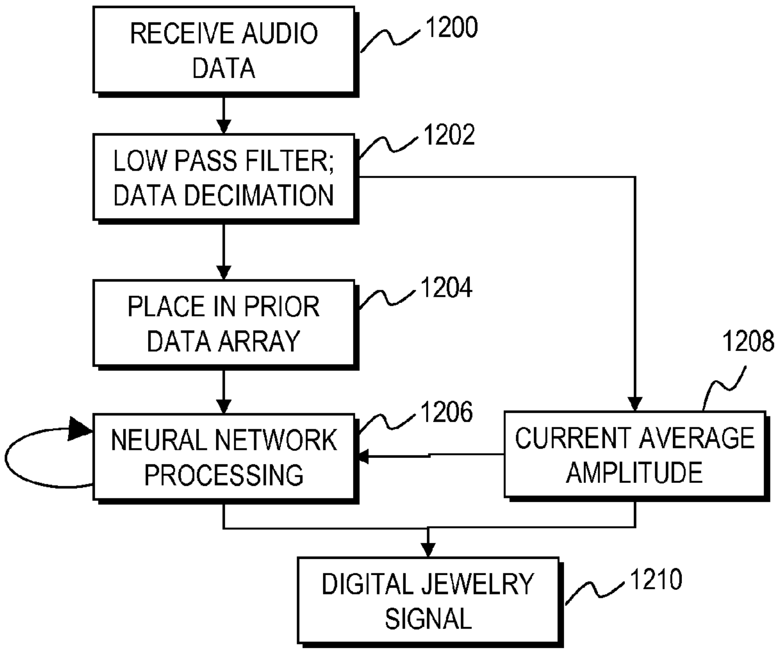
FIG. 21A is a block flow diagram of a neural network method of creating DJ transducer control signals from an audio signal as shown in FIG. 20.

Processing of this data can proceed via a number of different methods. FIG. 21A is a block flow diagram of a neural network method of creating DJ 200 transducer control signals from an audio signal as shown in FIG. 20. In a step 1200, audio data is received either at the unit 100 or the DJ 200. It should be noted that the creation of control signals from audio signals can, within the present invention, take place at either the unit 100 or the DJ 200, or even at a device or system not part of or connected to the unit 100 or DJ 200 (as will be described in more detail below). In an optional step 1202, the data is low pass filtered and/or decimated so that the amount of data is reduced for computational purposes. Furthermore, the data can be processed for automatic gain to normalize the data for recording volume differences. Furthermore, the automatic gain filtering can provide control signals of significant or comparable magnitude throughout the audio data.

In general, the creation of the audio signal depends on audio representing a period of time, which can be tens of milliseconds to tens of seconds, depending on the method. Thus, the audio data from the step 1202 is stored in a prior data array 1204 for use in subsequent processing and analysis. At the same time, the current average amplitude, computed over an interval of preferably less than 50 milliseconds, is computed in a step 1208. In broad outline, the analysis of the signal compares the current average amplitude against the amplitude history stored in the prior data analysis. In the embodiment of FIG. 21A, the comparison takes places through neural network processing in a step 1206, preferably with a cascading time back propagation network which takes into account a slowly varying time signal (that is, the data in the prior data array changes only fractionally at each computation, with most of the data remaining the same). The use of prior steps of neural network processing in the current step of neural network processing is indicated by the looped arrow in the step 1206. The output of the neural network is a determination whether the current time sample is a primary or a secondary beat. The neural network is trained on a large number of different music samples, wherein the training output is identified manually as to the presence of a beat.

The output of the neural network is then converted into a digital jewelry signal in a step 1210, in which the presence of a primary or secondary beat determines whether a particular light color, tactile response, etc., is activated. This conversion can be according to either fixed, predetermined rules, or can be determined by rules and algorithms that are externally specified. Such rules can be according to the aesthetics of the user, or can alternatively be determined by the specific characteristics of the transducer. For example, some transducers can have only a single channel or two or three channels. While light transducers will generally work well with high frequency signals, other transducers, such as tactile transducers, will want signals that are much more slowly varying. Thus, there can be algorithm parameters, specified for instance in configuration files that accompany DJ 200 transducers, that assist in the conversion of beats to transducer control signals that are appropriate for the specific transducer.

Figure 21B:
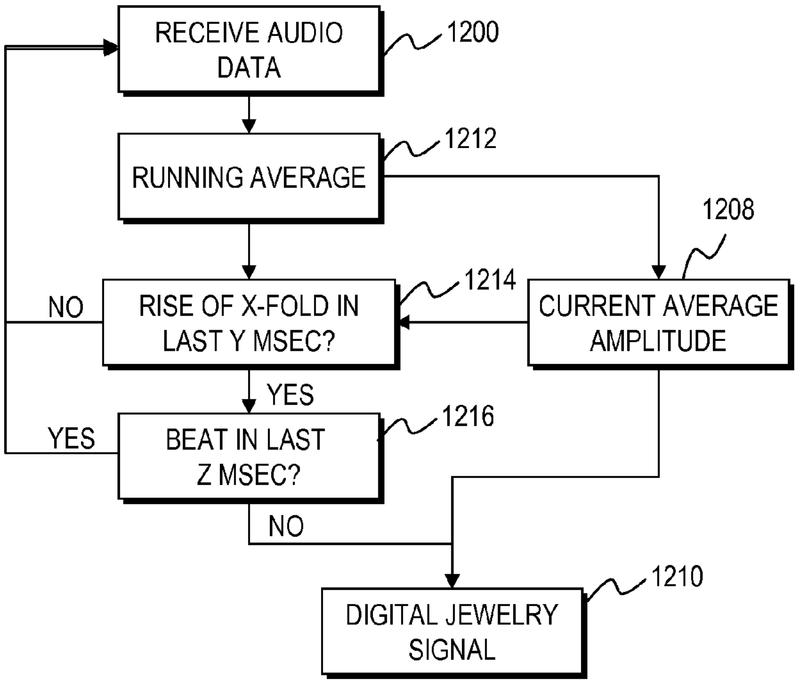
FIG. 21B is a block flow diagram of a deterministic signal analysis method of creating DJ transducer control signals from an audio signal as shown in FIG. 20.

FIG. 21B is a block flow diagram of a deterministic signal analysis method of creating DJ 200 transducer control signals from an audio signal as shown in FIG. 20. The data is received in the step 1200. In this case, a running average over a time sufficient to remove high frequencies, and preferably less than 50 milliseconds, is performed in a step 1212. Alternatively, a low pass filter and/or data decimation as in the step 1202 can be performed.

In a step 1214, the system determines whether there has been a rise of X-fold in average amplitude over the last Y milliseconds, where X and Y are predetermined values. The value of X is preferably greater than two-fold and is even more preferably three-fold, while the value of Y is preferably less than 100 milliseconds and is even more preferably less than 50 milliseconds. This rise relates to the sharp rises in amplitude found in the signal at the onset of a beat, as shown in FIG. 20 by the beat demarcations 1180, 1182, and 1183. If there has not been a rise meeting the criteria, the system returns to the step 1200 for more audio input.

If the signal does meet the criteria, it is checked to ensure that the rise in amplitude is not the "tail end" of a previously identified beat. For this, in a step 1216, the system determines whether there has been a previous beat in the past Z milliseconds, where Z is a predetermined value preferably less than 100 milliseconds, and even more preferably less than 50 milliseconds. If there has been a recent beat, the system returns to the step 1200 for more audio input. If there has not been a recent beat, then a digital jewelry signal is used to activate a transducer. The level of transduction can be modified according to the current average amplitude which is determined in a step 1208 from, in this case, the running average computed in the step 1212.

The embodiment of FIG. 21B provides transducer activation signals at each rapid rise in amplitude, with the activation signal modulated according to the strength of the amplitude. This will capture much of the superficial musical quality of the audio signal, but will not capture or express more fundamental patterns within the audio signal.

Figure 21C:
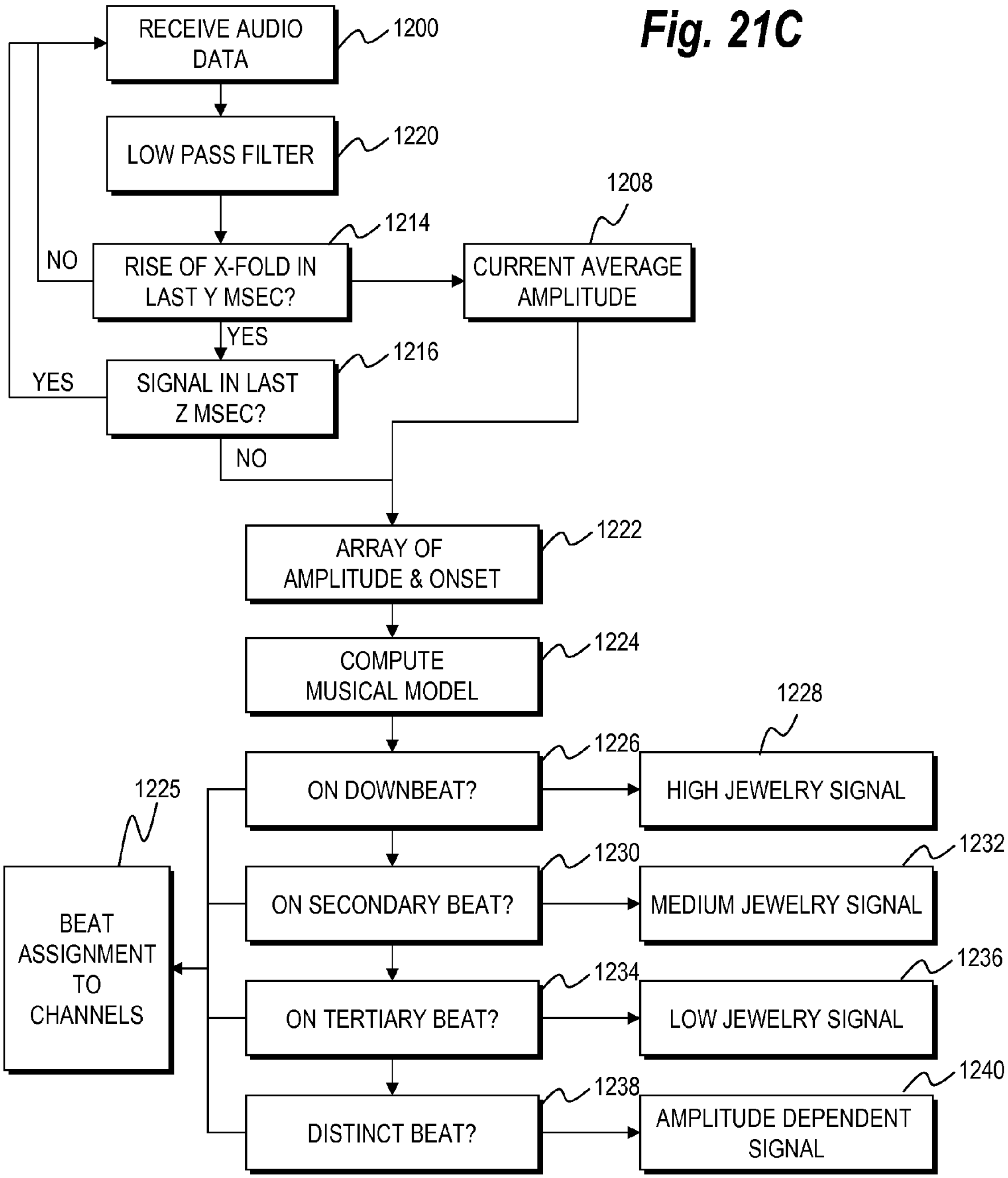
FIG. 21C is a schematic flow diagram of a method to extract fundamental musical patterns from an audio signal to create DJ control signals.

FIG. 21C is a schematic flow diagram of a method to extract fundamental musical patterns from an audio signal to create DJ 200 control signals. In the step 1200, the audio data is received into a buffer for calculations. In a step 1220, a low pass filter is applied to remove high frequency signal. Such high frequency signals can alternatively be removed via decimation, running averages, and other means as set forth in the embodiments of FIGS. 21A and B. As in the embodiment of FIG. 21B, beat onsets are extracted from the audio signal in the steps 1214 and 1216, and a current average amplitude is computed in a step 1208.

The amplitudes and times of the onsets of beats are placed into an array in a step 1222. From this array, a musical model is created in a step 1224. This model is based on the regularity of beats and beat emphasis—as seen in the amplitudes—that is independent of the beats and amplitudes in any one short section of music (corresponding, for instance, to a measure of music).

In general, music is organized into repeating patterns, as represented in a time signature such as 3/4, 4/4, 6/8 and the like. Within each time signature, there are primary and secondary beats. In general, the downbeat to a measure is the first beat, representing the beginning of the measure. The downbeat is generally the strongest beat within a measure, but in any given measure, another beat may be given more emphasis. Indeed, there will be high amplitude beats that may not be within the time signature whatsoever (such as an eighth note in ¾ time that is not on one of the beats). Thus, by correlating the beats to standard amplitude patterns, the output to the music model identifies the primary (down) beats, secondary beats (e.g. the third beat in 4/4 time) and the tertiary beats (e.g. the second and fourth beats in 4/4/time).

Figure 21D:
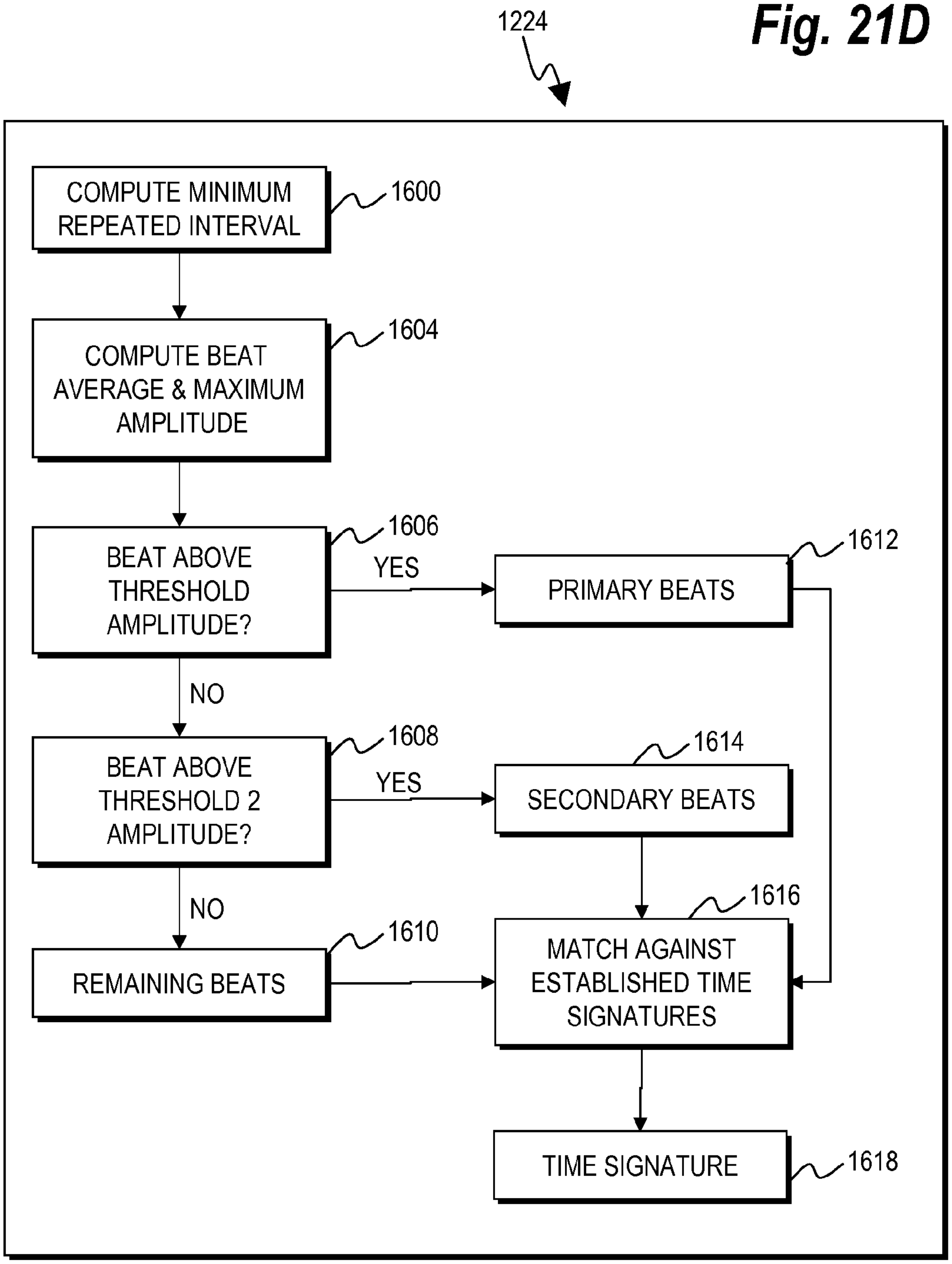
FIG. 21D is a schematic flow diagram of an algorithm to identify a music model resulting in a time signature.

FIG. 21D is a schematic flow diagram of an algorithm to identify a music model, resulting in a time signature. In a step 1600, the minimum repeated time interval is determined, using the array of beat amplitude and onset 1222. This is, over a period of time, the shortest interval for a quarter note equivalent is determined, wherein the time signature beat frequency (i.e. the note value of the denominator of the time signature, such as 8 in 6/8) is preferably limited to between 4 per second and one every two seconds, and even more preferably limited to between 3 per second and 1.25 per second. This is considered the beat time.

From the array of beat amplitudes and onsets 1222, the average and maximum amplitudes over a time period of preferably 3-10 seconds is computed in a step 1604. For the beginning of the audio signal, shorter periods of time can be used, though they will tend to give less reliable DJ 200 control signals. Indeed, in this embodiment, the initial times of an audio signal will tend to follow audio signal amplitude and changes in amplitude more than fundamental musical patterns until the patterns are elicited.

In a step 1606, the amplitude of a beat is compared with the maximum amplitude determined in the step 1604. If the beat is within a percentage threshold of the maximum amplitude, wherein the threshold is preferably 50% and more preferably 30% of the maximum amplitude, the beat is designated a primary beat in a step 1612. In a step 1608, the amplitude of non-primary beats is compared with the maximum amplitude determined in the step 1604. If the beat is within a percentage threshold of the maximum amplitude, wherein the threshold is preferably 75% and more preferably 50% of the maximum amplitude, and the beat is greater than a predetermined fraction of the average amplitude, wherein the fraction is preferably greater than 40% and even more preferably greater than 70% of the average beat amplitude, the beat is designated a secondary beat in a step 1614. The remaining beats are denoted tertiary beats in the step 1610.

In a step 1616, the sequence of the three types of beats is compared with that of established time signatures, such as 4/4, 3/4, 6/8, 2/4 and others, each with their own preferred sequence of primary, secondary and tertiary beats, in order to determine the best fit. This best fit is identified as the time signature in a step 1618.

Returning to FIG. 21C, the channels of the DJ are preassigned to four different beats in a step 1225. Thus, if there are four channels, each channel is given a separate assignment. With a smaller number of channels, a single channel is assigned multiple beats. Some beats can also be unassigned, thus not being represented in a DJ 200 transducer output. Thus, a high jewelry signal, medium jewelry signal, low jewelry signal and an amplitude dependent signal are each assigned to a channel for DJ 200 transduction.

In a step 1226, a beat determined to be a primary/down beat is assigned to a high jewelry signal 1228. In a step 1230, a beat determined to be a secondary beat is assigned to a medium jewelry signal 1232. In a step 1234, a beat determined to be a tertiary beat is assigned to a low jewelry signal 1236. Beats which are then unassigned, and which will generally be beats that occur not within the music model of the step 1224 (e.g. rapid beats not falling on beats of the time signature) are then assigned in a step 1238 to an amplitude dependent (and not music model dependent) signal 1240.

It should be noted that the computations performed in the flow methods of FIGS. 21A-C may take time on the order of milliseconds, such that if the computations are made in real time during the playing of music, the activation of the transducers in the DJ 200 are "behind" in time relative to the audio playing of the corresponding music in the audio unit 100. This can be compensated for by carrying out the computations while the audio signal is still in buffers prior to being played in the unit 100, as is described above for numerous embodiments of the present invention. Thus, signals to the DJ 200 can then be made simultaneously with respect to the audio signal to which it corresponds.

It should be noted that many of the parameters described above can conveniently be affected by manual controls either on the DJ 200 or the unit 100 that transmits signals to the DJ 200. For example, if can be convenient for the user to be able to set, for a given DJ 200 response amplitude, the threshold audio amplitude level at which the output transducer (e.g. light transducer 240) responds, or to set the output transducer amplitude corresponding to a maximum audio amplitude, or to set the frequency bands for which different DJ 200 channels respond, or to set other similar parameters. The manual controls for such parameters can comprise dials, rocker switches, up/down button, voice or display menu choices, or other such controls as are convenient for users. Alternatively, these choices can be set on a computer or other user input device, for download onto the unit 100 or DJ 200.

A preferable means of setting the parameters is for the parameters to be stored in a configuration file that can be altered either on the unit 100, the DJ 200 or a computer, so that the same DJ 200 can take on different characteristics dependent on the configuration settings within the file. The configuration settings can then be optimized for a particular situation, or set to individual preference, and be traded or sold between friends or as commercial transactions, for instance over the Internet. For a most preferable use of these configuration files, each file with its set of configurations can be considered to represent a "mode" of operation, and multiple configuration files can be set on the DJ 200 or the unit 100, depending on where the automatic generation of control signals is performed. The user can then select from the resident configuration files, appearing to the user as different modes, for use of his system, and can change the mode at will. This can be arranged as a series of choices on a voice or display menuing system, as a list toggled through by pressing a single button, or through other convenient user interfaces.

Manual Generation of DJ 200 Control Signals

In the description above, the use of filtering and digital modification of audio signals can be used to create control signals for DJ 200 transducers 240, 250, and 260. In addition, manual choreography of DJ 200 signals can be accomplished. For example, buttons or other interface features (e.g. areas on a touch-screen) on the unit 100 can correspond to different arrays of transducers, such as the LED arrays 290 and 292 of FIG. 2A. While playing the audio signal, the user can press the buttons, where pressing of the buttons can correspond to a control signal for a transducer being ON, and otherwise the signal can be off. To aid in choreography where rapid changes in transducers are desired, the audio can be played at less than normal speed.

FIG. 22A is a top-view diagram of an audio unit 100 user interface 1250, demonstrating the use of buttons to create DJ 200 control signals. The interface 1250 comprises a display screen (e.g. LCD or OLED), which can display information to the user, such as shown in FIGS. 18A-B. Standard music control buttons 1254 for playing, stopping, pausing, and rewinding allow the user to control the audio signal musical output. Buttons 1252 further control aspects of the music output, such as volume control, musical tracks, and downloading and uploading of music. The number of buttons 1252 is conveniently three as shown, but can be more or less than three.

In addition, buttons are provided to allow the user to input DJ 200 control signals, comprising a record button 1256, a first channel button 1258, a second channel button 1260 and a third channel button 1262. The channel buttons 1258, 1260 and 1262 are prominent and accessible, since the user will want to easily depress the buttons. A record button 1256 allows the user to activate the channel buttons 1258, 1260 and 1262, and has a low profile (even below the nominal surface of the interface 1250) so that it is not accidentally activated. The record button can serve various purposes, including recording into a permanent storage file the sequence of DJ control signals relative to music being played, or controlling the DJ transducers in realtime, synchronously with music being played on the audio unit 100.

Pressing the buttons 1258, 1260 and 1262 create DJ control signals for the corresponding channels. The number of buttons is conveniently three as shown, but can also be two or four or more buttons. If a telephone is being used as the unit 100, keys on the telephone keypad can alternatively be used. The channel buttons will generally be used with thumbs, and the buttons are spaced so that two of the buttons can be depressed with a single thumb, so that all three buttons can be activated with only two fingers. In is also convenient for the two secondary buttons 1260 and 1262 to be spaced more closely together, as it will be a preferred mode of operation that the secondary buttons be operated together from time to time.

To further aid in the choreography of the DJs 200, a separate "keyboard" with the number of keys related to the number of possible arrays can be used. The amplitude of the corresponding transducer signal can be modified either according to the pressure on the keys, according to the length of time that a key is depressed, or according to a foot pedal. FIG. 22B is a top-view diagram of a hand-pad 1270 for creating DJ control signals. The hand-pad 1270 comprises a platform 1271, a primary transducer 1272, a secondary transducer 1274 and a tertiary transducer 1276. The platform 1271 has a generally flat top and bottom, and can conveniently be placed on a table, or held in the user's lap. The size of the platform is such that two hands are conveniently placed across it, being preferably more than 6 inches across, and even more preferably more than 9 inches across. The pressure transducers 1272, 1274 and 1276 respond to pressure by creating a control signal, with said control signal preferably capturing both the time and amplitude of the pressure applied to the corresponding transducer. The primary transducer 1272 creates a primary control signal, the secondary transducer 1274 creates a secondary control signal and the tertiary transducer 1276 creates a tertiary control signal. The sizes and placements of the transducers can be varied within the spirit of the present invention, but it is convenient for the primary transducer 1272 to be larger and somewhat separate from that of the other transducers 1274 and 1276. In one more method of user interaction, both hands can be rapidly and alternately used to make closely spaced control signals on the primary transducer 1272. In addition, it can be convenient on occasion for the user to activate both the secondary transducer 1274 and the tertiary transducer 1276 with different fingers on one hand, and thus these can be conveniently placed relatively near to one another. In general, while a single transducer will provide minimal function, it is preferable for there to be at least two transducers, and even more preferable that there be three transducers.

The control signals can be transferred to the audio unit 100 for playing and/or storage, or to the DJ 200 unit directly for playing, either wirelessly, or through wired communication. In addition, the hand-pad can also be configured to create percussive or other sounds, either directly through the incorporation of hollow chambers in the manner of a drum, or preferably by the synthesis of audio waveform signals that can be played through the audio unit 100 (and other audio units 100 participating in a cluster 700), or directly through speakers within the hand-pad 1270 or attached to the hand-pad 1270 through wired or wireless communications. Such audible, percussive feedback can aid the user in the aesthetic creation of control signals.

It is within the spirit of the present invention for the hand-pad to take on various sizes and configurations. For instance, it is also convenient for the hand-pad 1270 to be configured for the use of index and middle fingers, being of dimensions as small as two by four inches or less. Such a hand-pad is highly portable, and can be battery powered.

Additionally, DJ 200 control signals can also be manually generated live, during broadcast at a party, for example, by a percussionist playing a set of digital drums. FIG. 22C is a schematic block diagram of a set of drums used for creating DJ control signals. The set of drums comprises four percussive instruments 1280, 1282, 1284 and 1286, which can include snare drums, foot drums, cymbals, foot cymbals and other percussive musical instruments, such as might be found with a contemporary musical "band". Microphones 1290 are positioned so as to receive audio input primarily from instruments to which they are associated. One microphone can furthermore be associated with multiple instruments, as with the drums 1282 and 1284. The microphones 1290 are connected with a controller 1292 that takes the input and creates DJ control signals therefrom. For example, the drums 1282 and 1284 can be associated with the primary channel, the drum 1280 can be associated with the secondary channel, and the drum 1286 can be associated with the tertiary channel. The association of the microphone input with the channel can be determined in many ways. For example, the jack in the controller 1292 to which each microphone 1290 attaches can correspond to a given channel. Alternatively, the user can associate the jacks in the controller to different channels, with such control being manual through a control panel with buttons or touch control displays, or even through prearranged "sets". That is, a set is a pre-arranged configuration of associations of microphones to channels, and thus a set can be chosen with a single choice that instantiates a group of microphone-channel associations.

In general, the inputs from the microphones 1290 will be filtered in frequency and also to enhance audio contrast. For instance, control signals can be arranged to be the highest when the low-frequency envelope is rising the quickest (i.e. the beat or sound onset). The algorithms for conversion of audio signal to DJ control signal can be pre-configured in the controller 1292, or can be user selectable.

It should be noted that the methods and systems of FIGS. 22A-C need to synchronize the control signals so generated with the audio files to which they correspond. This can be accomplished in many ways. For example, the first control signal can be understood to correspond to the first beat within the audio file. Alternatively, the audio unit 100 or other device that is playing the audio signal to which the control signal is to correspond can send a signal to the device that is creating the control signals indicating the onset of playing of the audio file. The control signal can then be related to the time from the onset of the audio file. In addition, with regards to this synchronization, the user manually inputting the control signals will always be listening to the music during the control signal input. If the device on which control signals are being input is the same as the device that is playing the music, a control signal input cam be easily related to the sound that is currently being played by the audio output—many such devices allow information to within less than a millisecond of what sample or time within the audio files is currently being output by the audio device. With the arrangement of the control signal input device being also an audio player, close calibration of the control signals and the audio output is easily accomplished.

DJ 200 Control Signal Files

The control signals can be in a variety of formats within the spirit of the present invention. Such formats include pairs of locations within the associated music file and the corresponding amplitudes of the various DJ channels, and pairs of locations and the amplitudes of those DJ channels which are different from before. The locations can be either time from the start of the song (e.g. in milliseconds) or in terms of sample number. If the location is given in terms of sample number, the sample rate of the music will generally also be provided, since the same song can be recorded at different sample rates, and the invariant in terms of location will generally be time from onset of the music.

Other formats include an amplitude stream, corresponding to each DJ channel, provided in a constant stream with a fixed sample rate, which may be equal to or different from that of the corresponding music file. This format can be stored, for example, as additional channels into the music file, such that one channel corresponds to monoaural sound, two channels correspond to stereo sound, three channels correspond to stereo sound and one channel of control signals, and additional channels correspond to stereo sound plus additional channels of DJ control signals. Another arrangement is to allow for only a small number of states of the transduction in the control signal, so that multiple channels of control signal can be multiplexed into a single transmitted channel for storage and transmission with the audio signal. For example, if the audio is stored as a 16-bit signal, 3 channels of 5 bit DJ 200 control signal could be stored in a single channel along side the one or two audio channels normally used.

It should be appreciated that these different control signal storage formats are largely interchangeable. For instance, as described above, control signals can be stored as if they are additional audio channels within a music file, but then be extracted from the file for separate transfer (e.g. over the Internet), and then be reintegrated into an audio file at the destination location.

It should be appreciated that there are a number of means by which DJ 200 control signals can be generated, either automatically or manually, and can include the use of devices other than the unit 100 that can have sophisticated digital or analog filtering and modification hardware and software. The control signals so created can be stored in files that are associated with the music files (e.g. MP3) that the control signals are meant to accompany. To aid in their distribution, particularly in reference to limitations on the commercial and private distribution of the corresponding music files, the signal files will generally be separate from the music files, and transferable between units 100 either through inter-unit communication mediated by the inter-unit transmitter/receiver 110, or alternatively through computers or computer networks to which the unit 100 can be connected.

Figure 23:
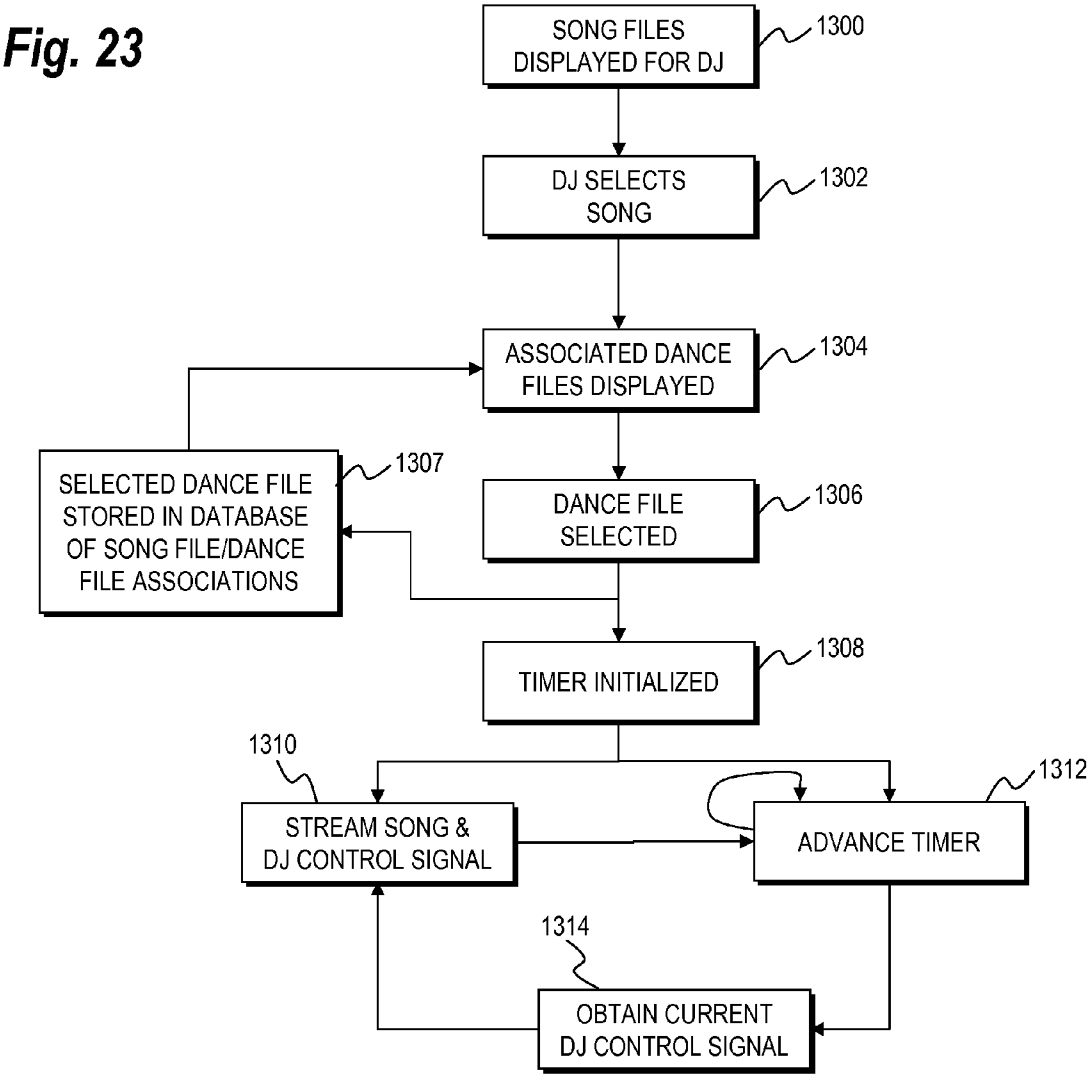
FIG. 23 is a schematic block flow diagram of the synchronized playback of an audio signal file with a DJ control signal file, using transmission of both audio and control signal information.

The audio signals and the DJ control signals should also be well synchronized during playback. FIG. 23 is a schematic block flow diagram of the synchronized playback of an audio signal file with a DJ control signal file, using transmission of both audio and control signal information. For purposes of convenience in discussion, the audio signal file will be called a "song file" and the "control signal file" will be called a "dance file." In a step 1300, the user is provided a list of song files for display, preferably on the display 1170. In a step 1302, the user then selects a song from the display to play. In a step 1304, the dance files that are associated with the selected song file from the step 1302 are displayed for the user. These song files can be either locally resident on the unit 100, or can alternatively be present on other audio units 100 to which the audio unit 100 is connected, as in a cluster, or can alternatively be on the Internet, if the audio unit 100 is connected to the Internet. If there is a dance file that has been previously preferred in association with the song file, this file can be more prominently displayed than other associated dance files.

In a step 1306, the user selects the dance file to play along with the song file. This association is stored in a local database of song file/dance file associations in a step 1307, to be later used in a subsequent step 1304, should such an association not have been previously made, or if the preferred association is different from the previously preferred association. If the dance file is not locally resident, it can be copied to the audio unit 100 to ensure that the dance file is available throughout the duration of the song file playback.

In a step 1308, a timer is initialized at the beginning of the song file playback. In the step 1310, the song file is played on the local unit 100, and is also streamed to the other units 100 within the cluster 700. The corresponding DJ control signal accompanies the streaming song, either multiplexed within the song file audio signal, on another streaming socket, or through other communications (e.g. a TCP socket) channels between the two units. In a step 1312, the time advances along with the playback of the music. In a step 1314, this timer information is used to obtain current control signals from the dance file—that is, the dance file is arranged so that at each moment, the status of the different transducer channels can be determined. The control signals to be streamed along with the song file information can be either the current status of each transducer, or alternatively, can only send changes from the current transducer state.

The matching of the files in the database of song file and dance file associations of the step 1307 can be performed both within a machine, but also over a local or wide area network. In such cases, the association can either be external to the file—that is, using the name of the file, that is available the normal system file routines—or can use information internal to one or both files. For example, the dance file can have stored within it a reference to the song to which it is associated, either as the name of the song file, the name and/or other characteristics of the song (such as the recording artist, year of publication, music publisher) or alternatively as a numerical or alphanumerical identifier associated with the song. Then, given a song file, the relationship of the dance file with the song file can be easily determined.

For ease in creating an association, it is convenient for the names of the song files and the associated dance files to have a relationship with one another that is easily understood by casual users. For example, given a song file with the name "oops.mp3", it is convenient for an associated dance file to share the same root (in this case "oops") with a different extension, creating for example the dance file name "oops-.dnc". Because of the multiplicity of dance files that will often be associated with a particular song file, the root itself can be extended to allow for either a numerical or descriptive filename, which can be preferably done in conjunction with a known punctuation mark to separate the song file root from the dance file description, such as the file names “oops.david2.dnc” or “oops$wild.dnc”. It is preferable to use a punctuation mark that is allowed within a range of different operating systems.

Dance files can be stored on the Internet or other wide area network in a store for access by users who want dance files associated with a particular song file. In such case, if the storage is through the root of the filename, the user, requesting dance files corresponding to “oops.mps” would then be returned the names of related files such as “oops$wild.dnc”. If the dance file internally carries the relationship with “oops.mps” as described above, either through the name or other characteristics, or alternatively, through a numerical or alphanumerical identifier, it is preferable to store the information in a database on the storage computer or unit 100, so that it is not necessary to open the file each time for perusal of the dance file information. Thus, if the music file has a substantially unique identifier associated with it internally, it is also useful for the dance file to also have the same identifier associated internally as well. In such case, the identifier is conveniently used to reference both files within a database.

In operation, a remote user would request a dance file for a particular song file by providing the name of the song file, along possibly with other information about the song file, which could include the name of the choreographer, the number of channels of DJ 200 transduction, the specific brand or type of DJ 200, or other information. The database would then return a listing of the various dance file that met the criteria requested. The remote user would then choose one or more of the files to download to the remote computer, and then the database would retrieve the dance files from storage and then transmits the dance file over the wide area network. On the remote computer or unit 100, the dance file would become associated with the corresponding song file through means such as naming the dance file appropriately or making an association between the song file and the dance file in a database or indexing file. Alternatively, the dance file can be integrated into the song file as mentioned elsewhere within this specification.

It can be useful to preview a dance file for its desirability or suitability. Since the dance files can be retrieved from a wide area network such as the Internet, it is convenient for such an emulator to operate on a computer that may not be portable or have the proper transmitter that allows communications with a DJ 200. In such case, it is preferable to have an emulator which places an image or drawing of a DJ 200 on the screen, and which is provided the name of a song file and a dance file, and which then plays the song file through the audio of the computer and displays appropriate images or drawings of transducers being activated within the emulator image or drawing. The characteristics of the DJ 200 being emulated (e.g. colors of lights, frequency responses, levels of illumination, arrangement of lights, response to amplitude, etc.) can be simulated by a number of means. For example, the user can move slider controls, set checkboxes and radio boxes, enter numerical values, click-and-drag icons and use other standard user interface controls to make the DJ 200 operate as desired. Alternatively, manufacturers of DJ 200s can create configuration files (including, for example, bitmaps of photos of the actual DJ 200) that can be downloaded for this purpose (and which can also be used by prospective purchasers to view the “virtual” operation of the DJ 200 prior to purchase, for example, through an Internet merchant). The configuration files would contain the information necessary for the emulator to properly display the operation of the specific DJ.

Alternatively, as described above, the dance file information can be stored within the song file as, for example, another channel in place of an audio channel, or alternatively within MP3 header or other file information. In such case, the step 1307 would have the alternative function of looking through song files to find the song file with the particular desired embedded dance file within.

In addition to sending dance files from computers to units 100 or between units 100, the dance files can be streamed from unit 100 to unit 100 through the normal unit-to-unit communications, in the manners described above for audio communications. This is particularly convenient given that DJ 200 displays can be used to show group identification, and such displays can be more effective if the DJs for each user are nearly identical (which might not be the case if the users were using, for example, different dance files). The dance file control signal information can be transmitted in a variety of ways, including multiplexing the control signals into the same packets as the audio information as if it were a different audio channel, alternating packets of control signals with packets of the audio information, or broadcasting control signals on a different UDP socket as the audio. Alternatively, if the receiving unit has a copy of the dance file corresponding to the song file being transferred by unit-to-unit communication, the receiving unit can determine the current time being played, and to extract from the local dance file the control signals for the receiving unit DJ 200.

It should be known that most streaming protocols have relatively small data packets that are communicated, due to the fact that reception at the source is not guaranteed and it is not desirable to lose a large amount of information in any one stream. Thus, it is possible with smaller transmission buffers and higher data rates to send a single DJ control signal in each transmission. For example, with a buffer size of 600 bytes, and an audio rate of 22,050 Hz with two single byte channels, each transmission covers only about 12 milliseconds, and any signal would therefore be at most 13 milliseconds from its correct time. Alternatively, each control signal can be accompanied by an offset in time from the beginning of the transmitted audio signal. Also, the time or packet number of each transmission buffer can be sent, as well as the time or packet number of the DJ audio signals, so that the audio unit 100 can compute the proper offset.

Stationary Transducers

DJs 200 that have been previously described are portable devices, usually associated with a particular user and unit 100. FIGS. 5A and 5B indicate the ways in which DJs 200 associated with multiple users can be controlled by a single unit 100.

It is also convenient for transducers to be non-portable and stationary. Consider, for example, a user who is at home listening to music. Instead of a DJ 200 worn by the user, the user can alternatively have a bank of lights or other transducers in fixed locations through the room that operate under the same or similar control signals as to which DJs respond. Such fixed transducers can operate at far higher power than portable DJs 200, and can each incorporate a large number of separate transducers.

Furthermore, in a party, concert or other large social gathering, the effects of portable DJs worn by guests can be supplemented by large transducers that are generally perceptible by most guests. For example, such transducers can include spark or smoke generators, strobe lights, laser painters, arrays of lights similar to Christmas light strings, or mechanical devices with visible (e.g. a flag waving device) or tactile effects (e.g. a machine that pounds the floor). In general, transducers for large gatherings will not communicate with a unit 100, but will be directed by a wide-area broadcast unit 360, as in FIG. 5B.

Because of the large area over which such stationary transducers can operate, the communications between the unit 100 and the stationary transducers can be through wired rather than wireless transmission. Furthermore, there can be mixed communication, such as wireless transmission of control signals from a portable unit 100 to a stationary receiver, and thence wired transmission to one or multiple transducers.

Modular Configurations

In the embodiments above, the audio player 130 is directly integrated with the inter-unit and unit-to-DJ communications. This requires both a re-engineering of existing audio players (e.g. CD, MP3, MO and cassette players), and furthermore does not allow the communications functionality to be reused between players.

An alternative embodiment of the present invention is to place the communications functions external to the audio playing functions, and to adjustably connect the two via the audio output port of the audio player. FIG. 12A is a schematic diagram of a modular audio unit 132. Audio player 131 is a conventional audio player (e.g. CD or MP3 player) without the functionality of the present invention. Analog audio output is sent via audio output port 136 through the cable 134 to the audio input port 138 of the modular audio unit 132. The modular audio unit 132 comprises the inter-unit transmitter/receiver 110 and the DJ transmitter 120, which can send and receive inter-unit and unit-to-DJ communications in a manner similar to an audio unit 100. A switch 144 chooses between audio signals from the audio player 131 and from the inter-unit transmitter/receiver 110 for output to the output audio port 142 to the earphone 901 via cable 146 (the earphone 901 can also be a wireless earphone, wherein the output port 142 can be a wireless transmitter, which can also be a DJ transmitter 120). A convenient configuration for the switch 144 is a three way switch. In an intermediate position, the unit 132 acts simply as a pass-through, in which output from the audio player 131 is conveyed directly to the earphone 901, and the transmitter/receiver functions of the unit 132 do not operate. In another position, the unit 132 operates as a receiver, and audio from the inter-unit transmitter/receiver 110 is conveyed to the earphone 901.

When the combined system operates as a broadcast unit 710, audio input from the audio unit 131 is directed to the inter-unit transmitter/receiver 110 for transmission to receive units 730, as well as for output to the earphone 901 (which can be direct to the earphone 901 through the switch, or indirectly through the inter-unit transmitter/receiver 110).

When the combined system operates as a conventional audio player, the switch directs audio signals from the input port 138 directly through to the output port 142. In this mode of operation, it can be arranged for the audio output to traverse the modular audio unit 132 without the unit being powered up. In case there is a transmission delay to the receive unit 730 such that audio played locally through the earphone 901 and audio played remotely on the receive unit 730 are not in synchrony, the system can incorporate a time delay in the output port 142 such that the local and remote audio output play with a common time delay, and are thus in synchrony.

When the combined system operates as a receiver unit 730, audio input from the input port 138 is ignored, and signals to the audio output port are delivered solely through the inter-unit transmitter/receiver 110.

It is convenient for the modular audio unit 132 to be able to operate independently of the associated audio player 131. In such a case, the unit 132 must have an independent energy store, such as one or more batteries, which can be rechargeable. In that case, the unit 132 has no audio signals locally to listen to through the earphone 901 or to transmit over the transmitter/receiver 110. However, the unit 132 can in that case receive external audio signals sent by other units 132 or units 100 for listening.

The audio player 131 can be placed in a backpack, purse, or other relatively inaccessible storage location, while the modular audio unit is, like a "remote control", accessible for interaction with other users.

Video

While the units 100 described above have comprised audio players 130, within the spirit of the present invention, such units can also comprise video or audio/visual players (both of which are referred to below as video players). Such video players would be used generally for different entertainment and educational purposes, not limited to films, television, industrial training and music videos. Such video enabled units can operate similarly to audio units, including the capability of sharing video signals, synchronously played, with nearby units through inter-unit communication, as well as the use of DJ's that can produce human-perceptible signals (such as light transduction for accompaniment of audio signals in music videos). It should be noted, however, that there is a larger bandwidth requirement for the inter-unit transmitter/receiver 110 for the communication of video signals as compared with audio signals. In the case of shared video, wire connections (e.g. FireWire) between two units can allow simultaneous viewing of a single video signal.

In addition, text, including language-selectable closed caption and video subtitling, can accompany such video, as well as chat or dubbing to allow the superposition of audio over the audio normally accompanying such video.

Music Distribution Using Audio Units

The music industry is suffering from reduced sales due to the advent of Internet-based music file sharing; in addition, the manufacturers of personal audio devices are bringing to market audio devices that can wirelessly transfer music files between the devices. Such sharing-enabled devices could significantly reduce the sales of music. Audio units of the present invention, however, can be used to provide new means of music distribution and thereby increase the sales of music.

Figure 25:
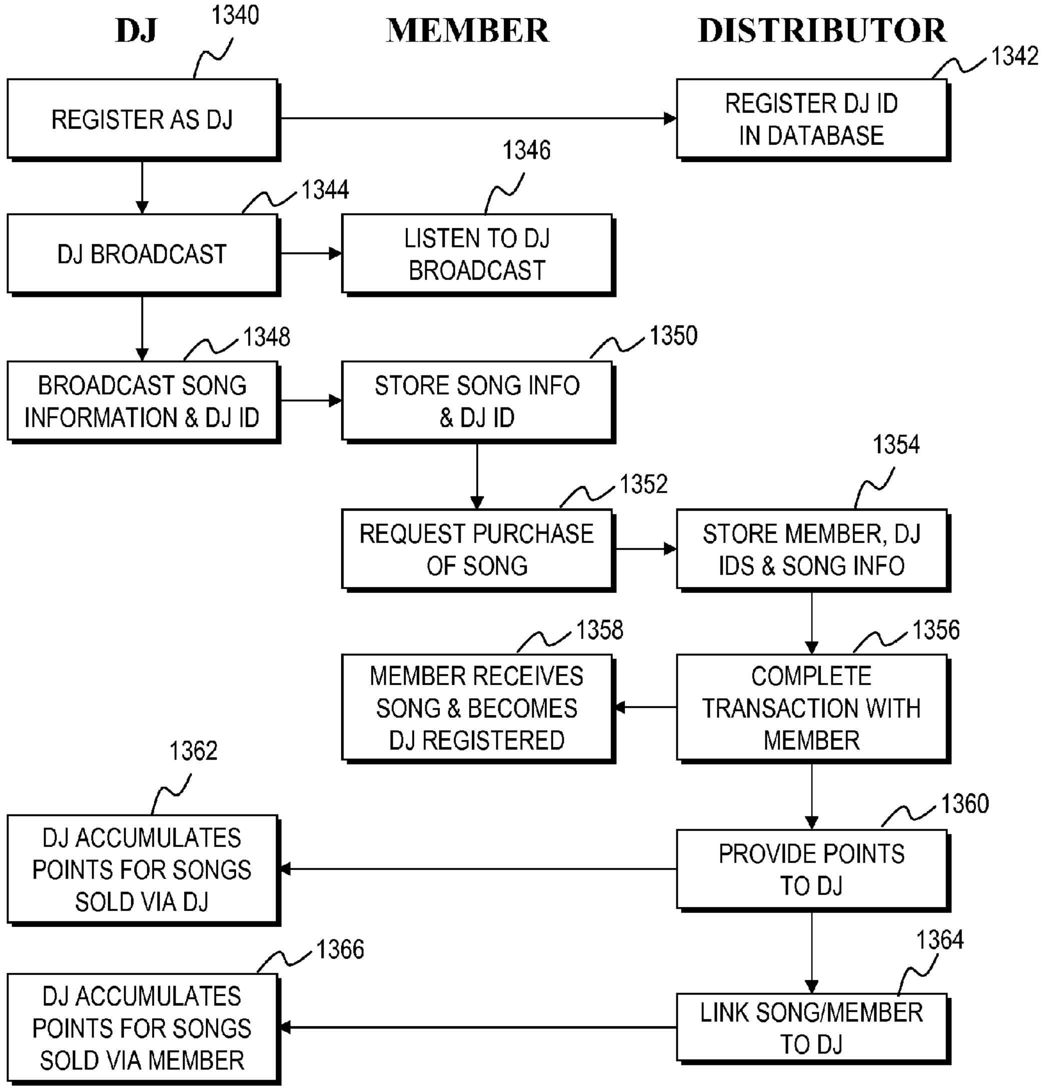
FIG. 25 is a schematic flow diagram indicating music sharing using audio devices, providing new means of distributing music to customers.

FIG. 25 is a schematic flow diagram indicating music sharing using audio devices, providing new means of distributing music to customers. Three entities are involved in the transactions—the DJ (operating a broadcast unit 710), the cluster member (operating a receive unit 730), and the music distributor, and their actions are tracked in separate columns. In this case, the term DJ is used to indicate the person operating a broadcast unit 710, and has no meaning with respect to a DJ unit 200. Indeed, the DJ unit 200 is a part of the system only inasmuch as it provides for heightened pleasure of the DJ and the member in enhancing their experience of the music. For the rest of this section, DJ will refer specifically to the person operating the broadcast unit 710.

In a first step 1340, the DJ registers with the distributor, who places information about the DJ into a database in a step 1342. Part of this information is a DJ identifier (the DJ ID), which is unique to the DJ, and which DJ ID is provided to the DJ as part of the registration process. This ID is stored in the unit 100 for later retrieval. The DJ at some later time broadcasts music of the type distributed by the distributor, in a step 1344. The broadcast of the music by the DJ can be adventitious (that is, without respect to the prior registration of the DJ with the distributor), or the distributor can provide the music to the DJ either free of charge, at a reduced charge, or free of charge for a limited period of time.

In a step 1346, the member becomes a part of the cluster 700 of which the DJ is the broadcaster broadcasting the distributor's music, and has thereby an opportunity to listen to the music. Along with the transfer of the audio signal of the music, in a step 1348, the DJ can send information about the song, which can include a numerical identifier of the music or album from which the music is derived. Furthermore, the DJ ID is provided to the member, and is associated with the music ID and stored in a database on the member unit 100 in a step 1350. In order to prevent this database from becoming too sizable, music IDs and DJ IDs can be purged from it on a regular basis (for example, IDs which are older than 60 or 120 days can be removed).

If the member requests purchase of the music from the distributor in a step 1352, in a step 1354, the distributor stores the member information, the music ID, and the DJ ID associated with the music (i.e. the person who introduced the member to the music). The distributor then completes the transaction with the member, providing a copy of the music in exchange for money, in a step 1356. As the member receives the music copy, he also becomes registered as a DJ as well in a step 1358. Thus, if the member now becomes the DJ of his own cluster, and introduces people to this music, he will also be known to the distributor as an introducer of the music.

In a step 1360, the distributor provides points to the DJ who introduced the member to the music and facilitated the sale of the music. In a step 1362, the DJ accumulates points related to the sale of the music to the member, as well as points related to the sale of other music to other members. These points can at that point or later be redeemed for money, discounted music, free music, gifts, access to restricted activities (e.g. seats at a concert) or other such real or virtual objects of value to the DJ.

In a step 1364, the DJ is optionally further linked to the music and member for whom he has received points. If this member introduces the music to yet other members, who are induced to buy the music from the distributor, the DJ is further awarded points in a step 1366, given that the "chain" of members introduced directly or indirectly to the music includes the original DJ.

This set of interactions does not decrease music sales as does file sharing, but rather increases sales of music, as the DJ has incentives to encourage others to buy the music, and the offering of the music by the DJ through his broadcasts introduces music to people who may not have already had the opportunity to hear the music.

Figure 31:
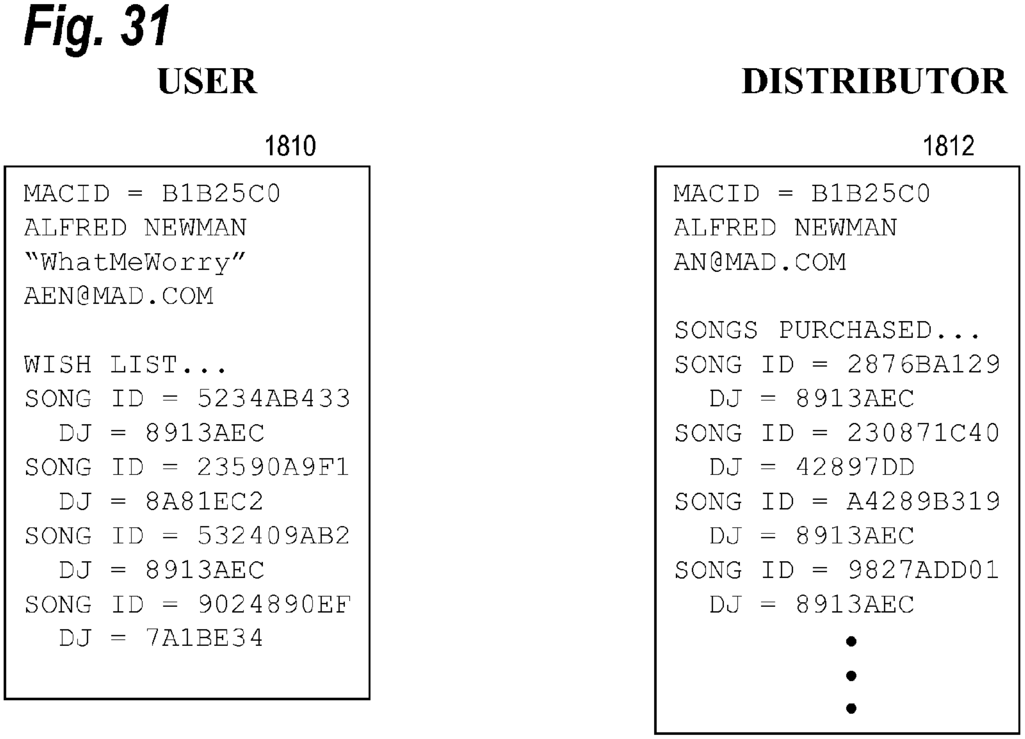
FIG. 31 is tables of DJ, song and transaction information according to the methods of FIG. 25.

FIG. 31 contains tables of DJ, song and transaction information according to the methods of FIG. 25. A USER table 1810 comprises information about the USER, which can include the name of the person (Alfred Newman), their nickname/handle ("WhatMeWorry"), their email address (AEN@mad.com), and the machine ID of their unit 100 (B1B25C0). This information is permanently stored in the audio unit 100. A second set of information relates to music that the USER has heard while in other clusters 700 that the USER liked, and which is indicated as the USER's "wish list". This set of information includes a unique ID associated with the song (or other music or audio signal), which is transmitted by the broadcast unit 710 of the cluster 700. This information can alternatively or additionally include other information about the music, such as an album name, an artist name, a track number, or other such information that can uniquely identify the music of interest.

Along with each song ID is a DJ identifier, indicating the unique ID associated with the DJ who introduced the desired music to the USER. Additionally or alternatively, the information can comprise the DJ's email address, personal nickname/handle, name, or other uniquely identifying information.

The Wish List can either be permanent, or it can be that each song entry is dated, and that after a predetermined amount of time, which can be set by the user, the songs that are still on the Wish List are removed. It is also convenient that songs that are purchased according to the methods of the present invention, such as FIG. 25, are also removed from the list automatically.

A DISTRIBUTOR table 1812 comprises information about purchases made by USERS with the DISTRIBUTOR. The table 1812 has numerous records keyed according to unique USER identifiers, which in this case is the MAC ID of the unit 100. A single record from the table is provided, of which there can be hundreds of thousands or millions of such records stored.

The record can include contact information about the USER, including name, email address, or other business related information such as credit card number. In addition, each record comprises a list of all of the songs known to have been purchased through the DISTRIBUTOR, as identified by a unique song ID. In addition, the DJ associated with the purchase of the given song by the USER is also noted. This information was previously transmitted from the USER table 1810, which includes the associated DJ identifier along with the song identifier, at the time of purchase of the song. This association allows the DISTRIBUTOR to compensate the DJ for his part in introducing the USER to the song.

It should also be noted that such an arrangement of information allows the compensation, if desired, of the individual who introduced the DJ to the song, prior to the DJ introducing the USER to the song. For example, when the user purchased the song with song ID 230871C40, points were credited with the DJ whose ID is 42897DD. Looking in the record for the DJ 42897DD, one can determine whether there is another individual (DJ) associated with the purchase of the song 230871C40 by the DJ. If so, that individual can also receive compensation for the purchase of the song by the USER.

Use of Internet Connections

Figure 29A:
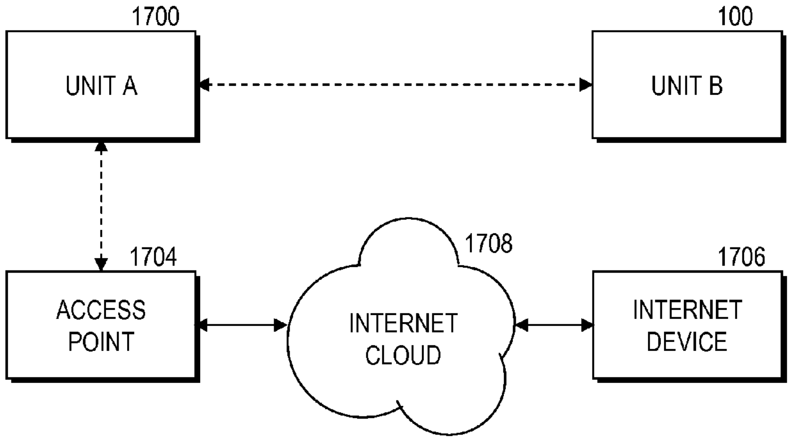
FIG. 29A is a schematic block diagram of the connection of an Internet-enabled audio unit with an Internet device through the Internet cloud, using an Internet access point.

It is within the teachings of the present invention to allow normal Internet connections of the audio unit 100 with non-mobile devices connected with the Internet. FIG. 29A is a schematic block diagram of the connection of an Internet-enabled audio unit 100 with an Internet device through the Internet cloud 1708, using an Internet access point 1704. An Internet-enabled audio unit 1700, unit A, is wirelessly connected to an audio unit 100, denoted unit B, as members in a cluster 700. The dashed line connecting the two units A and B indicates that the connection is wireless, whereas the solid connecting lines indicate wired connections. The unit A is connected to a wireless access point 1704, such as an 802.11 access point, which is connected to an Internet device 1706 via wired connections through the Internet cloud 1708.

Figure 29B:
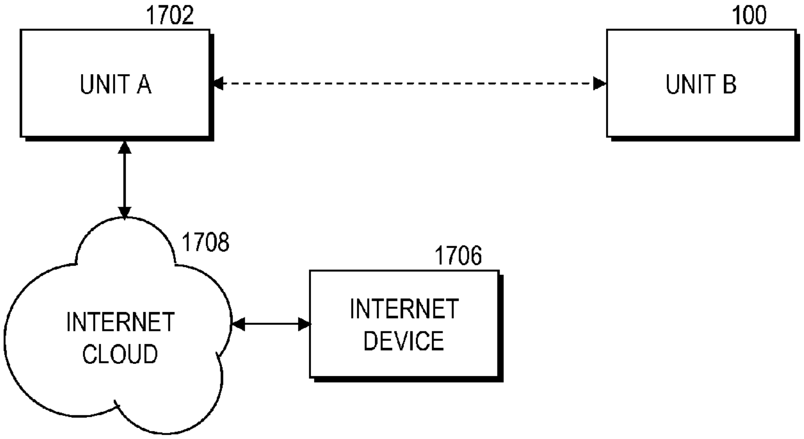
FIG. 29B is a schematic block diagram of the connection of an Internet-enabled audio unit with an Internet device through the Internet cloud, with an audio unit directly connected to the Internet cloud.

FIG. 29B is a schematic block diagram of the connection of an Internet-enabled audio unit 1702 with an Internet device through the Internet cloud, with an audio unit 1702 directly connected to the Internet cloud 1708. In this case the audio unit 1702 is capable of directly connecting to the Internet cloud 1708, and thence to the Internet device 1706, through a wired connection. This could be through a high speed connection (such as a twisted wire Ethernet connection) or through a lower speed connection (e.g. a serial port connection, or a dial-up modem).

Figure 30:
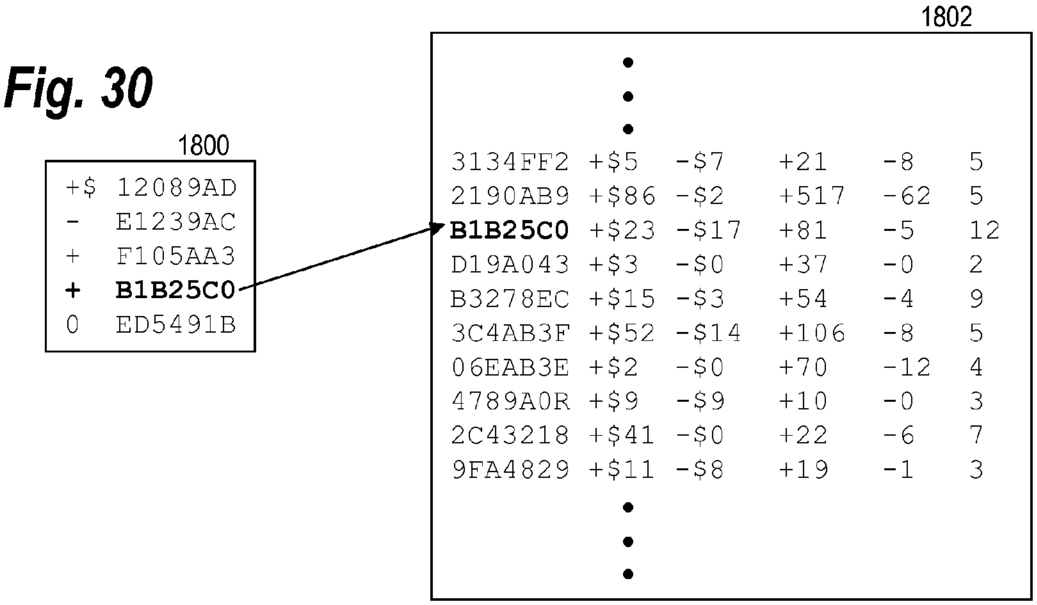
FIG. 30 comprises tables of ratings of audio unit users.

The connection of the unit 1700 or unit 1702 is illustrated in FIG. 30, tables of ratings of audio unit 100 users. As described above, members of a cluster can decide whether or not to admit a new member to the cluster using a variety of automatic or manual methods. One method of determining the suitability of a user to become a member of the cluster 700 is to determine the user's ratings by members of other clusters to which the user has previously been a member. In this case, the Internet device 1706 is a computer hosting a database, which can be queried and to which information can be supplied by the unit A (either 1700 or 1702). On the Internet device 1706 are stored ratings of units 100, as indicated by the table 1802. The left hand column is the primary key of the database, and is a unique identifier associated with each unit 100. This ID can be a numerical MAC ID, associated with the hardware and software of each unit 100, a unique nickname or word handle (e.g. "Jen412smash") associated with each audio unit user, or other such unique identifier.

The second and third columns, indicated as numbers with dollar signs, are the total summed positive ratings (column two) and the negative ratings (column three) registered with each user by another member of a cluster 700 with which the user has been associated, and in which the user was operating the broadcast unit 710. This rating can, for example, reflect the perceived quality of music provided by the user. The fourth and fifth columns are the total, summed ratings of the user by other members of clusters 700 with which the user has been associated, in which the user was the operator of a receive unit 730. This rating can, for example, indicate the good spirits, friendliness, dress or other characteristics of the user as perceived by other members of the cluster. The sixth column indicates the largest cluster 700 for which the user has been the broadcaster. This is a good indicator of a broadcaster's popularity, since a poor or unpopular broadcaster would not be able to attract a large group of members for a cluster.

There are many other characteristics that can be stored in such a database, and can also include IDs of other members of groups with which the user has been associated (so that members can accept new members who have been associated with friends of those in the cluster), specific music that the user has played (in order to determine musical compatibility), information on the individuals making each rating (in order to determine rating reliability), and gradations of ratings (rather than simply a positive or negative response).

The cluster members can access the ratings of the user requesting membership in the cluster 700 in order to determine their desirability and suitability. This would require a connection with the Internet device 1706 at the time that the user was requesting to join, and would preferably involve a wireless connection through an access point, as in FIG. 29A. The information from the database on the device 1706 can either be displayed to the members of the cluster 700, or can be used by an automatic algorithm to determine whether the person can join.

The table 1800 represents the ratings of a cluster 700 of 5 total members (comprising a broadcaster with ID 12089AD, and four additional members with IDs E1239AC, F105AA3, B1B25C0, and ED5491B). The ratings are supplied by ED5491B (whose ID is preceded by a zero), and then specific ratings of each member are made. The DJ is indicated by a dollar sign preceding his ID. These ratings can be made by putting the nicknames/handles of the cluster members on a screen, and allowing the member to indicate positive or negative ratings by pressing one of two buttons. A plus in the first column indicates a positive response, and a minus sign indicates a negative response. These ratings can then be sent during either wired communications directly to the Internet device 1706 or via the access point 1704. It should be noted that the ratings, once made, can be stored on the unit 1700 or 1702 indefinitely, until connection with the Internet cloud 1708 can be made. As indicated by the arrow, the information for B1B25C0 can be added to the table 1802—in this case, by incrementing the value in the fourth column (a positive rating for a user who is not the broadcaster).

Other applications of connections to Internet devices 1706 include exchanging (via uploading and downloading) dance files with distant individuals, and obtaining music via downloading, which can include transactions with distributors similar to that seen in FIG. 25. Such connections also allow the integration of other connectivity, such as telephone and messaging capabilities, expanding the usefulness and attractiveness of audio units 100.

Many Embodiments Within the Spirit of the Present Invention

It should be apparent to one skilled in the art that the above-mentioned embodiments are merely illustrations of a few of the many possible specific embodiments of the present invention. For example, the elements of a unit 100, including the inter-unit transmitter/receiver 110 protocol and hardware, the DJ transmitter 120 and the audio player 130 can be chosen from a range of available technologies, and can be combined with user interface elements (keyboards, keypads, touch screens, and cursor buttons, without significantly affecting the operation of the unit 100. Furthermore, many different transducers can be combined into DJs 200, which can further comprise many decorative and functional pieces (e.g. belt clasps, functional watches, microphones, or wedding rings) within the spirit of the present invention. Indeed, the unit 100, itself, can comprise transducers 240, 250 or 260.

It should also be appreciated that communications protocols provide a nearly uncountable number of arrangements of communications links between units in a cluster, that the links can be of mixed software protocols (e.g. comprising both TCP and UDP protocols, and even non-IP protocols) over a variety of hardware formats, including DECT, Bluetooth, 802.11 a, b, and g, Ultra-Wideband, 3G/GPRS, and i-Beans, and that communications can include not only digital but also analog communications modes. Furthermore, communications between audio units and digital jewelry can further comprise analog and digital communications, and a variety of protocols (both customized as well as well-established IP protocols).

It is important, as well, to note that the inter-unit communication and the unit-to-DJ communication can operate and provide significant benefits independently of one another. For example, members listening to music together gain the benefits of music sharing, even without the use of DJs 200. Alternatively, an individual's appreciation of music and personal expression can be augmented through use of a DJ 200, even in the absence of music sharing. However, the combination of music sharing along with enhanced personal expression through a DJ 200 provides a synergistic benefit to all members sharing the music.

Numerous and varied other arrangements can be readily devised by those skilled in the art without departing from the spirit and scope of the invention. Moreover, all statements herein reciting principles, aspects and embodiments of the present invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

In the specification hereof any element expressed as a means for performing a specified function is intended to encompass any way of performing that function. The invention as defined by such specification resides in the fact that the functionalities provided by the various recited means are combined and brought together in the manner which the specification calls for. Applicant thus regards any means which can provide those functionalities as equivalent as those shown herein.

What is claimed is:

1. A method comprising:

providing a cluster comprising an original broadcast unit and at least one original receive unit wherein the original broadcast unit broadcasts media content to the at least one original receive unit; and automatically transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit;

wherein automatically transferring broadcast control comprises automatically transferring broadcast control from the original broadcast unit to the original receive unit in response to the original broadcast unit becoming unavailable.

2. The method of claim 1 wherein the original broadcast unit broadcasts media content to the at least one original receive unit in the cluster via local wireless communication, and the original broadcast unit becomes unavailable when the original broadcast unit is out of local wireless communication range of one or more of the at least one original receive unit.

3. The method of claim 1 wherein the original broadcast unit becomes unavailable when the original broadcast unit is turned off.

4. A method comprising:

providing a cluster comprising an original broadcast unit and at least one original receive unit wherein the original broadcast unit broadcasts media content to the at least one original receive unit; and transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit;

wherein the original receive unit to which the broadcast control is transferred is randomly selected from the at least one original receive unit.

5. A method comprising:

providing a cluster comprising an original broadcast unit and at least one original receive unit wherein the original broadcast unit broadcasts media content to the at least one original receive unit; and transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit;

wherein the original receive unit to which the broadcast control is transferred is selected via a voting process.

6. A method comprising:

providing a cluster comprising an original broadcast unit and at least one original receive unit wherein the original broadcast unit broadcasts media content to the at least one original receive unit; and transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit;

wherein one of the at least one original receive unit that has been in the cluster the longest is automatically selected as the original receive unit to which the broadcast control is transferred.

7. A method comprising:

providing a cluster comprising an original broadcast unit and at least one original receive unit wherein the original broadcast unit broadcasts media content to the at least one original receive unit; and transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit;

wherein transferring broadcast control comprises transferring broadcast control from the original broadcast unit to the original receive unit in response to a manual request by a user of the original receive unit.

8. A method comprising:

providing a cluster comprising an original broadcast unit and at least one original receive unit wherein the original broadcast unit broadcasts media content to the at least one original receive unit;

transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit; and obtaining approval to transfer broadcast control from a user of the original broadcast unit prior to transferring broadcast control from the original broadcast unit to the original receive unit.

9. A method comprising:

providing a cluster comprising an original broadcast unit and at least one original receive unit wherein the original broadcast unit broadcasts media content to the at least one original receive unit; and transferring broadcast control from the original broadcast unit to an original receive unit from the at least one original receive unit such that the original receive unit becomes a new broadcast unit for the cluster and operates to broadcast media content to at least one of a group consisting of: the original broadcast unit such that the original broadcast unit is a new receive unit in the cluster and one or more other original receive units from the at least one original receive unit;

wherein transferring broadcast control comprises:

notifying the one or more other original receive units from the at least one original receive unit of the new broadcast unit such that the one or more other original receive units are enabled to tune to a communication channel over which the new broadcast unit broadcasts media content; and ceasing to broadcast media content from the original broadcast unit.

10. The method of claim 9 wherein the new broadcast unit establishes a multicast channel over which to broadcast media content, and notifying the one or more other original receive units of the new broadcast unit comprises providing a multicast address of the multicast channel to the one or more other original receive units.

11. A method of operation of an original broadcast unit, comprising:

broadcasting media content to at least one original receive unit; and transferring broadcast control to an original receive unit of the at least one original receive unit such that the original receive unit becomes a new broadcast unit and operates to broadcast media content to at least one of a group consisting of: the original broadcast unit such that the original broadcast unit is a new receive unit and one or more other original receive units from the at least one original receive unit;

wherein the method further comprises randomly selecting the original receive unit to which the broadcast control is transferred from the at least one original receive unit.

12. A method of operation of an original broadcast unit, comprising:

broadcasting media content to at least one original receive unit; and transferring broadcast control to an original receive unit of the at least one original receive unit such that the original receive unit becomes a new broadcast unit and operates to broadcast media content to at least one of a group consisting of: the original broadcast unit such that the original broadcast unit is a new receive unit and one or more other original receive units from the at least one original receive unit;

wherein the method further comprises selecting the original receive unit to which the broadcast control is transferred via a voting process.

13. A method of operation of an original broadcast unit, comprising:

broadcasting media content to at least one original receive unit; and transferring broadcast control to an original receive unit of the at least one original receive unit such that the original receive unit becomes a new broadcast unit and operates to broadcast media content to at least one of a group consisting of: the original broadcast unit such that the original broadcast unit is a new receive unit and one or more other original receive units from the at least one original receive unit;

wherein the method further comprises automatically selecting one of the at least one original receive unit that has been associated with the original broadcast unit the longest as the original receive unit to which the broadcast control is transferred.

14. A method of operation of an original broadcast unit, comprising:

broadcasting media content to at least one original receive unit; and transferring broadcast control to an original receive unit of the at least one original receive unit such that the original receive unit becomes a new broadcast unit and operates to broadcast media content to at least one of a group consisting of: the original broadcast unit such that the original broadcast unit is a new receive unit and one or more other original receive units from the at least one original receive unit;

wherein transferring broadcast control comprises:

receiving a request from the original receive unit initiated by a user of the original receive unit to transfer broadcast control to the original receive unit; and transferring broadcast control from the original broadcast unit to the original receive unit in response to the request.

15. A method of operation of an original broadcast unit, comprising:

broadcasting media content to at least one original receive unit; and transferring broadcast control to an original receive unit of the at least one original receive unit such that the original receive unit becomes a new broadcast unit and operates to broadcast media content to at least one of a group consisting of: the original broadcast unit such that the original broadcast unit is a new receive unit and one or more other original receive units from the at least one original receive unit;

wherein transferring broadcast control comprises:

obtaining approval from a user of the original broadcast unit to transfer broadcast control to the original receive unit; and transferring broadcast control from the original broadcast unit to the original receive unit upon receiving approval from the user of the original broadcast unit.

16. A method of operation of an original broadcast unit, comprising:

broadcasting media content to at least one original receive unit; and transferring broadcast control to an original receive unit of the at least one original receive unit such that the original receive unit becomes a new broadcast unit and operates to broadcast media content to at least one of a group consisting of: the original broadcast unit such that the original broadcast unit is a new receive unit and one or more other original receive units from the at least one original receive unit;

wherein transferring broadcast control comprises:

notifying the one or more other original receive units from the at least one original receive unit of the new broadcast unit such that the one or more other original receive units are enabled to tune to a communication channel over which the new broadcast unit broadcasts media content; and ceasing to broadcast media content to the at least one original receive unit.

17. The method of claim 16 wherein the new broadcast unit establishes a multicast channel over which to broadcast media content, and notifying the one or more other original receive units of the new broadcast unit comprises:

receiving a multicast address of the multicast channel from the new broadcast unit; and providing the multicast address of the multicast channel to the one or more other original receive units.

* * * * *